US 6,920,374 B2

(12) United States Patent
Takenaka et al.

(10) Patent No.: US 6,920,374 B2
(45) Date of Patent: *Jul. 19, 2005

(54) FLOOR SHAPE ESTIMATION SYSTEM OF LEGGED MOBILE ROBOT

(75) Inventors: Toru Takenaka, Wako (JP); Tadaaki Hasegawa, Wako (JP); Takashi Matsumoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 78 days.

This patent is subject to a terminal disclaimer.

(21) Appl. No.: 10/276,742

(22) PCT Filed: May 17, 2001

(86) PCT No.: PCT/JP01/04118

§ 371 (c)(1),
(2), (4) Date: Nov. 19, 2002

(87) PCT Pub. No.: WO01/87548

PCT Pub. Date: Nov. 22, 2001

(65) Prior Publication Data

US 2003/0125839 A1 Jul. 3, 2003

(30) Foreign Application Priority Data

May 19, 2000 (JP) .................................. 2000-147948

(51) Int. Cl.[7] .............................................. G06F 19/00

(52) U.S. Cl. .................... 700/245; 700/246; 700/251; 700/260; 700/261; 318/568.1; 318/568.12; 318/568.16; 318/568.17; 318/568.2; 900/1; 900/9; 900/46

(58) Field of Search ................................. 700/245, 246, 700/251, 253, 260, 261; 318/568.1, 568.12, 568.16, 568.17, 568.2; 900/1, 9, 46

(56) References Cited

U.S. PATENT DOCUMENTS

| 5,311,109 | A | | 5/1994 | Ozawa |
| 5,404,086 | A | | 4/1995 | Takenaka et al. |
| 5,737,217 | A | * | 4/1998 | Nishikawa et al. ............ 700/56 |
| 5,808,433 | A | * | 9/1998 | Tagami et al. ......... 318/568.12 |
| 5,936,367 | A | * | 8/1999 | Takenaka ............... 318/568.12 |
| 6,317,652 | B1 | * | 11/2001 | Osada ........................ 700/245 |
| 6,505,096 | B2 | * | 1/2003 | Takenaka et al. ........... 700/245 |
| 6,527,071 | B1 | * | 3/2003 | Villedieu ..................... 180/8.1 |
| 2002/0022907 | A1 | * | 2/2002 | Takenaka et al. ........... 700/245 |

FOREIGN PATENT DOCUMENTS

WO   WO 99/54095   10/1999

OTHER PUBLICATIONS

Takanishi et al., Realization of dynamic biped walking stabilized by trunk moion on a sagitally uneven surface, 1990, IEEE, pp. 323–330.*

(Continued)

Primary Examiner—Thomas G. Black
Assistant Examiner—McDieunel Marc
(74) Attorney, Agent, or Firm—Squire, Sanders & Dempsey L.L.P.

(57) ABSTRACT

A floor shape estimation system for a legged mobile robot, in particular a biped walking robot, which estimates a floor shape, more specifically a foot-to-foot floor inclination difference based on at least a control error of the total floor reaction force's moment and based on the estimated value and corrects a feet compensating angle based on the estimated value. Further, the system estimates a floor shape, more specifically a foot floor inclination difference based on at least a control error of the foot floor reaction force about a desired foot floor reaction force central point and corrects a foot compensating angle based on the estimated value. With this, it can accurately estimate the shape of a floor with which the robot is in contact. Further, if the floor shape is different from what has been supposed, it can produce the floor reaction force as desired by absorbing the influence of difference.

14 Claims, 40 Drawing Sheets

OTHER PUBLICATIONS

Goswami, Foot rotation indicator (FRI) point: A new gait planning tool to eveluate postural stability of biped robots, 1999, IEEE, pp. 47–52.*

Gusev et al., Adaptive control of biped robot walking on an inclined Plane, 1996, IEEE, pp. 190–1095.*

Zheng et al., Gait systhesis for the SD–2 biped robot to climb sloping surface, 1990, IEEE, pp. 86–96.*

Kumagai et al., Vision based walking of human type biped robot on undulating ground, 2000, IEEE. pp. 1352–1357.*

* cited by examiner

DESIRED TOTAL FLOOR REACTION FORCE CENTRAL POINT
TRAJECTORY (DESIRED ZMP POSITION) VIEWED FROM ABOVE

TIME CHART SHOWING DESIRED TOTAL FLOOR
REACTION FORCE CENTRAL POINT (DESIRED ZMP)

P: DESIRED TOTAL FLOOR REACTION FORCE CENTRAL POINT (DESIRED ZMP)
Q1: DESIRED 1ST FOOT FLOOR REACTION FORCE CENTRAL POINT
Q2: DESIRED 2ND FOOT FLOOR REACTION FORCE CENTRAL POINT

P: DESIRED TOTAL FLOOR REACTION FORCE CENTRAL POINT (DESIRED ZMP)
Q1: DESIRED 1ST FOOT FLOOR REACTION FORCE CENTRAL POINT
Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

2ND FOOT     1ST FOOT

2ND FOOT     1ST FOOT

US 6,920,374 B2

FLOOR SHAPE ESTIMATION SYSTEM OF LEGGED MOBILE ROBOT

TECHNICAL FIELD TO WHICH THE INVENTION RELATES

The present invention relates to a floor shape estimation system of a legged mobile robot, and more specifically to a system for estimating the shape such as inclination of the floor with which a legged mobile robot is in contact and in addition, to a system for enabling to control a floor reaction force based on the estimated floor shape.

BACKGROUND ART OF THE INVENTION

As floor shape estimation prior art, there are known a technique described in Japanese Laid-Open Patent Application No. Hei 6 (1994)-31658 proposed by the applicant, and another technique mentioned on a paper entitled "Development of a Biped Walking Robot Adapting to an Unknown Uneven Surface" (Journal of the Robotics Society of Japan; Vol. 14, No. 4; May 1996).

The latter (i.e., that mentioned on the journal) will be summarized in the following and problems thereof will then be discussed.

In this prior art, the robot foot is configured to have three stories in height comprising an upper-foot plate, a cushioning section and a lower-foot plate (sole). The foot has potentiometers at four corners which detect the angle and the distance between the upper and lower-foot plates, and a clinometer (inclination sensor) which detects the absolute inclination of the upper-foot plate. The foot is also provided with spikes at the four corners.

In this prior art, when a free leg is landed, the foot is controlled to profile the floor surface based on the information obtained from the potentiometers and the clinometer. With this, the spikes (installed at the four corners) are in contact with the floor such that the lower-foot plate is in parallel with the floor surface. At that instant, the height and the angle of inclination of the floor are estimated through geometric calculation based on the detected absolute position and/or posture of the upper-foot plate obtained by the clinometer and the angle of the upper-foot plate relative to the lower-foot plate and the distance between the upper and lower-foot plates obtained based on the potentiometers.

However, this prior art technique has the following problems. Specifically, it can not conduct a posture stabilization control to manipulate the floor reaction force until the foot has landed on the floor to profile the floor surface. Further, if a member made of a soft material such as rubber is applied to the foot sole so as to enhance grip, the structure would disadvantageously increase estimation error.

Further, when the foot does not land on the floor completely, i.e., when the foot does not land with its sole surface-contact with the floor, it can not estimate a floor height correctly during the two-leg supporting period. Further, when the feet are in contact with the floor completely, for example, at the time of holding itself upright, it can not estimate, at the same time, the inclination of a surface with which each foot is in contact and a height difference between the surfaces with which the feet are in contact. Furthermore, since it can only estimate the floor shape at an instant of foot landing, if the floor deforms after landing, it can no longer estimate the deformed shape.

On the other hand, the former (i.e., that described in 6 (1994)-31658)) can estimate the inclination of floor, while conducting a posture stabilization control to manipulate the floor reaction force. However, during the two-leg supporting period it can only estimate the inclination of a surface that intersects or adjoins the surfaces with which the feet are in contact, whilst during one-leg supporting period it can only estimate the inclination of the surface with which the supporting leg foot is in contact. In other words, this prior art technique can not estimate the inclinations at the same time.

DISCLOSURE OF THE INVENTION

An object of the present invention is to solve the problem and to provide a floor shape estimation system of a legged mobile robot which can accurately conduct simultaneous floor shape estimation which has been difficult in the prior art, i.e., which can accurately estimate a floor shape, more specifically the inclination of the surface with which the foot is in contact and a height difference between the surfaces with which the feet are in contact, at the same time, in other words in a composite manner.

Aside from the above, the applicant proposes, in Japanese Laid-Open Patent Application No. Hei 10(1998)-277969, detecting the posture inclination of a legged mobil robot and determining a compensating total floor reaction force's moment about a desired total floor reaction force central point based on the detected posture and inclination, distributing it to each foot such that the position and/or posture of each feet rotates about the desired total foot floor reaction force central point and desired each foot floor reaction force central point by predetermined amounts respectively such that the robot walks with stable posture even on a floor that has not only a widely-spreading slant or undulations, but also has local slants or undulations.

A second object of the present invention is to provide a floor shape estimation system of a legged mobile robot which can correct a foot trajectory or pattern by the estimated floor shape, whereby enabling to bring a steady-state error of the actual floor reaction force from a desired value in the control, which has not been eliminated in the prior art, close to zero as much as possible, in other words to solve the steady-state error due to a deviation of the floor reaction force.

In order to achieve the above-mentioned objects, there is provided as defined in claim 1 a system for controlling a legged mobile robot having at least a body and a plurality of legs each connected to the body through a first joint and having a foot connected to its distal end through a second joint, the system having a compliance mechanism which deforms in response to a floor reaction force acting from a floor with which the foot is in contact and joint displacement means which displacing the first and second joints such that the foot follows a desired position and/or posture, comprising: inclination detection means for detecting an inclination of the body relative to a vertical direction; walking environment foot position and/or posture calculating means for calculating a position and/or posture of the foot in a walking environment including the floor with which the foot is in contact, based on an actual and/or desired position and/or posture of the foot and the detected inclination; deformed foot position/posture calculating means for calculating the position and/or posture of the foot with deformation of the mechanism in response to the floor reaction force acting from the floor in the walking environment using a mechanism compliance model which models the compliance mechanism; and floor shape estimation value calculating means for calculating a floor shape estimation value indicative of shape of surface of the floor with which each foot is in contact and indicative of a relationships therebetween. With this, the system can accurately estimate the inclination of the surface with which the foot is in contact and a height difference between the surfaces with which the feet are in contact, at the same time, in other words in a composite manner, that has been difficult in the prior art.

In the system, the compliance model comprises a first model which expresses the floor reaction force acting on each foot and a change of position and/or posture of each foot resulting from the floor reaction force acting on each foot, and a second model which expresses the floor reaction force acting at a desired total floor reaction force central point and a change of one of the foot relative to the other resulting from the floor reaction force acting at the desired total floor reaction force central point. With this, the system can accurately estimate the inclination of the surface with which the foot is in contact and a height difference between the surfaces with which the feet are in contact with a simpler configuration, at the same time, in other words in a composite manner.

In the system, the floor shape estimation value calculating means has a filter which removes a high-frequency component. With this, the system can accurately estimate the inclination of the surface with which the foot is in contact and a height difference between the surfaces with which the feet are in contact, at the same time, in other words in a composite manner. And the system can prevent the control system from oscillating.

The system further includes: correcting means for correcting the desired position and/or posture of the foot based on the calculated floor shape estimation value. With this, in addition to the advantages and effects mentioned above, the system can bring a steady-state error of the actual floor reaction force from a desired value in the control, which has not been eliminated in the prior art, close to zero as much as possible, in other words to solve the steady-state error due to a deviation of the floor reaction force.

The system further includes: gait generating means for generating a gait of the robot including at least a motion pattern of the robot including at least the desired position and/or posture of the foot and a desired pattern of a total floor reaction force acting on the robot; desired foot floor reaction force central point determining means for determining a desired foot floor reaction force which is a central point of action on the foot when the total floor reaction force of the generated gait is distributed to each of the foot; actual floor reaction force detecting means for detecting an actual floor reaction force acting on the foot; and foot rotation amount determining means for calculating a moment of the detected actual floor reaction force acting about the calculated foot floor reaction force central point, and for determining a foot rotation amount for rotating the foot based on the calculated moment wherein the correcting means includes: foot rotation amount correcting means for correcting the foot rotation amount based on the calculated floor shape estimation value; and foot position/posture correcting means for correcting the desired position and/or posture of the foot based on the corrected foot rotation amount such that the position/posture of the foot rotates. With this, in addition to the advantages and effects mentioned above, the system can control the floor reaction force acting on the floor, without causing a conflict or interference, easily and appropriately.

The system further includes: gait generating means for generating gait of the robot including at least a motion pattern of the robot including at least the desired position and/or posture of the foot and a desired pattern of a total floor reaction force acting on the robot; desired foot floor reaction force central point determining means for determining a desired foot floor reaction force which is a central point of action on the foot when the total floor reaction force of the generated gait is distributed to each of the foot; actual floor reaction force detecting means for detecting an actual floor reaction force acting on the foot; and foot rotation amount determining means for determining a foot rotation amount for rotating the foot based on the detected actual floor reaction force; wherein the correcting means includes: foot rotation amount correcting means for correcting the foot rotation amount based on the calculated floor shape estimation value; and foot position/posture correcting means for correcting the desired position and/or posture of the foot based on the corrected foot rotation amounts such that the position and/or posture of the foot rotates about the determined foot floor reaction force central point or thereabout. With this, in addition to the advantages and effects mentioned above, the system can control the floor reaction force acting on the floor, without causing a conflict or interference, easily and appropriately.

In the system, the foot position/posture correcting means corrects the desired position and/or posture of the foot based on the corrected foot rotation amounts such that the position and/or posture of the foot rotates about the determined foot floor reaction force central point or thereabout. With this, in addition to the advantages and effects mentioned above, the system can control the floor reaction force acting on the floor, without causing a conflict or interference, easily and appropriately.

The system further includes: foot movement amount determining means for calculating at least one of the total floor reaction force's moment actually acting on the robot, and a moment obtained by subtracting the moment of the detected actual floor reaction force acting about the calculated foot floor reaction force central point, from the total floor reaction force's moment actually acting on the robot, and for determining a foot movement amount for moving the foot based on the calculated moment. With this, in addition to the advantages and effects mentioned above, the system can control the total floor reaction force that is significant in particular in a posture stabilization control, more appropriately.

In the system, the foot position/posture correcting means further corrects the desired position and/or posture of the foot based on an posture error of the robot. With this, in addition to the effects and advantages mentioned above, the system can control the robot posture more stably.

In the system, a compensating total floor reaction force's moment for posture stabilization that is to be added to the desired pattern of the total floor reaction force is determined, and the foot rotation amount determining means and/or the foot movement amount determining means determines the foot rotation amount and/or the foot movement amount based on at least the detected actual floor reaction force and the determined compensating total floor reaction force's moment for posture stabilization. With this, in addition to the advantages and effects mentioned above, the system can control the floor reaction force more appropriately for the robot posture stabilization.

In the system, the compensating total floor reaction force's moment for posture stabilization is determined based on an inclination error of the robot. With this, in addition to the advantages and effects mentioned above, the system can further improve the robot posture stabilization.

In the system, the foot rotation amount determining means and/or the foot movement amount determining means determines the foot rotation amount and/or the foot movement amount such that the determined compensating total floor reaction force's moment for posture stabilization is distributed to each of the legs. With this, in addition to the advantages and effects mentioned above, the system can distribute the load of robot to the plurality of legs appropriately and can prevent the distribution of pressure with the floor from being excessive in a local portion.

The system further includes: gait generating means for generating gait of the robot including at least a motion pattern of the robot including at least the desired position and/or posture of the foot and a desired trajectory pattern of a total floor reaction force acting on the robot; compensating total floor reaction force calculating means for calculating a compensating total floor reaction force for posture stabilization; actual floor reaction force detecting means for detecting an actual floor reaction force acting on the foot; and floor reaction force distributing means for distributing the total floor reaction force of the generated gait and the compensating total floor reaction force; wherein the correcting means corrects the desired foot position and/or posture based on the distributed total floor reaction force of the generated gait and the compensating total floor reaction force, the detected actual floor reaction force and the calculated floor shape estimation value. With this, in addition to the advantages and effects mentioned above, the system can distribute an amount of foot correction more appropriately, thereby enabling to achieve greater force of restoration and the ability of contact with the floor for the robot posture stabilization.

In the system, the compensating total floor reaction force for posture stabilization is calculated based on an inclination error of the robot. With this, in addition to the advantages and effects mentioned above, the system can further improve the robot posture stabilization.

BEST MODES FOR CARRYING OUT THE INVENTION

The floor shape estimation system of a legged mobile robot according to an embodiment of the present invention will be explained with reference to the accompanied drawings. A biped robot is taken as an example of the legged mobile robot.

Figure 1:
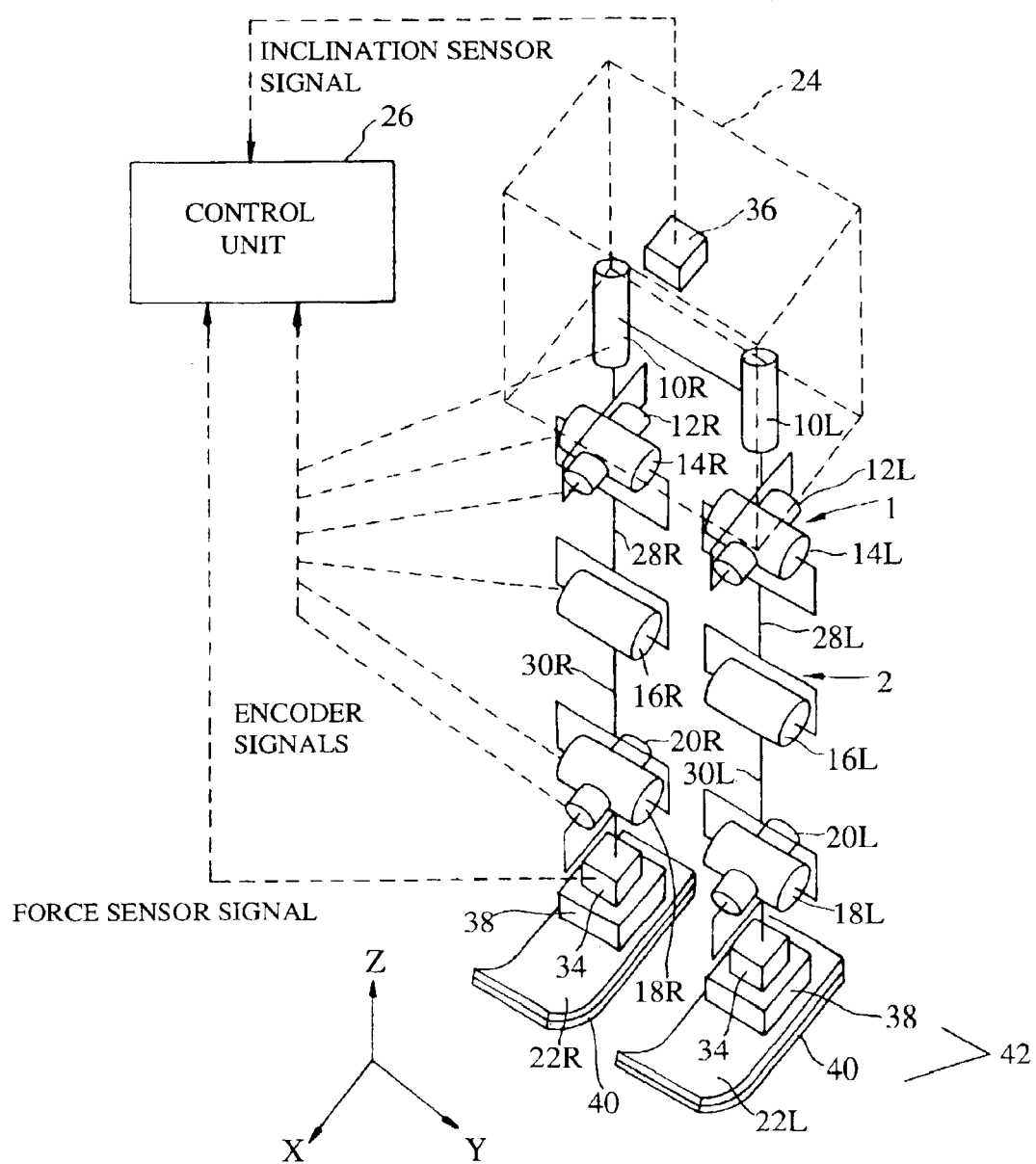
FIG. 1 is a schematic view showing an overall configuration of a legged mobile robot, more specifically a biped walking robot to which a floor shape estimation system of a legged mobile robot according to an embodiment of the present invention is applied.

FIG. 1 is a schematic view showing an overall configuration of the legged mobile robot, more specifically a biped robot to which the floor shape estimation system according to the present invention is applied.

As illustrated in the figure, a biped robot (hereinafter simply referred to "robot") 1 has a pair of right and left legs (leg links) 2 each composed of six joints. (In a simple representation, each of the joints is represented by an electric motor which actuates the joint.) The six joints include, arranged successively downward, a pair of hip joints 10R, 10L (the right-hand joint is indicated by R and the left-hand joint by L) for rotating legs with respect to hips, a pair of hip joints 12R, 12L in the rolling axis (about an X-axis), a pair of hip joints 14R, 14L in the pitching axis (about a Y-axis), a pair of knee joints 16R, 16L in the pitching axis, a pair of ankle joints 18R, 18L in the pitching axis, and a pair of joints 20R 20L in the rolling axis.

The robot is provided with feet 22R, 22L underneath of the joints 18R(L) and 20R(L), and a body (trunk) 24 at its top which houses a control unit 26 comprising microcomputers (explained later). In the above, the joints 10R(L), 12R(L), 14R(L) make up the hip joints, the joint 16R(L) makes up the knee joint, and the joints 18R(L), 20R(L) make up the ankle joints. The hip joints and knee joints are connected to each other by thigh links 28R, 28L, and the knee joints and ankle joints are connected to each other by crus or shank links 30R, 30L.

With the above structure, each of the legs 2 is given six degrees of freedom. When the 6*2=12 joints are driven to suitable angles during walking, a desired motion is imparted to the entire leg structure to cause the robot to walk arbitrarily in a walking environment of three-dimensional (absolute) space. (In the specification, "*" represents multiplication in scalar calculation and outer product in vector calculation.).

It should be noted that the position and velocity of the body 24 indicate the position and its displacement velocity of a predetermined position of the body 24, specifically a representative position such as the position of the center of gravity of the body 24.

As shown in FIG. 1, a known force sensor (more precisely, known as the six-axis force and torque sensor) 34 is disposed at a position below each ankle joint for generating a signal indicative of three directional components Fx, Fy, Fz of force and three directional components Mx, My, Mz of torque or moment thereby of the force and outputs a signal indicative of foot landing and the floor reaction force (the load acting from the floor). Moreover, the body 24 has an inclination sensor 36 which generates a signal indicative of tipping or inclination in the frontal plane with respect to a Z-axis (the vertical direction (the direction of gravity)) and its angular velocity (yaw-rate), and also a tilt in the sagittal plane with respect to the Z-axis and its angular velocity. The electric motors of the respective joints are coupled with respective rotary encoders which generate signals indicative of angular displacements of the electric motors.

Figure 2:
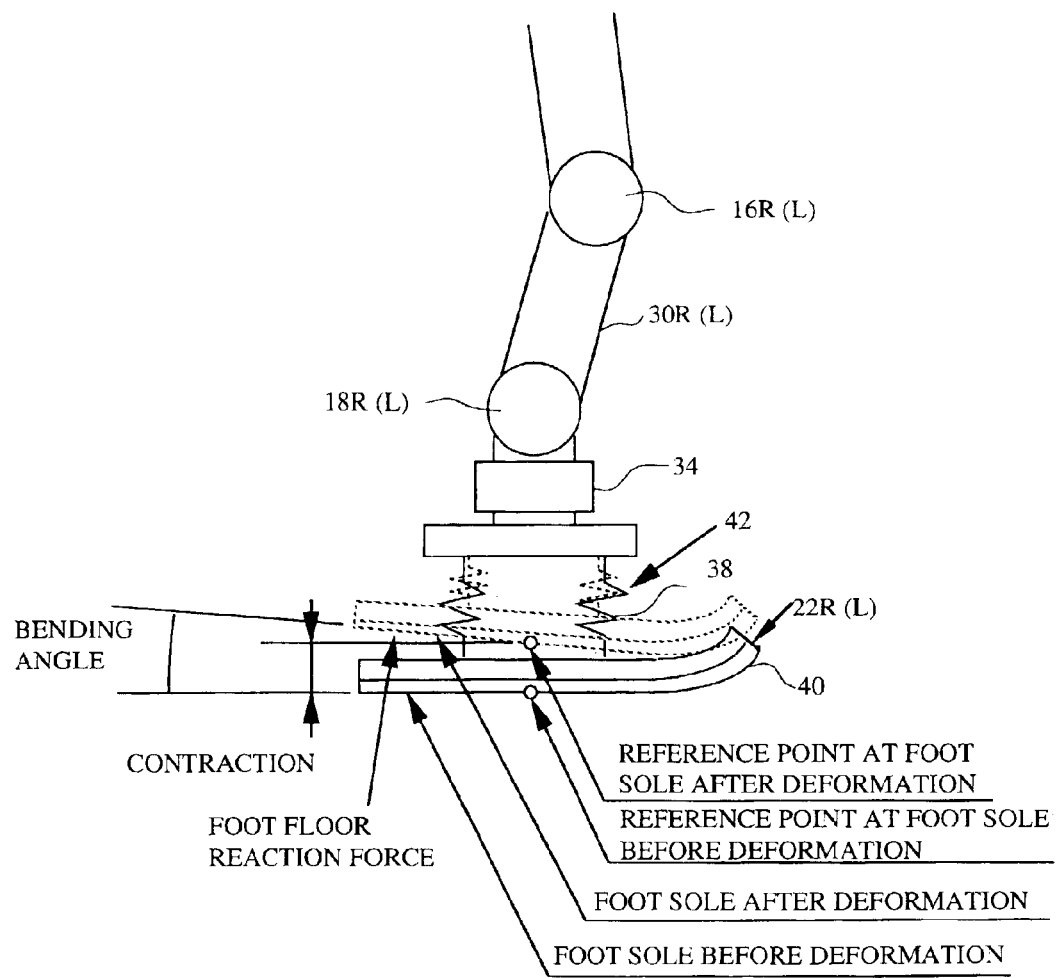
FIG. 2 is an explanatory side view showing the structure of the foot of a biped robot illustrated in FIG. 1.

As illustrated in FIG. 2, a spring mechanism 38 is installed at a position upward from the foot 22R(L), which constitutes a compliance mechanism 42 together with a sole elastic member 40 attached to the sole of the foot 22R(L). The spring mechanism 38 has a box-like guide member (not shown) connected to the foot 22R(L), and a piston member (not shown) connected to the side of the ankle joint 18R(L), 20R(L) and the force sensor 34 and inserted in the guide member with an elastic member such that it moves in the guide member to a slight extent.

In the figure, the foot 22R(L) illustrated in thick lines shows the foot which is not subject to the floor reaction force. When subjected to the floor reaction force, the spring mechanism 32 and the sole elastic member 34, which constitute the compliance mechanism 42, deform such that the foot 22R(L) shifts to the position and/or posture illustrated in dashed lines. This configuration is significant not only for decreasing the foot-landing impact, but also for enhancing the control performance. Since this configuration is disclosed in the aforesaid application (Japanese Laid-Open Patent Application No. Hei 5 (1993)-305, 584), no further explanation will be made.

Although not shown in FIG. 1, a joystick 44 is provided at an appropriate location of the biped robot 1, which enables an operator from the outside to input a request concerning the gait, such as switching from moving forward to turning.

Figure 3:
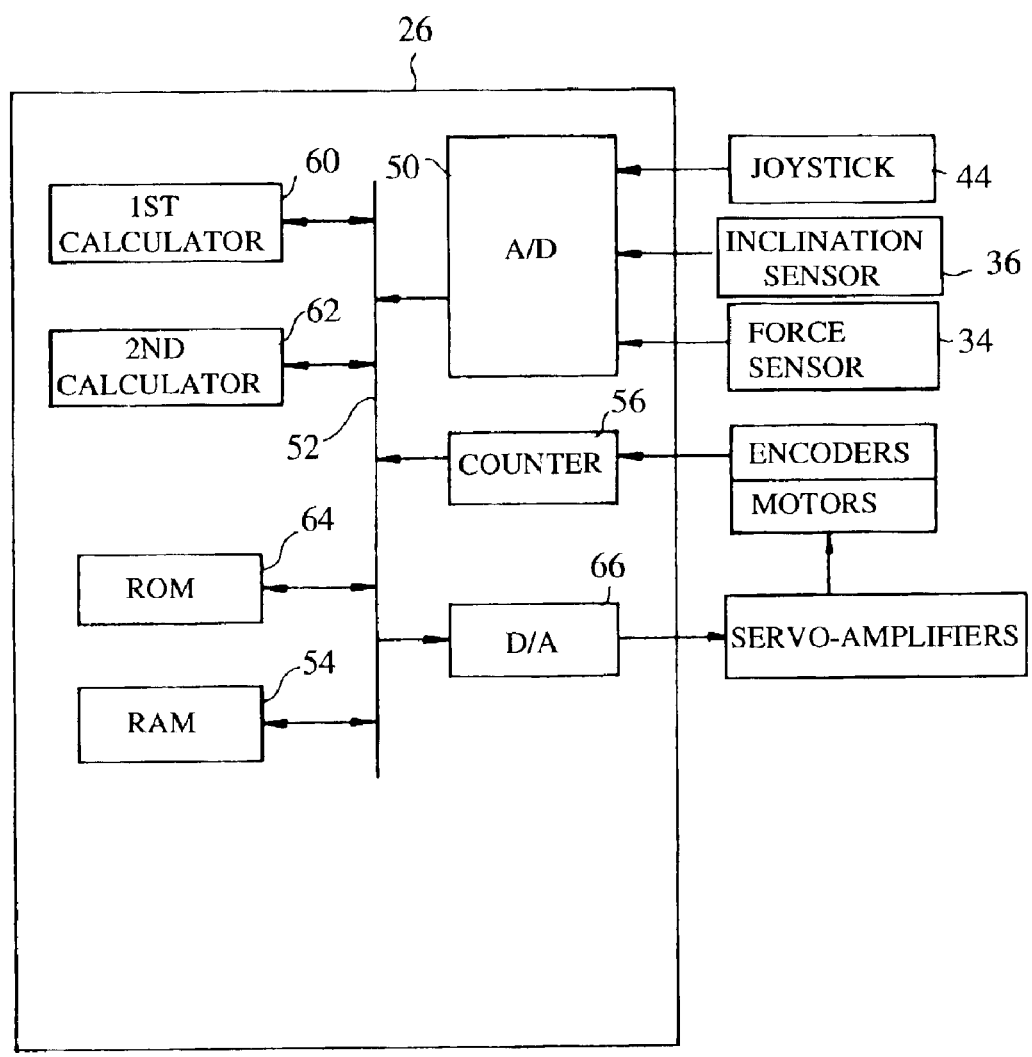
FIG. 3 is a block diagram showing details of a control unit of the robot illustrated in FIG. 1.

FIG. 3 is a block diagram which shows the details of the control unit 26, which is comprised of microcomputers. Outputs from the inclination sensor 36, etc., are converted by an A/D converter 50 into digital signals, which are transmitted through a bus 52 to a RAM 54. Output signals from the rotary encoders that are disposed adjacent to the respective electric motors are transmitted through a counter 56 to the RAM 54.

The control unit 26 includes a first calculator 60 and a second calculator 62 respective of which comprises a CPU. The first calculator 80 estimates the shape of a floor (floor surface) with which the robot 1 is in contact as will be explained later, calculates joint angle displacement commands as will be explained later, and outputs the same to the RAM 54. The second calculator 62 reads the desired command values and the detected joint angles from the RAM 74, and calculates values (manipulated variables) and outputs the same through a D/A converter 86 and servo-amplifiers to the electric motors which drive the respective joints.

Briefly explaining the floor shape estimation system of a legged mobile robot according to this embodiment, it is an improvement of the technique described in Japanese Laid-Open Patent Application No. Hei 6(1994)-31658 proposed by the applicant. Specifically, the system is a development obtained by expanding the technique described in Japanese Laid-Open Patent Application Hei 6(1994)-31658, based on the technique described in Japanese Laid-Open Patent Application No. Hei 10(1998)-277969 proposed by the applicant earlier.

More specifically, in the technique proposed by 6 (1994)-31658, based on a control error of the total floor reaction force's moment about a ZMP, a foot-to-foot inclination difference is estimated during the two-leg supporting period to correct a feet compensating angle, whereas a foot floor inclination difference is estimated during the one-leg supporting period to correct a foot compensating angle. (Since the ankle joint angle is corrected in the technique mentioned in 6(1994)-31658, strictly speaking, it is different from the correction of the foot compensating angle. Nevertheless, they are treated as almost the same in this discussion.)

It should be noted here that the ZMP (Zero Moment Point) is defined as follows: Namely, obtaining the resultant force of the force of inertia and the gravity generated by a motion pattern (trajectory), if the moment, except for the vertical moment component, of the obtained resultant force about a certain point of action on the floor (floor surface) is zero.

On the contrary, in the floor shape estimation system of a legged mobile robot according to this embodiment, the floor shape, more specifically a foot-to-foot floor inclination difference is estimated based on at least a control error of a total floor reaction force's moment (or a difference obtained by subtracting another control error of foot floor reaction force's moment about a desired foot floor reaction force central point therefrom). Further, in this system, the feet compensating angle is corrected by the estimated value, if needed. Further, in this system, another floor shape, more specifically a foot floor inclination difference is estimated based on at least a control error of the foot floor reaction force's moment about the desired foot floor reaction force central point. Further, in this system, the foot compensating angle is corrected based on the estimated value, if needed. As a result, this system can accurately estimate the foot floor inclination difference during the two-leg supporting period and can correct the foot compensating angle by the estimated value.

Further, in the estimation of the foot-to-foot floor inclination difference and the foot floor inclination difference, by using a mechanism compliance model which models the compliance mechanism 42 and expresses the relationship of deformation of the leg (leg links) 2 by the floor reaction force, a better control performance can be obtained which would not be achieved in the prior art technique in which the steady-state error is decreased by incorporating integration into a control law. A mere incorporation of an integral value into a control law may result in a phase lag. However, in the system according to the embodiment, similar to a case in which an observer is used, no delay occurs in the control.

Aside from the above, the prior art technique proposed in 10 (1998)-277969 aims to restore a stable posture by controlling the floor reaction force appropriately, when the robot loses posture stabilization on a floor having an unexpected slant or bump.

Specifically, if the robot (which is controlled to walk in accordance with a gait that has been generated based on the supposition that a floor on which the robot walks is flat) lands its foot on an unexpected bump, the robot is suffered from an excessive floor reaction force and tilts. In order to solve this problem, the applicant proposed in another technique (described in Japanese Laid-Open Patent Application No. Hei 5 (1993)-305586), using the aforesaid compliance mechanism 42, detecting the inclination of the body by the inclination sensor to calculate a required moment necessary for restoring the tilted posture and controlling each foot to move up and down such that an actual total floor reaction force's moment component about the desired total floor reaction force central point (i.e., the desired ZMP) becomes equal to the required moment.

However, that control can effectively cope with an unexpected slant or undulation extending over a relatively wide area, but can not cope with an unexpected local slant or level difference sufficiently.

Further, the applicant proposes in a still another technique (described in Japanese Laid-Open Patent Application No. Hei 5(1993)-305584)) controlling the ankle joints 18R(L), 20R(L) to move in a direction in which the unexpected floor reaction force is canceled, similarly utilizing the aforesaid compliance mechanism 42.

It would be possible to combine the two kinds of the controls to cope with the situation when the robot loses its stable posture due to an unexpected floor undulation or inclination. Disadvantageously, if doing so, the controls may conflict with each other.

In order to avoid such a conflict in control, it is proposed in the technique proposed earlier (i.e., 10(1998)-277969) controlling the floor reaction force appropriately when the robot loses a stable posture due to the change in the shape of floor such as a local slant or inclination.

Since the floor inclination estimation system according to the embodiment is based on the aforesaid technique proposed in 10(1998)-277969, for the ease of understanding, this technique (10-277969) will first be explained. This technique (10(1998)-277969) will hereinafter referred to as a "composite compliance control".

Figure 4:
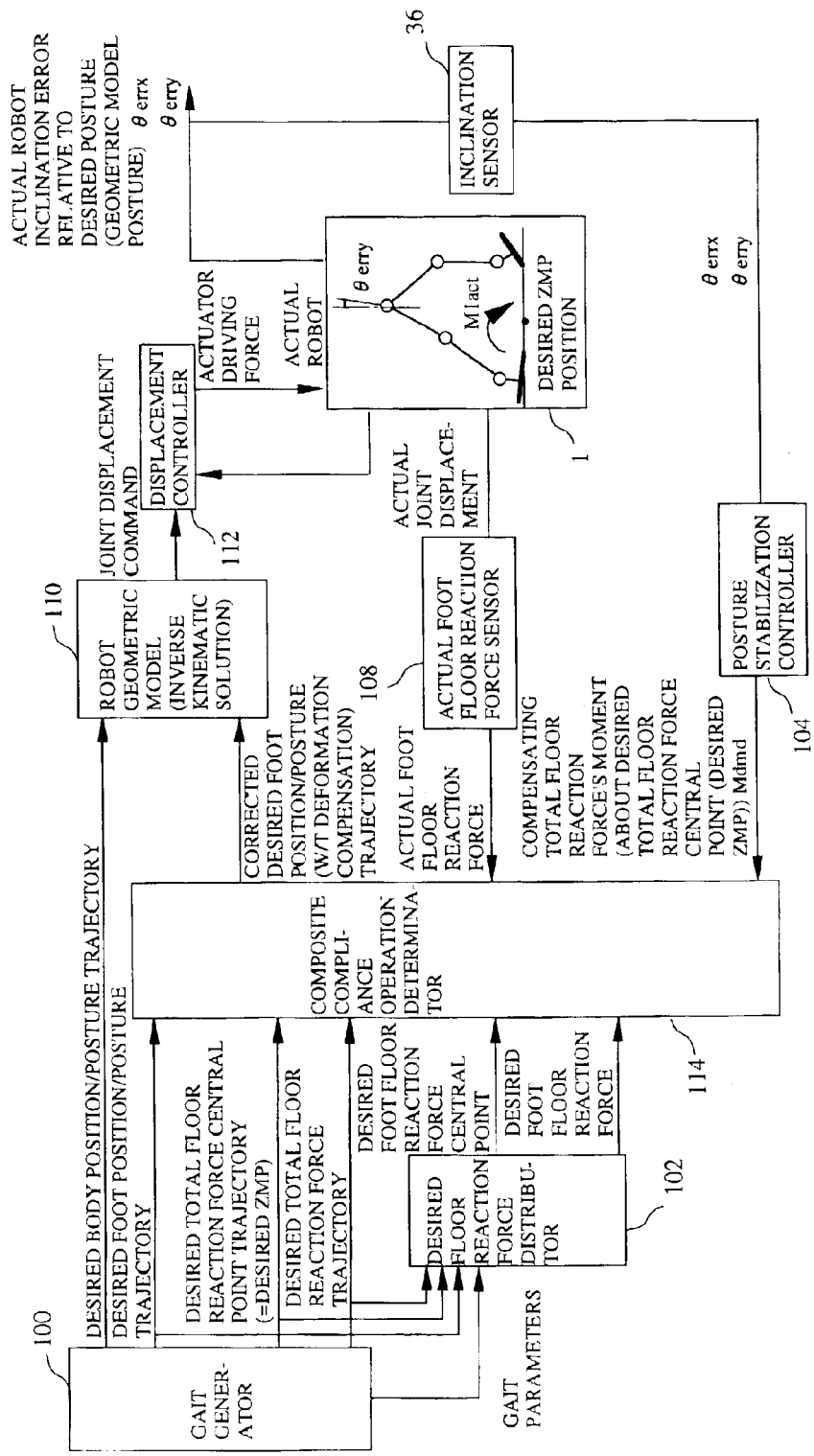
FIG. 4 is a block diagram showing the configuration and operation of the control system of a legged mobile robot proposed earlier and the floor shape estimation system of a legged mobile robot according to the embodiment of present invention, in a functional manner.

FIG. 4 is a block diagram showing the configuration and operation of the system for the composite compliance control in a functional manner.

Before entering the explanation of the figure, terms used in the composite control will be defined. (Terms not defined in the following are the same as those defined in a separate application (Japanese Patent Application No. Hei 10(1998)-86081) proposed by the applicant.)

The term "gait" is used to indicate, different from that usually defined in the field of robotics engineering, what includes the desired motion pattern and the floor reaction force pattern. The floor reaction force may be partial information such as "only the ZMP trajectory". In other words, the term "gait generator" should not be used in the situation when only the desired motion pattern, and not the information concerning the floor reaction force pattern is outputted.

Each of the feet is assigned with a reference numeral. The floor reaction force acting on n-th leg (n: 1 or 2) is called a "n-th foot floor reaction force". The resultant force of all of the foot floor reaction forces acting both feet (legs) is called a "total floor reaction force". (Although, it is simply called the floor reaction force in the field of robotics engineering, it is called the "total floor reaction force" here in order to distinguish from the (n-th) foot floor reaction force.)

The foot floor reaction force is described by a point of action and the force and the moment of force acting thereat. A combination of descriptions will accordingly be innumerable for a certain floor reaction force. The innumerable combinations of descriptions will surely include the combination of descriptions indicating that the moment components other than that about the vertical axis are zero and the point of action is on the floor. The point of action in this combination of descriptions is called the "foot floor reaction force central point". (This was called "the center of contact-pressure" in Japanese Laid-Open Patent Application Hei 6 (1994)-79657 proposed by the applicant (referred to later)).

Similarly, the total floor reaction force is described by a point of action and the force and the moment of force acting thereon. A combination of descriptions will accordingly be innumerable for a given total floor reaction force. The innumerable number of combinations of descriptions will surely include the combination of descriptions indicating that the moment components other than that about the vertical axis are zero and the point of action is on the floor surface. The point of action in this combination of descriptions is called the "total floor reaction force central point". The "floor surface" in this specification includes a vertical floor described in Japanese Laid-Open Patent Application No. Hei 5(1993-318340).

A desired value of the total floor reaction force is called the "desired total floor reaction force". The desired total floor reaction force is the total floor reaction force which normally balances dynamically with the desired motion pattern. Accordingly, the desired total floor reaction force central point is normally equal to the desired ZMP.

A desired value of the ZMP (Zero Moment Point) is called a "desired ZMP (Zero Moment Point)". The desired ZMP can solely be determined unless the vertical force component of the resultant force is zero. The term "desired ZMP" is often used in this specification for ease of understanding. However, strictly speaking, the term "desired total floor reaction force central point" should instead be used.

A desired value of the foot floor reaction force is called "desired foot floor reaction force". Different from the desired total floor reaction force, the desired foot floor reaction force can not be determined solely even when the desired motion pattern has been determined. Total floor reaction force actually acting on the robot is called an "actual total floor reaction force". Floor reaction force actually acting on each foot of the robot is called an "actual foot floor reaction force"

Based on the above, the entire configuration of the composite compliance control system will be explained with reference to FIG. 4.

The composite compliance control system includes a gait generator 100 which generates the desired gait and outputs the same. As will be understood from the definition mentioned above, the desired gait comprises the desired motion pattern and the desired floor reaction force pattern, more specifically, a desired body position and/or posture trajectory, a desired feet position and/or posture trajectory, a desired total floor reaction force central point (desired ZMP) trajectory and a desired total floor reaction force trajectory (or pattern). Thus, the desired floor reaction force pattern includes the desired total floor reaction force central point trajectory. (It suffices if the desired floor reaction force pattern merely has the desired total floor reaction force central point trajectory, when deformation compensation (mechanism-deformation compensation), explained later, is not involved.)

In this embodiment, the desired total floor reaction force outputted by the gait generator 100 is the total floor reaction force which dynamically balances with the desired motion pattern. Accordingly, the desired total floor reaction force central point is equal to the desired ZMP.

Figure 5:
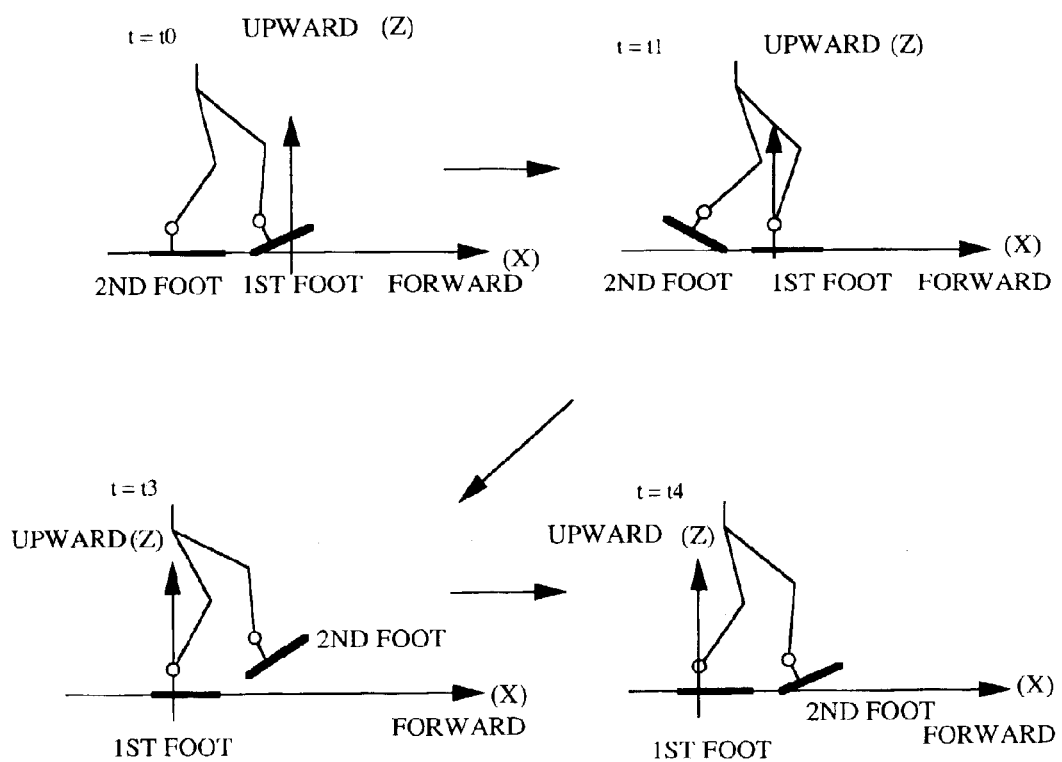
FIG. 5 are explanatory views showing one example of the motion pattern of the robot illustrated in FIG. 1 when it walks on a flat floor.
Figure 6:
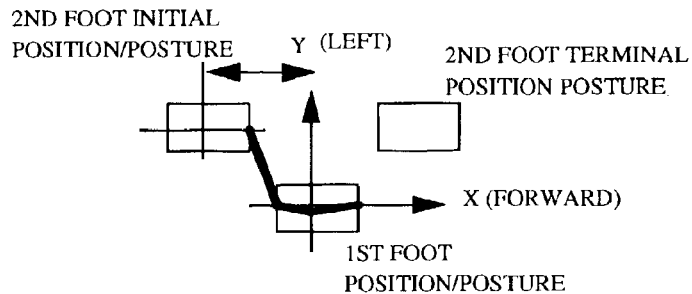
FIG. 6 is an explanatory plan view showing the trajectory on floor surface of a desired total floor reaction force central point (desired ZMP) corresponding to the motion pattern illustrated in FIG. 5.
Figure 7:
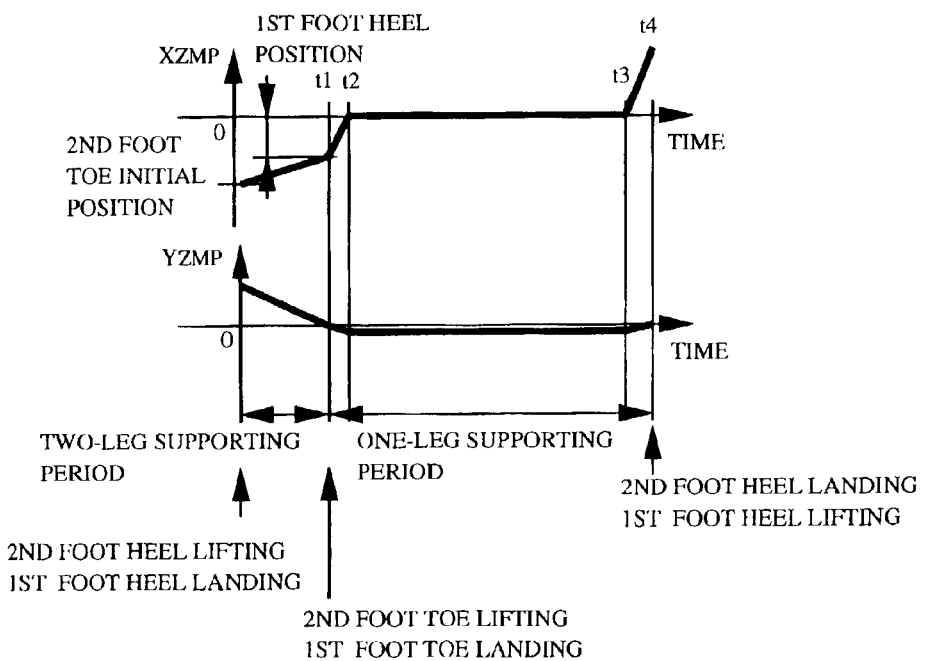
FIG. 7 is a time chart showing the trajectory of the desired total floor reaction force central point (desired ZMP) corresponding to the motion pattern illustrated in FIG. 5.

FIG. 5 shows one example of motion pattern when the robot 1 walks on a flat floor. FIG. 6 shows the trajectory of the desired ZMP on the floor corresponding thereto, and FIG. 7 shows a time chart corresponding thereto. The foot which is kept in contact with the floor during the illustrated gait period is to be named a "1st foot", while the other is to be named a "2nd foot".

Returning to the explanation of FIG. 4, the system includes a desired floor reaction force distributor 102 which receives the desired total floor reaction force central point (desired ZMP) and the desired feet position and/or posture as main inputs, and determines and outputs the desired foot floor reaction force central point. Practically, if required, it may also input, from the gait generator 100, gait parameters (such as a period of time of two-leg supporting period and desired landing position of free leg foot) or a period of time and time of gait (such as the current time is 0.1 sec. after the beginning of the two-leg supporting period).

As regards the gait such as illustrated in FIG. 5, the desired floor reaction force distributor 102 determines the desired foot floor reaction force central point such that it satisfies the following conditions:

Condition 1) The desired foot floor reaction force central point trajectory is continuous.

Condition 2) During the two-leg supporting period, the desired 1st foot floor reaction force central point exists at its heel, whereas the desired 2nd foot floor reaction force central point exists at its toe.

Condition 3) The desired total floor reaction force central point exists, at that instant, on a line connecting the desired 1st foot floor reaction force central point and the desired 2nd foot floor reaction force central point.

Condition 4) During the one-leg supporting period, the desired 1st foot floor reaction force central point is equal to the desired total floor reaction force central point.

Condition 5) During the one-leg supporting period, the desired 2nd foot floor reaction force central point shifts from the toe to the heel.

Figure 8:
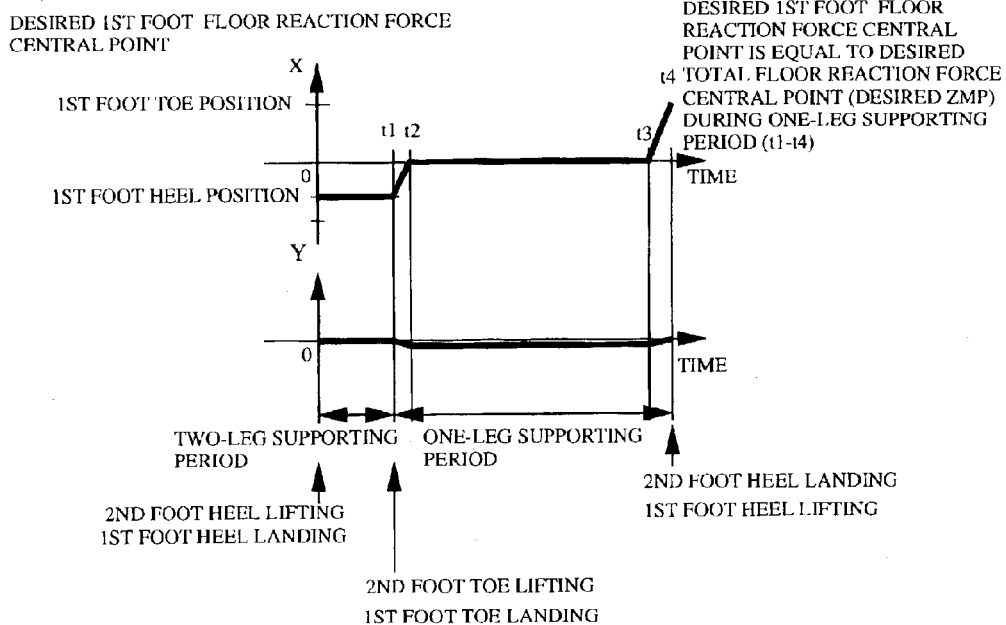
FIG. 8 is a time chart showing the trajectory of a desired 1st foot floor reaction force central point, which is set to satisfy predetermined conditions, corresponding to the motion pattern illustrated in FIG. 5.
Figure 9:
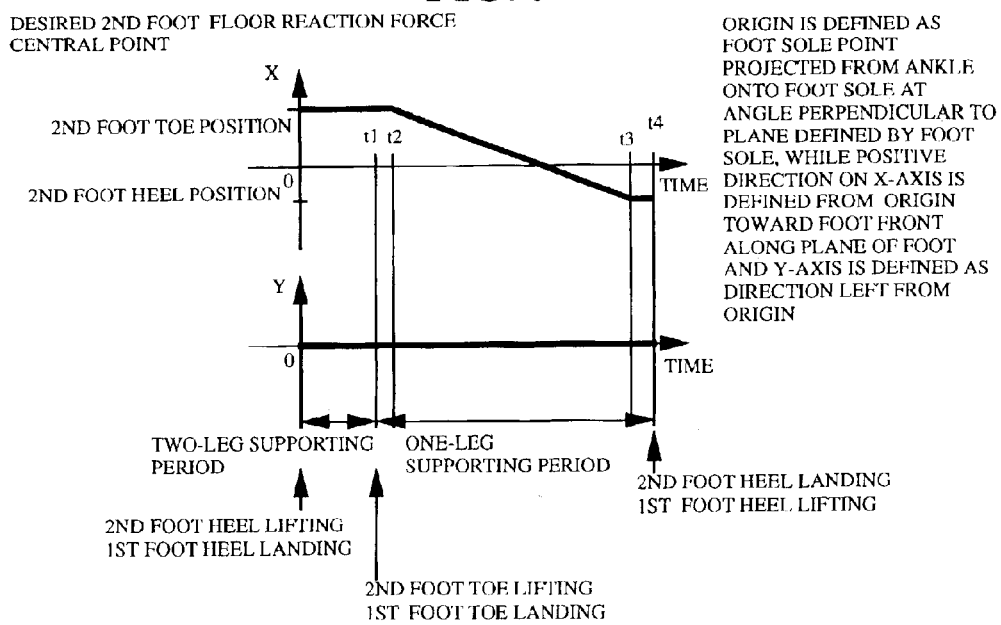
FIG. 9 is a time chart showing the trajectory of the desired 2nd foot floor reaction force central point, which is set to satisfy the predetermined conditions, corresponding to the motion pattern illustrated in FIG. 5.

FIG. 8 shows a time chart of the desired 1st foot floor reaction force central point trajectory satisfying these conditions, whilst FIG. 9 shows that of the 2nd foot floor reaction force central point trajectory. In the figures, the origin is defined as the point of foot, more precisely on a sole of the foot, projected from the ankle (joints 18R(L), 20R(L)) onto the sole of the foot 22R(L) at the angle perpendicular to the plane defined by the sole of foot, whilst the positive direction on the X-axis is defined as the direction from the origin towards the front of the foot and along the plane defined by the foot, and the positive direction on the Y-axis is defined as the direction to the left of the foot from the origin as shown in FIG. 1.

Additionally, the desired floor reaction force distributor determines 102 outputs the desired foot floor reaction force. The desired foot floor reaction force is necessary for the deformation (bent) compensation (mechanism-deformation compensation) of the compliance mechanism 42.

If the desired foot floor reaction force is determined to be corresponding to the desired foot floor reaction force central point, determined in the manner mentioned above, using the following equation, it will satisfy a condition that the resultant force of all of the desired foot floor reaction forces of the feet must be equal to the desired total floor reaction force.

> Desired 1st foot floor reaction force=Desired total floor reaction force*(Distance between the desired 2nd foot floor reaction force central point and the desired ZMP)/(Distance between the desired 1st foot floor reaction force central point and the desired 2nd foot floor reaction force central point)
>
> Desired 2nd foot floor reaction force=Desired total floor reaction force*(Distance between the desired 1st foot floor reaction force central point and the desired ZMP)/(Distance between the desired 1st foot floor reaction force central point and the desired 2nd foot floor reaction force central point)  Eq. 1

Since the desired foot floor reaction force changes continuously, it is suitable for achieving a walking with small foot-landing impact. The details of the above is described in an application (Japanese Laid-Open Patent Application Hei 6 (1994)-79657) proposed by the applicant.

Returning to the explanation of FIG. 4, the system includes a posture stabilization controller 104 which estimates the conditions of the robot 1 based on the sensed information of the robot and calculates a compensating total floor reaction force. Explaining this, even if joint displacement can be controlled to effect a desired joint displacement completely by a displacement controller (explained later) when the robot 1 walks or stand upright, the robot position and/or posture will not always be a desirable position and/or posture.

Accordingly, in order to stabilize posture of the robot 1 over a long period of time, it needs to determine the force and moment necessary for restoring desirable robot position and/or posture, and to additionally generate the determined force and moment at the desired total floor reaction force central point (desired ZMP) as the point of action. The additional force and moment is called a "compensating total floor reaction force". The moment component of the compensating total floor reaction force is called a "compensating total floor reaction force's moment".

Aside from the above, assuming that a desired gait of the legged mobile robot is subject to a reaction force, other than the floor reaction force, from an object in the environment, naming this reaction force "reaction force from object", for example, the aforesaid definition of the desired ZMP may be extended as follows. That is; obtaining the resultant force of the force of inertia, the gravity and the reaction force from the object generated by the desired motion pattern, if this moment, except for the vertical component, of the obtained resultant force about a certain point of action on the floor surface is zero, the point of action may newly be defined as the "desired ZMP".

Assuming that the robot 1 is completely rigid and joint displacement can be controlled to track desired joint displacement perfectly, a perturbative motion of the position and/or posture of entire of the robot due to deformation of the compliance mechanism 42 can be decomposed to the following six degrees of freedom:

Mode 1) Rotation about the desired total floor reaction force central point (desired ZMP) around the back-and-forth-axis (i.e., tilting in the-left-and-right direction).

Mode 2) Rotation about the desired total floor reaction force central point (desired ZMP) around the left-and-right-axis (i.e., tilting in the back-and-forth direction).

Mode 3) Vertical rotation about the desired total floor reaction force central point (desired ZMP) (i.e., spinning).

Mode 4) Parallel-translational swinging in the back-and-forth direction.

Mode 5) Parallel-translational swinging in the left-and-right direction.

Mode 6) Parallel-translational swinging in the vertical direction.

Among of these modes, the swingings of Mode 4 and Mode 5 occur with the deformation of the compliance mechanism 42 when it suffers from shearing force in the back-and-forth and left-and-right directions. Since the compliance mechanism 42 is prefabricated to have high stiffness in the direction of shearing, this kind of swinging is small, influencing on the walking little.

Since Mode 3 and Mode 6 do not have direct relationship with this explanation, controls for Mode 1 and Mode 2 will be discussed. The controls for Mode 1 and Mode 2 are quite important, since, but for these controls, the robot may probably tilt.

The manipulated variable for controlling the rotation of mode 1 is a moment component about the back-and-forth axis (X-axis) of the compensating total floor reaction force. The manipulated variable for controlling the rotation of Mode 2 is the moment component about the left-and-right axis (Y-axis) of the compensating total floor reaction force. Among the moment components of the compensating total floor reaction force, accordingly, it suffices if the moment component about the back-and-forth axis and that about the left-and-right axis are determined. Since the rest of the moment components are not used in this embodiment (and a second embodiment), they are set to zero.

From now on, the following definitions will be used. The moment component of compensating total floor reaction force is called a "compensating total floor reaction force's moment Mdmd" (more precisely, compensating total floor reaction force's moment Mdmd about the desired total floor reaction force central point (desired ZMP)). As illustrated in FIGS. 5 and 6, a coordinate system taking the X-axis in the robot forwarding direction, the Y-axis in the robot left side direction and the Z-axis in the vertical direction and having the origin which is set at a point on the floor surface immediately below the 1st foot ankle, is called a "supporting-leg coordinates system". Unless otherwise determined, the position, the force and the moment are expressed in accordance with this coordinate system. X-component of Mdmd is named a "Mdmdx", Y-component thereof is named a "Mdmdy" and Z-component thereof is named a "Mdmdz". X-component of an inclination error θ err of the body 24 (i.e., actual body inclination—desired body inclination) is named "θ errx", Y-component thereof is named a "θ erry", and their time differentials are named "(dθ errx/dt)" and "(dθ erry/dt)".

Mdmdx and Mdmdy are determined in accordance with, for example, a control law mentioned in the following equation:

$$Mdmdx = -Kthx\ \theta\ errx - Kwx\ (d\theta\ errx/dt)$$
$$Mdmdy = -Kthy\ \theta\ erry - Kwy\ (d\theta\ erry/dt) \qquad \text{Eq. 2}$$

In the above, Kthx, Kthy, Kwx and Kwy are control gains for body inclination stabilization.

The composite compliance operation determinator acts such that the actual total floor reaction force becomes equal to the resultant force of the desired total floor reaction force and the compensating total floor reaction force, as will be explained later.

Returning to the explanation of FIG. 4, the system includes an actual foot floor reaction force detector 108 which detects the actual foot floor reaction force through the output of the force sensor 34. (The resultant force of the sum of the foot floor reaction forces is the actual total floor reaction force.) Moreover, based on the actual joint displacements obtained from the joint rotary encoders (or based on the joint displacement commands), the actual foot floor reaction force detector calculates each foot position and/or posture relative to the coordinate system fixed on the body 24, then conducts coordinate-transformation of the detected values obtained by the force sensor 34 to calculate the actual foot floor reaction force in the coordinate system fixed at the body, and converts the calculated values into those in the supporting leg coordinate system.

The system includes a robot geometric model (inverse kinematic solution) 110, which, upon receipt of the body position and/or posture and the feet position and/or posture, calculates respective joint displacements satisfying them. Since the degrees of freedom per leg are 6 in the robot 1 in this embodiment, the respective joint displacements are determined solely.

In this configuration, equations of the inverse kinematic solution are directly prepared beforehand such that the respective joint displacements are immediately obtained if the body position and/or posture and the foot position and/or posture are put in the equations. More specifically, the robot geometric model 10 inputs the desired body position and/or posture and a corrected desired foot position and/or posture trajectory (a corrected desired feet position and/or posture with deformation compensation) corrected by the composite compliance operation determinator, and calculates joint displacement commands for the 12 joints (including 10R(L), etc.).

The system includes a displacement controller 112 (corresponding to the aforesaid 2nd calculator 62), which controls displacements of the 12 joints of the robot 1 to track or follow the joint displacement commands calculated by the robot geometric model (inverse kinematic solution) 110.

The system includes the aforesaid composite compliance operation determinator 114, which corrects the desired foot position and/or posture trajectory to satisfy the following two demands:

Demand 1) In order to control robot position and/or posture, the actual total floor reaction force should be controlled to track the resultant force of the compensating total floor reaction force (i.e., the moment Mdmd) outputted by the posture stabilization controller 104 and the desired total floor reaction force. If only the robot posture inclination should be controlled, the horizontal direction's moment component of the actual total floor reaction force about the desired total floor reaction force central point should solely be controlled to track the compensating total floor reaction force's moment Mdmd.

Demand 2) In order to ensure the floor-contactability of each foot, the absolute value of the actual foot floor reaction force's moment about the desired foot floor reaction force central point should be decreased as much as possible.

Incidentally, in most situations, it is physically impossible to bring each of the actual moment of foot floor reaction force about the desired foot floor reaction force central point to be zero, while causing the actual total floor reaction force to be equal to the resultant force of the compensating total floor reaction force and the desired total floor reaction force. It will accordingly be difficult to completely satisfy both Demand 1) and Demand 2), and some compromise should therefore be needed.

Based on the above, the operation of the system will be explained with reference to the flow chart (structuralized flow chart) of FIG. 10. The left of the flow chart indicates the elements illustrated in FIG. 4 which conduct the procedures corresponding to those mentioned in the steps mentioned at the right of the flow chart.

The program begins in S10 in which the system is initialized and proceeds, via S12, to S14 in which timer interrupt is waited for. The timer interrupt is executed once every 50 msec. Thus, the control cycle is 50 msec.

Then, the program proceeds to S16 in which it is determined whether it is at gait switching, more specifically, it is determined whether it is at switching of supporting leg. If the result is negative, the program proceeds to S22. If the result is affirmative, the program proceeds to S18 in which a timer t is initialized, and to S20 in which the desired gait parameters are set. As mentioned above, the gait parameters comprise the motion parameters and the floor reaction force parameters (i.e., the ZMP trajectory parameters).

The program proceeds to S22 in which instantaneous values of the desired gait are determined. Here, the "instantaneous values" indicate values at each control cycle. The instantaneous values of the desired gait comprise the desired body position and/or posture, the desired foot position and/or posture, and the desired ZMP position. Here, the "posture" indicates "direction or orientation" in the X, Y, Z space or environment.

The program then proceeds to S24 in which the desired foot floor reaction force central point is determined. This is done in the manner explained with reference the desired floor reaction force distributor. Specifically, this is done by determining the value of the set desired foot floor reaction force central point trajectory at the current time t, as illustrated in FIGS. 8 and 9.

The program then proceeds to S26 in which the desired foot floor reaction force of each foot is determined. This is done by calculating the desired foot floor reaction force using Eq. 1, mentioned in the explanation of the desired floor reaction force distributor.

The program then proceeds to S28 in which the conditions of the robot such as the inclination of the body 24 are detected using the outputs of the sensors including the inclination sensor 36.

The program then proceeds to S30 in which the compensating total floor reaction force's moments Mdmdx, Mdmdy (about the desired total floor reaction force central point (desired ZMP)) for posture stabilization are determined based on the detected conditions, etc. More specifically, the compensating total floor reaction force's moments Mdmdx, Mdmdy are determined in accordance with Eq. 2.

The program then proceeds to S32 in which the actual foot floor reaction force is detected for each foot. This is done from the output of the force sensor 34, as mentioned above.

The program then proceeds to S34 in which a feet compensating angle θ dbv and a foot compensating angle θ nx(y) for each foot are determined. This procedure is done by the aforesaid composite compliance operation determinator 114.

Figure 11:
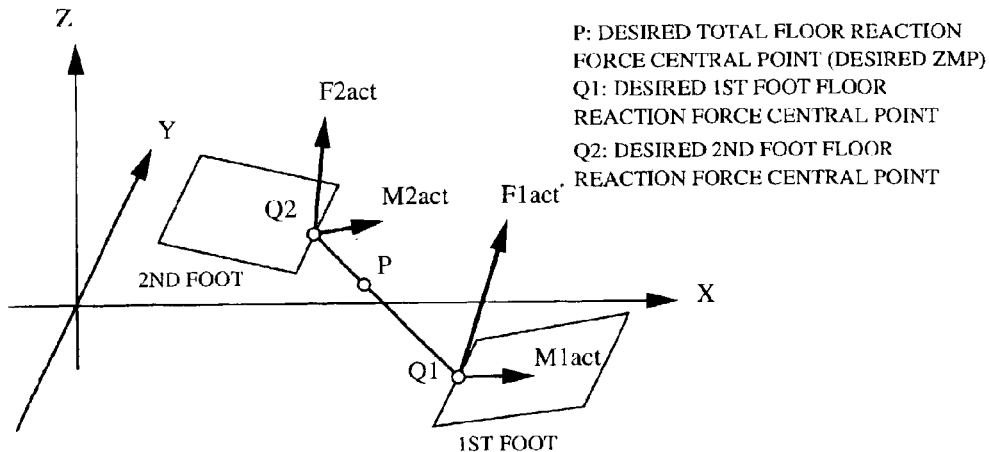
FIG. 11 is an explanatory view showing a situation that actual foot floor reaction force acts on each of the 1st foot and the 2nd foot during the two-leg supporting period, for explaining the operation of a composite compliance operation determinator illustrated in FIG. 4 which conducts calculations of a feet compensating angle, etc., referred to in the flow chart of FIG. 10.

The procedures to be done by the composite compliance operation determinator 114 will be explained. For ease of explanation, it is assumed that it is in a situation where the actual foot floor reaction force acts respectively on the 1st foot 22R(L) and the 2nd foot 22L(R) in the two-leg supporting period, as illustrated in FIG. 11.

Here, a vector Fnact indicates a force component of the n-th foot floor reaction force, and a vector Mnact indicates a moment component of the n-th foot floor reaction force. The direction of vector Mnact indicates that the moment acts from the floor to the foot clockwise with respect to the vector direction.

Figure 12:
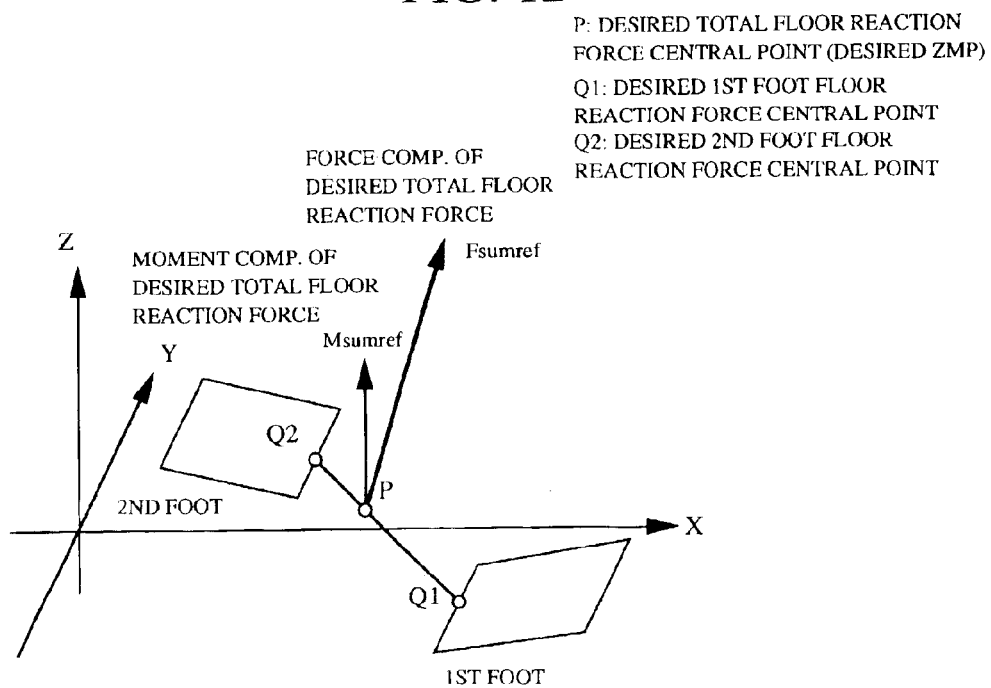
FIG. 12 is an explanatory view showing setting of the desired total floor reaction force in the situation illustrated in FIG. 11.
Figure 13:
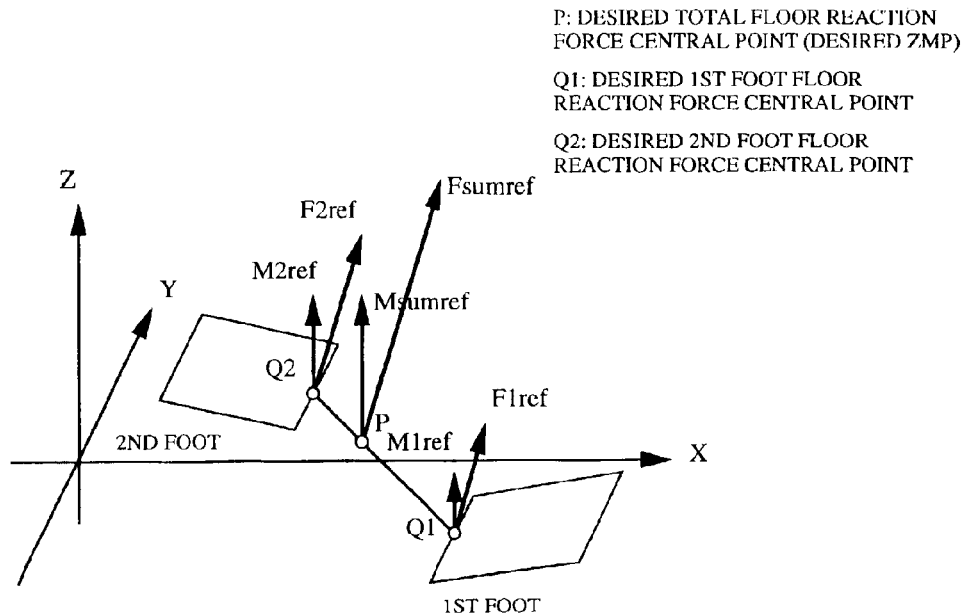
FIG. 13 is an explanatory view showing distribution of the desired foot floor reaction force in the situation illustrated in FIG. 11.

The desired total floor reaction force at this instant is assumed to be as shown in FIG. 12. Notably, a vector Msumref indicative of a desired total floor reaction force's moment about the desired total floor reaction force central point (desired ZMP) is vertical. (This is because the desired ZMP is a floor surface point at which the horizontal component of desired total floor reaction force's moment is zero from the definition mentioned above.) When the desired total floor reaction force is distributed to or divided into the respective desired foot floor reaction forces in accordance with Eq. 1, the result will be that as shown in FIG. 13. In the figure, a vector Fnref indicates a force component of the desired n-th foot floor reaction force. A vector Mnref indicates the moment component of desired n-th foot floor reaction force. The expression of the direction of vector Mnref is the same as that of Mnact.

For ease of explanation, it is assumed that the robot is about to turn over backward to the left.

Figure 14:
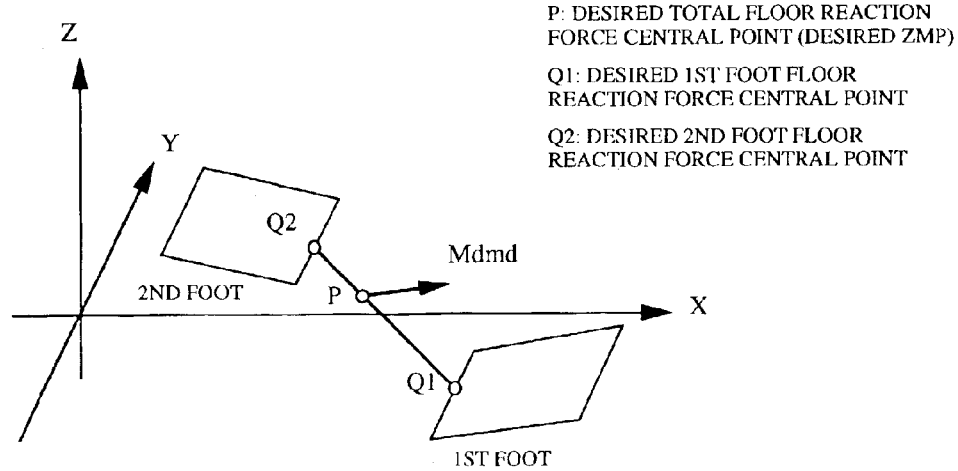
FIG. 14 is an explanatory view showing a compensating total floor reaction force's moment in the situation illustrated in FIG. 11.

The aforesaid posture stabilization controller 104 calculates the compensating total floor reaction force's moment Mdmd based on the detected body inclination errors θ errx, θ erry of the robot 1. In this embodiment, since the spinning about the vertical axis (Z-axis) is not controlled, the vertical component of the compensating total floor reaction force's moment Mdmd is zero. FIG. 14 shows the compensating total floor reaction force's moment Mdmd for the assumed condition.

In order to restore the posture, it suffices if the horizontal component of the actual total floor reaction force's moment about the desired total floor reaction force central point (desired ZMP) is controlled to track a horizontal component of the sum of the desired total floor reaction force's moment Msumref and the compensating total floor reaction force's moment Mdmd.

The horizontal component of desired total floor reaction force's moment Msumref is zero at the desired total floor reaction force central point (desired ZMP). Accordingly, in order to restore the posture inclination in the back-and-force or left-and-right direction, it suffices if the horizontal component of the actual total floor reaction force's moment about the desired ZMP is controlled to track the horizontal component of Mdmd.

In this embodiment, the composite compliance operation determinator 114 corrects the foot position and/or posture so as to satisfy the following demands (once mentioned in the above) as much as possible:

Demand 1) In order to conduct stabilization-control of the robot posture inclination, the horizontal components (X-axis and Y-axis) of the actual total floor reaction force's moment about the desired total floor reaction force central point (desired ZMP) should be controlled to track the horizontal components of the compensating total floor reaction force's moment Mdmd.

Demand 2) In order to ensure the floor-contactability of each foot, the absolute value of the actual foot floor reaction force's moment about the desired foot floor reaction force central point should be decreased as much as possible.

As mentioned above, it is impossible to satisfy both Demand 1) and Demand 2) and hence, some compromise is needed.

In this embodiment, the correction of foot position and/or posture is conducted as follows.

Figure 15:
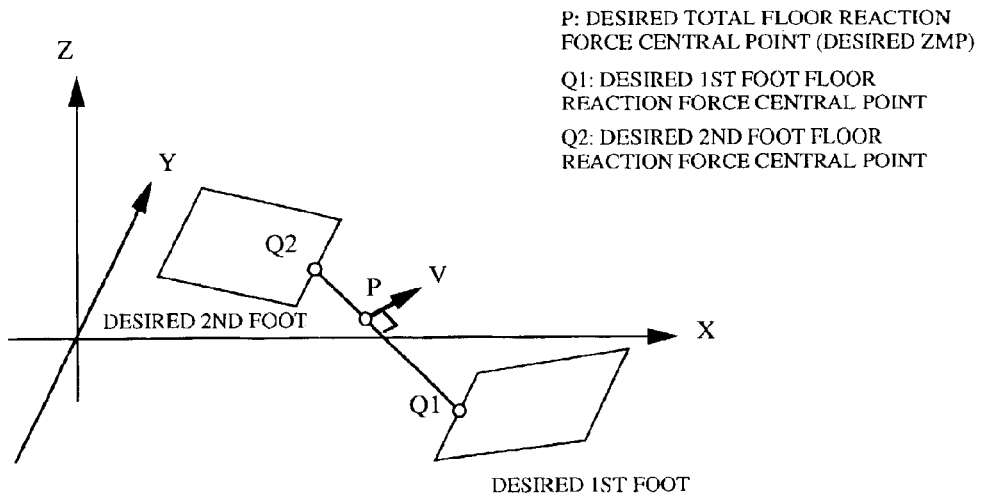
FIG. 15 is an explanatory view showing a vector V which is normal on the plane that includes the foot floor reaction force central point and is perpendicular to the horizontal plane in the situation illustrated in FIG. 11.

1) A vector V which is normal on the plane that includes the desired 1st foot floor reaction force central point Q1 and the 2nd foot floor reaction force central point Q2 and that is perpendicular to the horizontal plane, is first determined. The magnitude of the vector V should be 1. FIG. 15 shows the vector V.

2) The coordinate of the desired 1st foot floor reaction force central point Q1 is rotated (moved) by a rotational angle θ dbv about the desired total floor reaction force central point (desired ZMP) around the normal vector V. The central point after rotation is called "Q1'". Similarly, the coordinate of the desired 2nd foot floor reaction force central point Q2 is rotated (moved) by the same rotational angle θ dbv about the desired total floor reaction force central point (desired ZMP) around the normal vector V. The central point after rotation called "Q2'".

Figure 16:
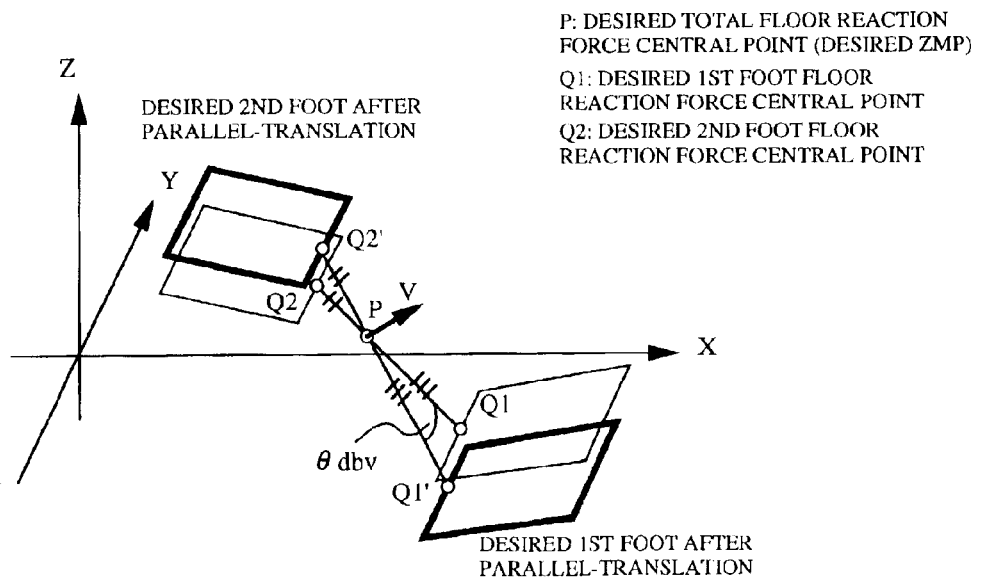
FIG. 16 is an explanatory view showing the desired foot floor reaction force central point rotated about the desired total floor reaction force central point (desired ZMP) by a predetermined angle θ dbv in the situation illustrated in FIG. 11.

This rotational angle θ dbv is called the "feet compensating angle". The vector whose initial point is Q1 and whose terminal point is Q1', is named a "vector Q1Q1'". Similarly, a vector whose initial point is Q2 and whose terminal point is Q2', is named a "vector Q2Q2'". FIG. 16 shows Q1' and Q2'.

3) Then, the desired 1st foot is parallel-translated (moved up and down) by the vector Q1Q1', without changing its posture. Similarly, the desired 2nd foot is parallel-translated by the vector Q2Q2', without changing its posture. FIG. 16 shows each desired foot after movement with thick lines.

Figure 17:
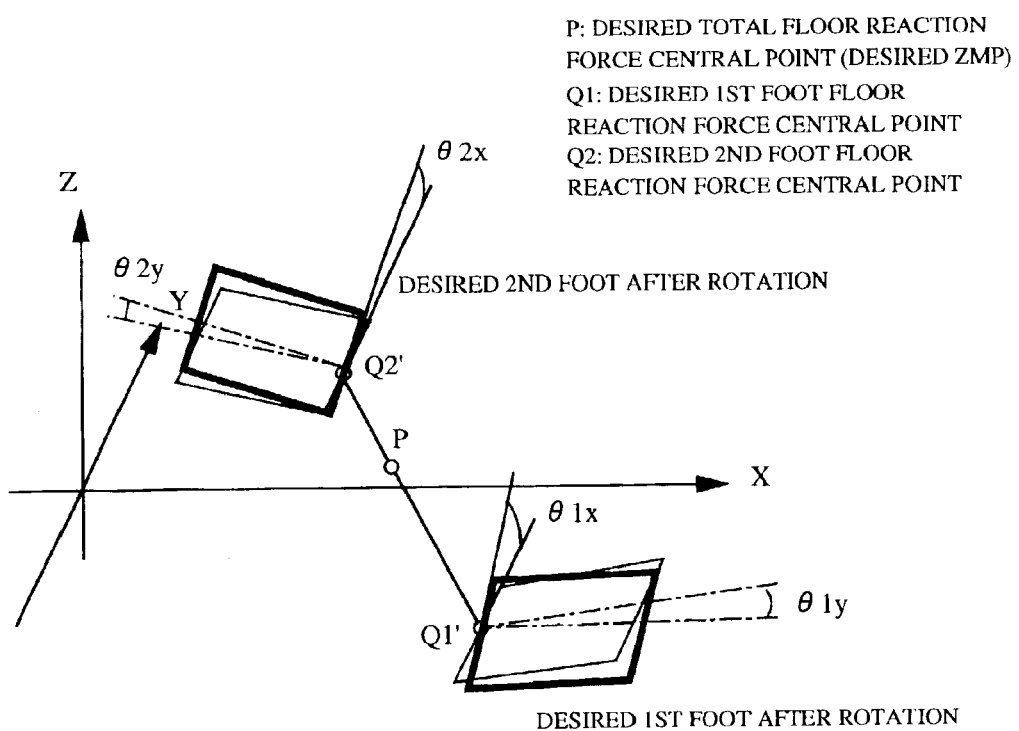
FIG. 17 is an explanatory view showing rotation of the feet about the back-and-forth-axis and left-and-right-axis by predetermined angles θ nx, θ ny in the situation illustrated in FIG. 16.

4) Then, the desired 1st foot is rotated about Q1', by a rotational angle θ 1x around the back-and-forth axis (X-axis) and by a rotational angle θ 1y around the left-and-right axis (Y-axis). Similarly, the desired 2nd foot is rotated about Q2', by a rotational angle θ 2x around the back-and-forth axis (X-axis) and by a rotational angle θ 2y around the left-and-right axis (Y-axis). The rotational angle θ nx and θ ny are called an "n-th foot X-compensating angle" and an "n-th foot Y-compensating angle", respectively. FIG. 17 shows each desired foot after rotation with thick lines.

If the amount of compensating operation mentioned above is not excessive, the contact-area of foot sole (the foot sole area where the pressure is positive) remains unchanged, although the distribution of pressure of the foot sole may change. If this is the case, the compliance mechanism 42 provided at each foot deforms by an amount proportionate to the amount of compensating operation and generates the actual foot floor reaction force at each foot in response to the amount of deformation. With this, the relationship between the amount of compensating operation and the change in the actual foot floor reaction force generated by the compensating operation will exhibit the following appropriate characteristics:

Characteristic 1) If only the feet compensating angle θ dbv is manipulated to move the desired feet position, the actual foot floor reaction force's force component of the one foot which is moved down, increases, whilst that of the foot which is moved up, decreases. At this time, the actual foot floor reaction force's moment about the corrected desired foot floor reaction force central point changes little.

Characteristic 2) If only the n-th foot X-compensating angle is manipulated to rotate the n-th foot posture, only the X-component of the actual n-th foot floor reaction force's moment about the desired n-th foot floor reaction force central point changes, but the other floor reaction force components change slightly. Similarly, if only the n-th foot Y-compensating angle is manipulated to rotate the n-th foot posture, only the Y-component of the actual n-th foot floor reaction force's moment about the desired n-th foot floor reaction force central point changes, but the other floor reaction force components change slightly.

Characteristic 3) When the feet compensating angle θ dbv, and the foot X-compensating angle and the foot Y-compensating angle are all manipulated at the same time, the change amounts of actual foot floor reaction force will be the sum of the individual change amounts obtained by respective manipulation.

It could be stated from the above that characteristics 1) and 2) indicate that the respective manipulation have independence, whilst characteristic 3) indicates that the respective manipulations have linearity.

Figure 18:
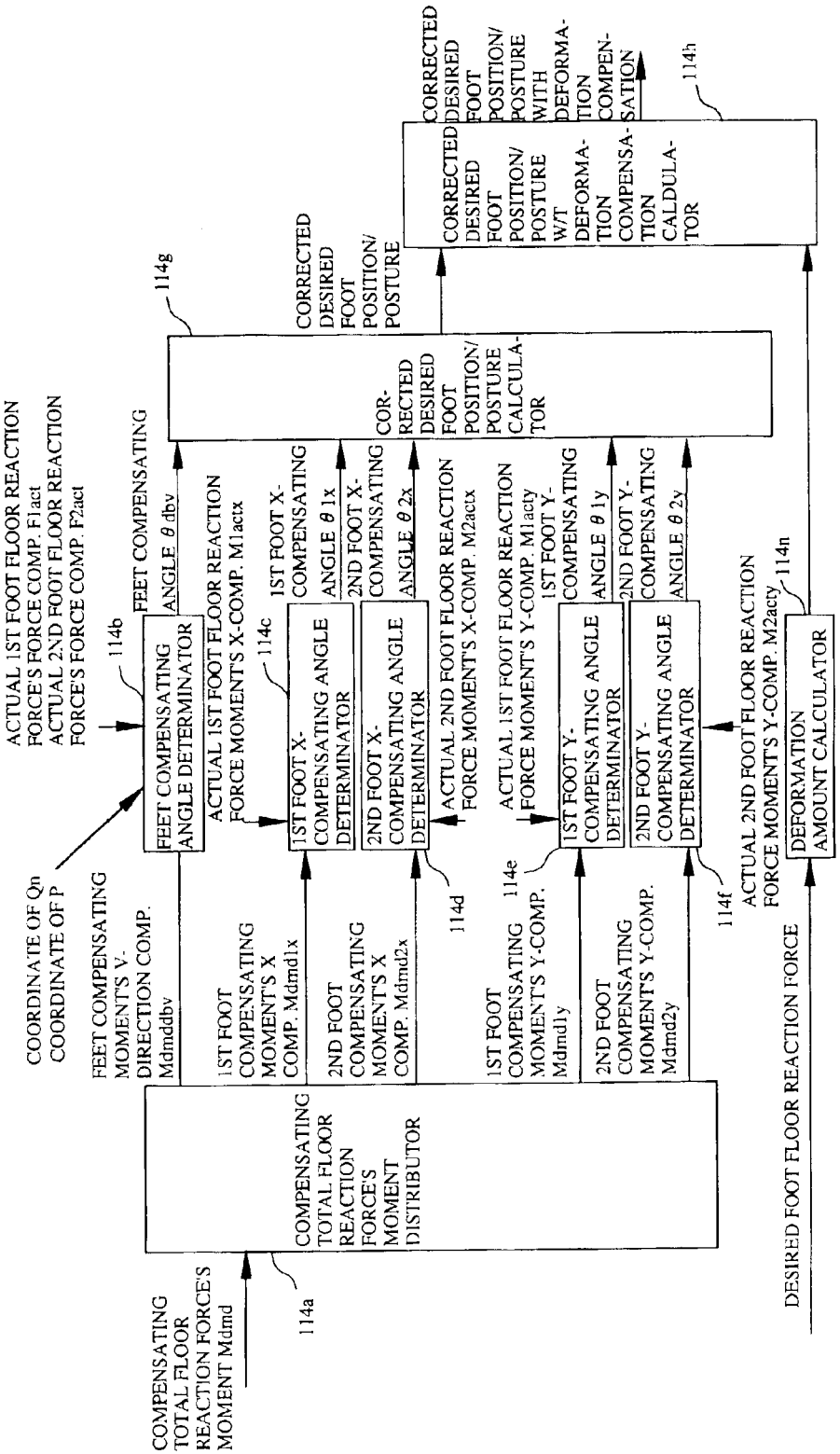
FIG. 18 is a block diagram showing the calculation of a composite compliance operation determinator illustrated in FIG. 4.

FIG. 18 is a block diagram showing the calculation of the composite compliance operation determinator 114. The calculation will be explained with reference to the figure.

Briefly explaining, a total floor reaction force compensating moment distributor 114*a* distributes or divides the compensating total floor reaction force's moment Mdmd. Then, a feet compensating angle determinator 114*b* and n-th foot X-compensating and Y-compensating angle determinators 114*c*, 114*d*, 114*e*, 114*f* determine the aforesaid compensating angle θ dbv and θ nx (y) based on the actual foot floor reaction force and the distributed compensating total floor reaction force's moment, etc.

Then, a corrected desired foot position and/or posture calculator 114*g* determines a compensated feet position and/or posture (named as a "corrected desired feet position and/or posture") through geometric calculation based on these determined compensating angles. Finally, a corrected desired feet position and/or posture with deformation compensation calculator 114*h* determines the amount of deformation of the compliance mechanism 42 presumably generated by the desired foot floor reaction force, and further corrects the corrected desired feet position and/or posture to cancel the same.

To be more specific, the total floor reaction force compensating moment distributor 114*a* distributes the compensating total floor reaction force's moment Mdmd to (divides into) a feet compensating moment Mdmddb and foot compensating moments Mdmd1*x*, *y*, Mdmd2*x*, *y*. The feet compensating moment Mdmddb is a desired value of moment to be generated about the desired total floor reaction force central point (desired ZMP) by the force component of the foot floor reaction force through the manipulation of the feet compensating angle (the amounts of feet up-and-down movement) θ dbv.

The component around the V-direction of the feet compensating moment Mdmddb is expressed as Mdmddbv. The V-direction is the direction of the vector V defined with reference to the explanation of the composite compliance operation determinator. Defining a vector which is perpendicular to V and also the vertical direction, as "U", a U-direction component Mdmddbu of the feet compensating moment Mdmddb is set to zero. This is because the manipulation of feet compensating angle θ dbv can not generate the U-direction moment of floor reaction force.

Here, since the vertical component of the compensating total floor reaction force's moment Mdmd is zero, the vertical component Mdmddbz of Mdmddb is also set to zero.

The 1st foot compensating moment Mdmd1 is a moment to be generated about the desired 1st foot floor reaction force central point by manipulating the 1st foot compensating angle θ 1*x*, θ 1*y*. The X-component of 1st foot compensating moment Mdmd1 is expressed as Mdmd1*x*, whilst the Y-component thereof is expressed as Mdmd1*y*. The 2nd foot compensating moment Mdmd2 is a moment to be generated about the desired 2nd foot floor reaction force central point by manipulating the 2nd foot compensating angles θ 2*x*, θ 2*y*. The X-component of 2nd foot compensating moment Mdmd2 is expressed as Mdmd2*x*, whilst the Y-component thereof is expressed as Mdmd2*y*.

The distribution will be carried out, for example, in the manner mentioned below.

$$Mdmddbv = Wdbx * Mdmdx + Wdby * Mdmdy \quad \text{Eq. 3}$$

$$Mdmd1x = W1x * (Mdmdx - Wint * Vx * Mdmddbv)$$

$$Mdmd1y = W1y * (Mdmdy - Wint * Vy * Mdmddbv)$$

$$Mdmd2x = W2x * (Mdmdx - Wint * Vx * Mdmddbv)$$

$$Mdmd2y = W2y * (Mdmdy - Wint * Vy * Mdmddbv) \quad \text{Eq. 4}$$

In the above, Wdbx, Wdby, W1*x*, W1*y*, W2*x*, W2*y* and Wint are distribution-weight variables. Vx is a value of the X-component of vector V and Vy is that of Y-component of vector V. Among of the variables, Wint is a variable for canceling the total floor reaction force's moment (generated by the manipulation of the feet compensating angle) by manipulating the foot compensating angles.

Figure 19:
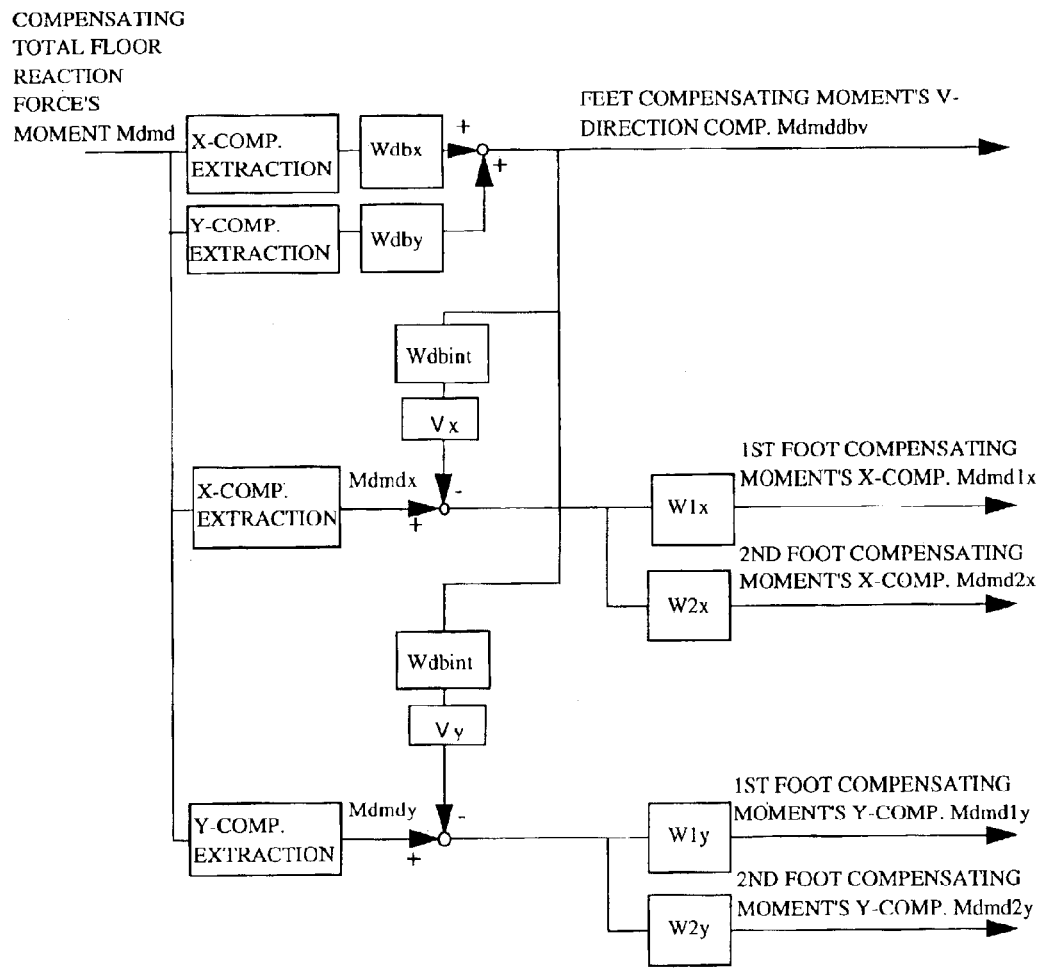
FIG. 19 is a block diagram showing the calculation of a compensating total floor reaction force's moment distributor illustrated in FIG. 18.

FIG. 19 is a block diagram showing the total floor reaction force compensating moment distributor 114*a* which conducts the calculation of Eqs. 3 and 4.

Figure 20:
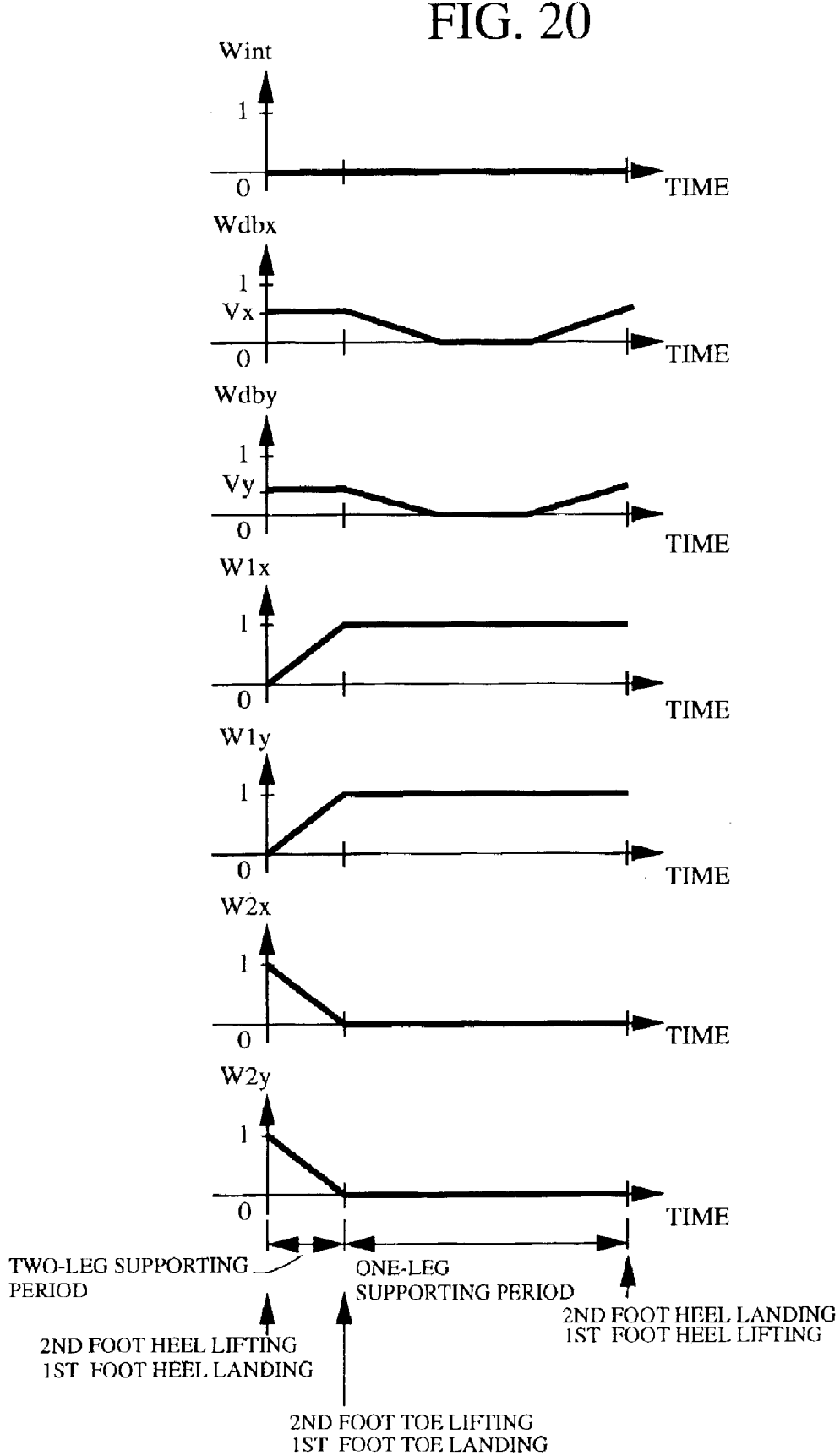
FIG. 20 is a set of time charts each showing examples of set distribution-weight variables of the compensating total floor reaction force's moment distributor, illustrated in FIG. 18, for manipulating, a feet compensating angle.

FIG. 20 shows an example of the distribution-weight variables Wdbx, Wdby, W1*x*, W1*y*, W2*x*, W2*y* and Wint, during robot walking. The patterns illustrated in FIG. 20 should preferably be set taking the following attentions into account:

Attention 1) If the feet compensating angle and the foot compensating angle vary discontinuously, the joints experience excessive torque. In order to change the feet compensating angle and the foot compensating angle continuously, the distribution-weight variables should be changed continuously.

Attention 2) The distribution-weight variables should be determined such that the actual floor reaction force's moment generated by the manipulation of the feet compensating angle and the foot compensating angle, is preferably close to the compensating total floor reaction force's moment Mdmd.

Moreover, the variables should preferably be set in response to the motion of robot such as being upright, walking, etc. In a situation such as being upright in which the V-direction-components Mdmddbv of the feet compensating moment and the foot compensating moment Mdmd1, Mdmd2 can be faithfully generated in the actual foot floor reaction force, the variable should preferably be set as follows.

Specifically, in this situation, the variables should be set, satisfying both Eqs. 5 and 6 as much as possible, such that the horizontal component of the actual total floor reaction force's moment about the desired total floor reaction force central point becomes equal to the horizontal component of the compensating total floor reaction force's moment Mdmd (i.e., Demand 1) to the composite compliance operation determinator can be satisfied.

$$Mdmddbv*Vx+Mdmd1x+Mdmd2x=Mdmdx \quad \text{Eq. 5}$$

$$Mdmddbv*Vy+Mdmd1y+Mdmd2y=Mdmdy \quad \text{Eq. 6}$$

Substituting Eqs. 5 and 6 into Eqs. 3 and 4 respectively, Eq. 5 is rewritten as Eq. 7, while Eq. 6 is rewritten as Eq. 8.

$$(Wdbx*Mdmdx+Wdby*Mdmdy)*Vx+W1x* \quad \text{Eq. 7}$$
$$(Mdmdx-Wint*Vx*(Wdbx*Mdmdx+Wdby*Mdmdy))+$$
$$W2x*(Mdmdx-$$
$$Wint*Vx*(Wdbx*Mdmdx+Wdby*Mdmdy))=Mdmdx$$

$$(Wdbx*Mdmdx+Wdby*Mdmdy)*Vy+W1y* \quad \text{Eq. 8}$$
$$(Mdmdy-Wint*Vy*(Wdbx*Mdmdx+Wdby*Mdmdy))+$$
$$W2y*(Mdmdy-$$
$$Wint*Vy*(Wdbx*Mdmdx+Wdby*Mdmdy))=Mdmdy$$

In order to always satisfy Eqs. 7 and 8, no matter what values Mdmdx and Mdmdy are, it suffices if Eqs. 9, 10 and 11 are satisfied at the same time.

$$Wint=1 \quad \text{Eq. 9}$$

$$W1x+W2x=1 \quad \text{Eq. 10}$$

$$W1y+W2y=1 \quad \text{Eq. 11}$$

In the situation mentioned above, thus, it suffices if the variables are determined to satisfy Eqs. 9, 10 and 11 at the same time.

Figure 21:
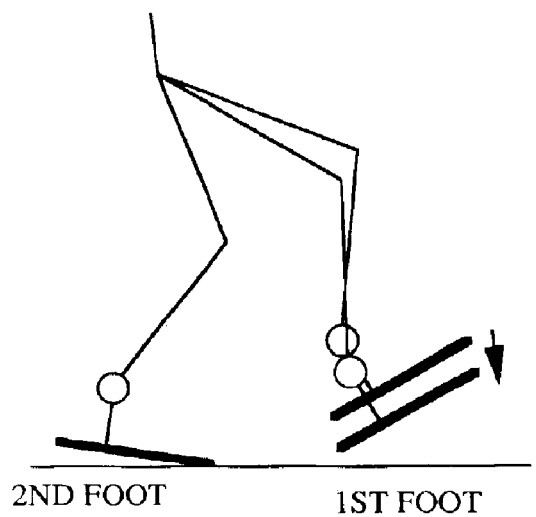
FIG. 21 is an explanatory view showing a robot posture for explaining the setting of the distribution-weight variables of the compensating total floor reaction force's moment distributor illustrated in FIG. 20.

When the robot is walking, the generated actual total floor reaction force's moment may sometimes be smaller than Mdmddbv, even if the feet position are corrected by manipulating the feet compensating angle θ dbv so as to generate Mdmddbv. As shown in FIG. 21, for example, assuming that the robot tilts backward such that the 1st foot has not landed at the beginning of the two-leg supporting period, the actual floor reaction force does not change even if the 1st foot is moved down by θ dbv.

Figure 22:
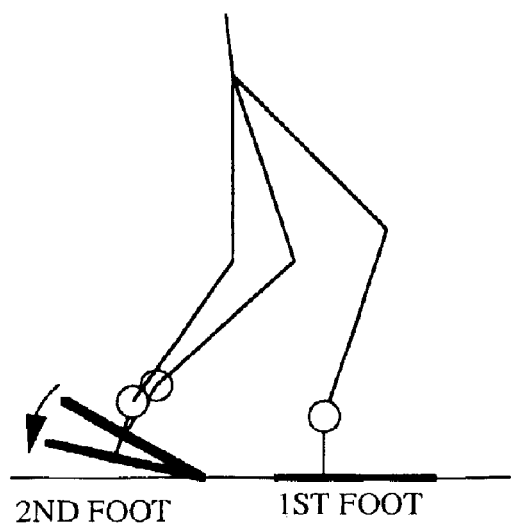
FIG. 22 is an explanatory view, similar to FIG. 21, also showing a robot posture for explaining setting of the distribution-weight variables of the compensating total floor reaction force's moment distributor.

Similarly, the increase of actual floor reaction force's moment may sometimes be smaller than Mdmd2, even if the angle of the 2nd foot is corrected by manipulating the 2nd foot compensating angle θ 2 so as to generate Mdmd2. As shown in FIG. 22, for example, assuming that the robot tilts backward at the latter half of the two-leg supporting period, the actual floor reaction force does not change even if the 2nd foot heel is moved down.

Thus, even when the weight variables are determined to satisfy Eqs. 5 and 6, the increase of the actual floor reaction force generated by the composite compliance control may sometimes be less than the necessary compensating total floor reaction force's moment Mdmd. The values obtained by dividing the left terms of Eqs. 5 and 6 by their respective right terms should accordingly be set to be greater than 1 under the situation where this problem would be likely to occur.

In FIG. 20 showing an example of setting of the distribution-weight variables during walking, Wint is set to zero such that the manipulation of foot compensating angle can make up for the lack, even when the manipulation of the feet compensating angle θ dbv can not generate the actual total floor reaction force's moment in the situation such as illustrated in FIG. 21.

Advantageously, if the robot tilts backward as illustrated in FIG. 21, since the 2nd foot heel moves down to be easily landed on the floor, the actual total floor reaction forces's moment can easily be generated by manipulating the 2nd foot compensating angle.

When the robot is not tilting backward, the actual total floor reaction force's moment is generated by the manipulation of the feet compensating angle θ dbv, but the 2nd foot heel is not in contact with the floor, the manipulation of 2nd foot compensating angle does not produce the actual total floor reaction force's moment.

More specifically, the foot compensating angle does not act effectively when the feet compensating angle θ dbv acts effectively, whilst the feet compensating angle θ dbv does not act effectively when the foot compensating angle acts effectively. The sum of the respective actual total floor reaction force's moments generated by manipulating the feet compensating angle and the foot compensating angle becomes, as a result, almost equal to the compensating total floor reaction force's moment Mdmd.

Depending on the situation, the sum of the respective actual total floor reaction force's moments generated by manipulating the feet compensating angle and the foot compensating angle may sometimes become greater than the compensating total floor reaction force's moment Mdmd.

Even if this happens, as Mdmd is a feedback manipulated variable for posture stabilization, it will not bring a serious problem, since, as will often be experienced in every control system, the magnitude variance of Mdmd will cause the open-loop gain in the control system to vary slightly, but the closed-loop characteristics do change little.

Attention 3) The distribution-weight variables for feet compensating angle, Wdbx, Wdby, should be small (in absolute value) during the one-leg supporting period. This is because to change the feet compensating angle during the one-leg supporting period does only result in a wasteful up-and-down movement of a free foot and does not change the actual foot floor reaction force.

Attention 4) If the force component of the desired foot floor reaction force is small (in absolute value), the distribution-weight variable for the foot compensating angle of the foot concerned, should be small (in absolute value) so as to ensure the floor-contact-ability of the foot. In particular, if the foot is far from the floor, the absolute value of the distribution-weight variable should be small, since the movement of the foot by the foot compensating angle does not result in the change of the actual floor reaction force of that foot, so as to avoid a wasteful foot movement.

Attention 5) The direction of the actual total floor reaction force's moment controlled by manipulating the feet compensating angle is ordinarily different from that controlled by manipulating the foot compensating angle.

For example, the direction of the actual total floor reaction force's moment generated by manipulating the feet compensating angle θ dbv is always the V-direction, and it can not generate any component perpendicular to the V-direction. On the contrary, the direction of the actual total floor reaction force's moment generated by manipulating the foot compensating angle is restricted depending on a situation how the foot is in contact with the floor.

For example, if the foot is in contact with the floor only by the toe edge or heel edge of the foot 22R(L), no moment can be generated in the direction of the line of the edge. During the two-leg supporting period, taking this characteristic into account, the feet compensating angle and the foot compensating angle should accordingly be manipulated with minimum loss.

For example, the distribution-weight variables Wdbx, Wdby for manipulating the feet compensating angle should be determined as follows.

Specifically, defining a vector, as "Wdb", whose X-component is Wdbx, whose Y-component is Wdby and whose Z-component is zero, Eq. 3 is the inner product of the vector Wdb and Mdmd. It can therefore be said that what is obtained by dissolving Mdmd to a component of the direction of vector Wdb and a component perpendicular thereto and then by extracting only the component of the direction of vector Wdb and by multiplying by the magnitude of vector Wdb, is Mdmddbv calculated in accordance with Eq. 3.

Figure 23:
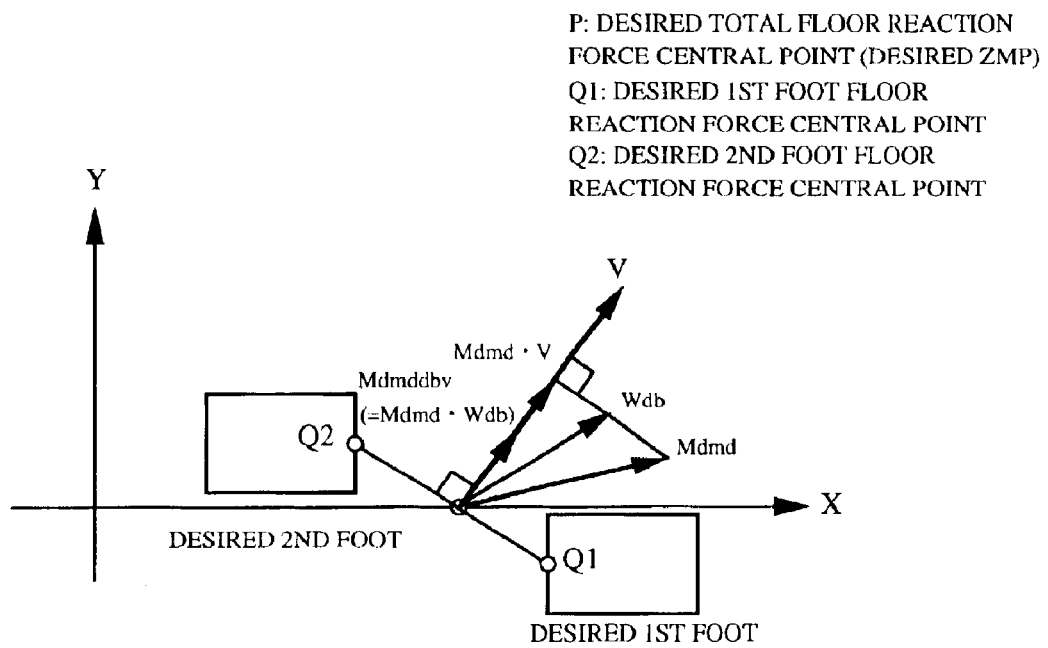
FIG. 23 is an explanatory view showing a V-direction-component of the feet compensating moment Mdmddbv when the distributor-weight variables for manipulating the feet compensating angle are determined under a predetermined condition.

FIG. 23 shows this Mdmddbv. This indicates that a feedback control system which controls the Wdb-direction component of the actual total floor reaction force's moment is built by manipulating the feet compensating angle. If the Wdb-direction is perpendicular to the vector V, the Wdb-direction component of the actual total floor reaction force's moment will not produce no matter to what extent the feet compensating angle is manipulated, and the feedback control system would accordingly control the feet compensating angle in vain.

In order to decrease such a wasteful operation, the Wdb-direction should accordingly be equal to the direction of vector V or be brought to be close thereto as much as possible. Moreover, when it is intended to produce the Wdb-direction component of the compensating total floor reaction force's moment, without using the foot compensating angle, but by solely manipulating the feet compensating angle, the inner product of Wdb and V should be determined to be 1. If it is intended to generate a part of the component by the foot compensating angle, the inner product of Wdb and V should be determined to be less than 1.

Aside from the above, when the lateral width of the foot is small, the X-component of the actual foot floor reaction force's moment generated by manipulating the foot compensating angle will be small. In this case, the magnitude of Wdbx should preferably be set to be larger. With this, although the Wdb-direction and the direction of the vector V become not equal to each other and the fluctuation of the feet compensating angle increases, the stability will be enhanced.

Figure 24:
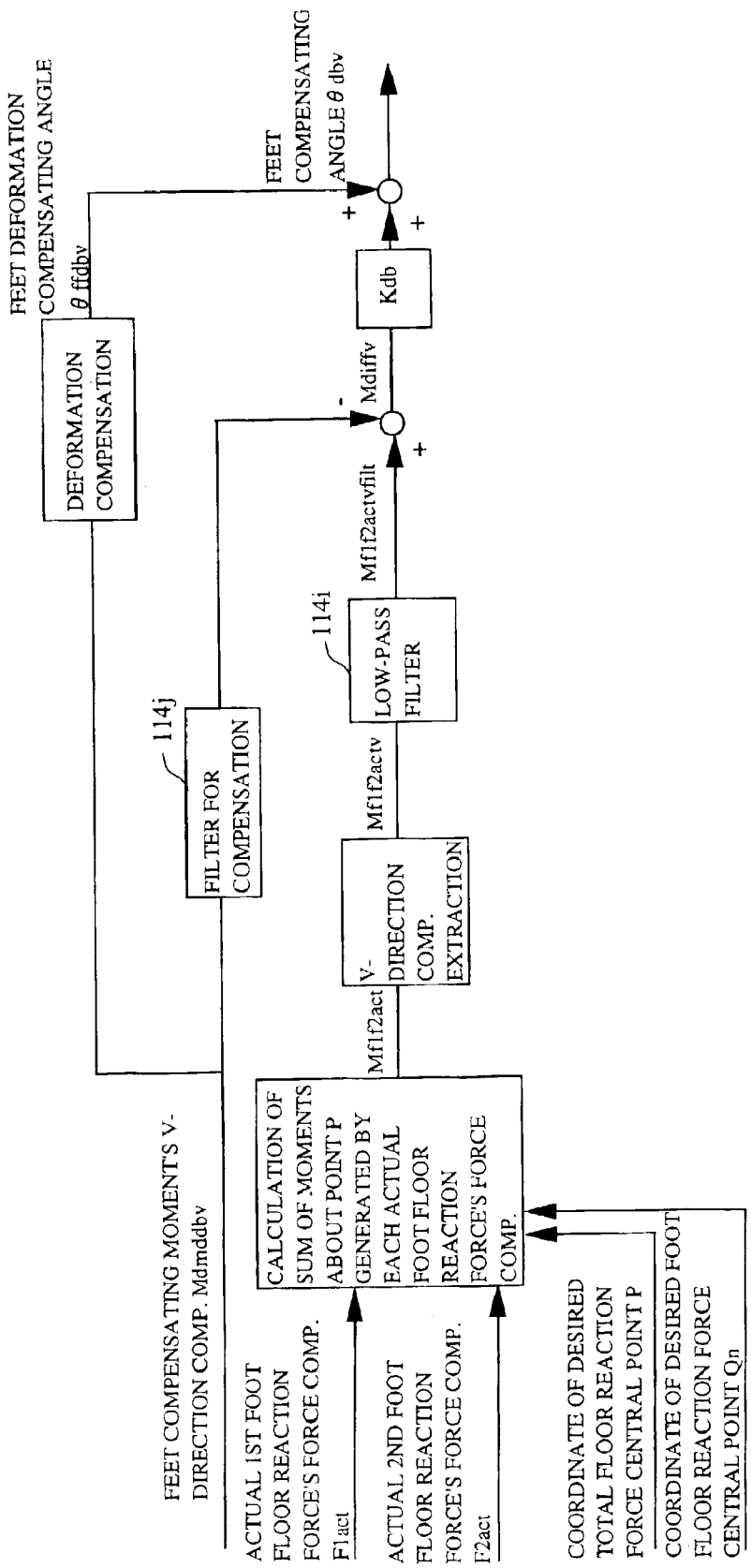
FIG. 24 is a block diagram showing the calculation of a feet compensating angle determinator illustrated in FIG. 18.

The processing of the feet compensating angle determinator 114b will be explained further. FIG. 24 is a block diagram showing the calculation of the feet compensating angle determinator 114b. The feet compensating angle θ dbv is calculated in the manner as illustrated.

Explaining this with reference to FIG. 24, a moment Mf1f2act, which is generated about the desired total floor reaction force central point P by F1act acting on the desired 1st foot floor reaction force central point Q1 and by F2act acting on the desired 2nd foot floor reaction force central point Q2, is determined in accordance with the following equation:

$$Mf1f2act = PQ1*F1act + PQ2*F2act \qquad \text{Eq. 12}$$

In the above, PQ1 is a vector whose initial point is P and whose terminal point is Q1, whilst PQ2 is a vector whose initial point is P and whose terminal point is Q2.

Instead of Eq. 12, the following equation can be used without introducing any substantial problems:

$$Mf1f2act = PQ1*F1act + PQ2*F2act + M1act + M2act \qquad \text{Eq. 12a}$$

Eq. 12a is an equation which calculates the actual total floor reaction force's moment Msumact acting about the desired total floor reaction force central point. Eq. 12 indicates the difference obtained by subtracting the actual foot floor reaction force's moment acting about the desired foot floor reaction force central point from the actual total floor reaction force's moment acting about the desired total floor reaction force central point.

Next, a vector V-direction-component Mf1f2actv of Mf1f2act is extracted. This can be obtained in accordance with the following equation which uses the calculation of vector inner product. The vector V is the vector illustrated in FIG. 15 with reference to the aforesaid explanation.

$$Mf1f2actv = Mf1f2act*V \qquad \text{Eq. 13}$$

Then, Mf1f2act is filtered through a low-pass filter 114i to obtain Mf1f2actvfilt.

Then, the V-direction-component of feet compensating moment Mdmddbv is passed through a filter 114j for compensation and the filtered result is subtracted from Mf1f2actvfilt to determine a V-direction-component of difference moment Mdiffv.

The filter 114j for compensation is a filter for improving the frequency-response characteristic of the transfer function from Mdmddbv to the actual total floor reaction force's moment.

Then, a feet deformation compensating angle θ ffdbv for canceling the influence of the deformation of the compliance mechanism 42 on the V-direction-component of feet compensating moment is calculated. This corresponds to the so-called feedforward compensation.

Specifically, this is done by using a mechanism-compliance model expressing the relationship between the V-direction-component of feet compensating moment Mdmddbv and the amount of deformation, by calculating the angle of deformation of the line connecting the desired 1st foot floor reaction force central point Q1 and the desired 2nd foot floor reaction force central point Q2, and by inverting the polarity of the angle to determine the same as a feet deformation compensating angle θ ffdbv.

The feet deformation compensating angle θ ffdbv can be approximated using the following equation:

$$\theta\ ffdbv = -\alpha*Mdmddbv \qquad \text{Eq. 14}$$

In the above, α is a predetermined constant.

Finally, the feet compensating angle θ dbv is obtained in accordance with the equation mentioned in the following. In the following, Kdb is a control gain and is normally set to be a positive value.

$$\theta\ dbv = Kdb*Mdiffv + \theta\ ffdbv \qquad \text{Eq. 15}$$

Figure 25:
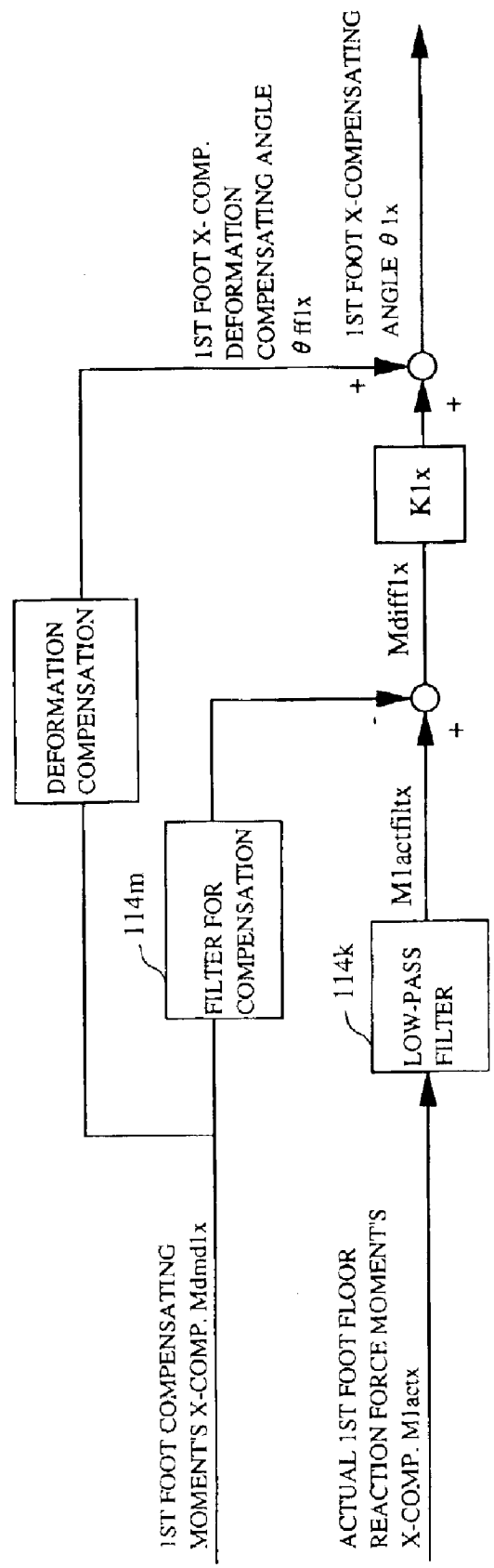
FIG. 25 is a block diagram showing the calculation of a foot compensating angle determinators illustrated in FIG. 18.

The n-th foot compensating angle determinator will be explained. FIG. 25 is a block diagram showing the calculation of a 1st foot X-compensating angle determinator 114c of the determinator. The 1st foot X-compensating angle determinator calculates the 1st foot X-compensating angle θ

1x in the manner illustrated. Although the illustration is omitted, the 1st foot Y-compensating angle θ 1y, the 2nd foot X-compensating angle θ 2x and the 2nd foot Y-compensating angle θ 2y are calculated similarly. Only the algorithm to determine the 1st foot X-compensating angle θ 1x will be explained here.

The X-component of the 1st foot floor reaction force's moment M1actx is filtered through a low-pass filter 114k to obtain M1actfiltx. The X-component of the 1st foot compensating moment Mdmd1x is passed through a filter 114m for compensation and the filtered result is subtracted from M1actfiltx to obtain a difference moment Mdiff1x. Similarly to the case of feet compensating angle determination, the filter 114m for compensation is a filter for improving the frequency-response characteristic of the transfer function from Mdmd1x to the actual floor reaction force.

Then, similarly to the case of feet compensating angle determination, a 1st foot X-deformation compensating angle θ ff1x for canceling the influence of the deformation of the compliance mechanism 42 on the X-component of 1st foot compensating moment, is determined. This is the so-called "feedforward compensation".

Specifically, this is done by using a mechanism-compliance model describing the relationship between the X-direction component of 1st foot compensating moment Mdmd1x and the amount of deformation, by calculating the angle of deformation of the 1st foot, and by inverting the polarity of the angle to determine the same as a feet deformation compensating angle θ ff1x.

The feet deformation compensating angle θ ff1x can be approximated using the following equation:

$$\theta\, ff1x = -\alpha 1x * Mdmd1x \qquad \text{Eq. 16}$$

In the above, α1x is a predetermined constant.

Finally, the 1st foot X-compensating angle θ 1x is obtained in accordance with the following equation. In the below, K1x is a control gain and is normally set to be a positive value.

$$\theta\, 1x = K1x * Mdiff1x + \theta\, ff1x \qquad \text{Eq. 17}$$

Any equivalent alteration such as altering the order of calculation may be made on the block diagrams illustrated.

Returning to the explanation of FIG. 18 and continuing the explanation thereon, the corrected desired feet position and/or posture calculator 114g corrects the desired feet position and/or posture, in accordance with the feet position and/or posture correction which is a development of the aforesaid composite compliance operation, based on the aforesaid feet compensating angle θ dbv, the 1st foot X-compensating angle θ 1x, the 1st foot Y-compensating angle θ 1y, the 2nd foot X-compensating angle θ 2x and the 2nd foot Y-compensating angle θ 2y to determine the corrected desired feet position and/or posture.

A deformation amount calculator 114n calculates the amount of deformation of the compliance mechanism 42 which is expected to be generated by the desired foot floor reaction force.

The corrected desired feet position and/or posture with deformation compensation calculator 114h further corrects the corrected desired feet position and/or posture so as to cancel the calculated amount of deformation, and determines the corrected desired feet position and/or posture with deformation compensation.

Figure 26:
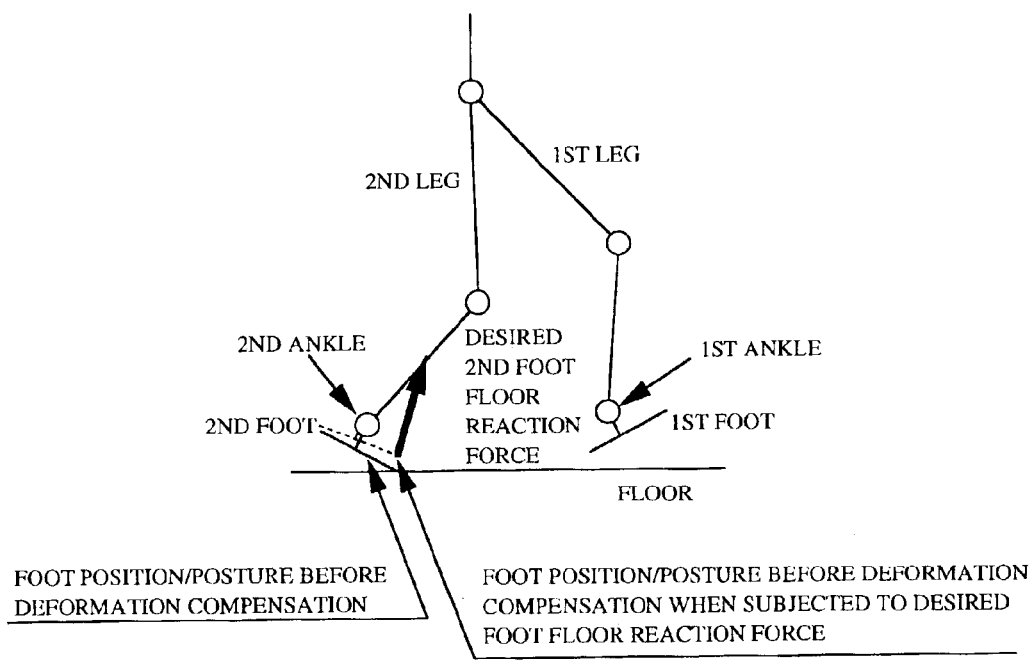
FIG. 26 is an explanatory view showing the calculation of a corrected desired foot position and/or posture with deformation compensation calculator illustrated in FIG. 18.
Figure 27:
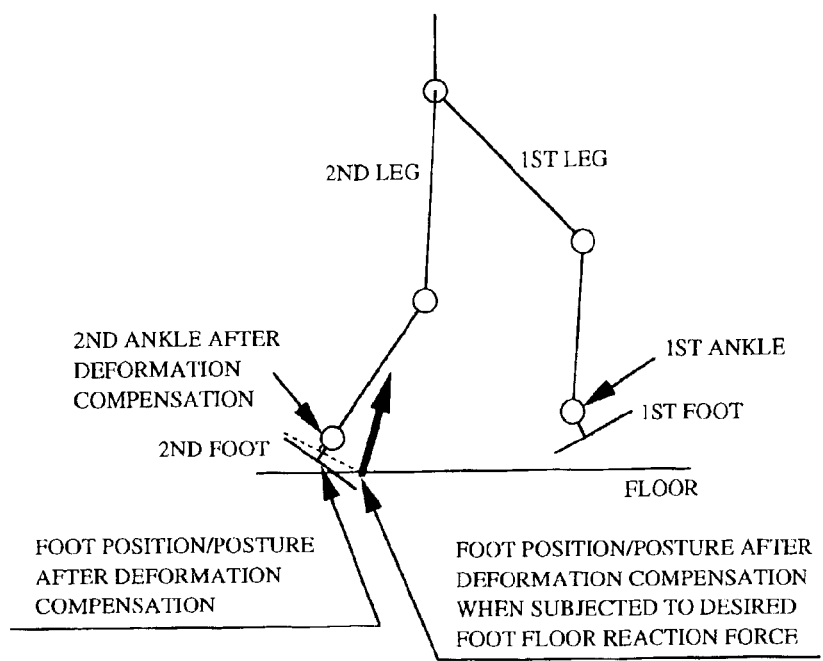
FIG. 27 is an explanatory view, similar to FIG. 26, showing the calculation of a corrected desired feet position and/or posture with deformation compensation calculator illustrated in FIG. 18.

For example, when the amount of deformation such as shown in FIG. 26 is calculated, the corrected desired feet position and/or posture with deformation compensation is determined to be the position and/or posture as illustrated in FIG. 27 in thick lines. In other words, the calculator calculates the corrected desired feet position and/or posture with deformation compensation such that the position and/or posture of the deformation-compensated foot (illustrated in FIG. 27) after having deformed by the desired foot floor reaction force, becomes equal to the foot position and/or posture before deformation compensation when no floor reaction force is acting (illustrated in FIG. 26).

The deformation compensation is a control which cancels a deviation of the actual foot position and/or posture caused by the deformation of the compliance mechanism 42 in a feedforward manner, thereby enabling to effect a walking which is closer to the desired gait when compared to a system without this deformation compensation control.

Figure 10:
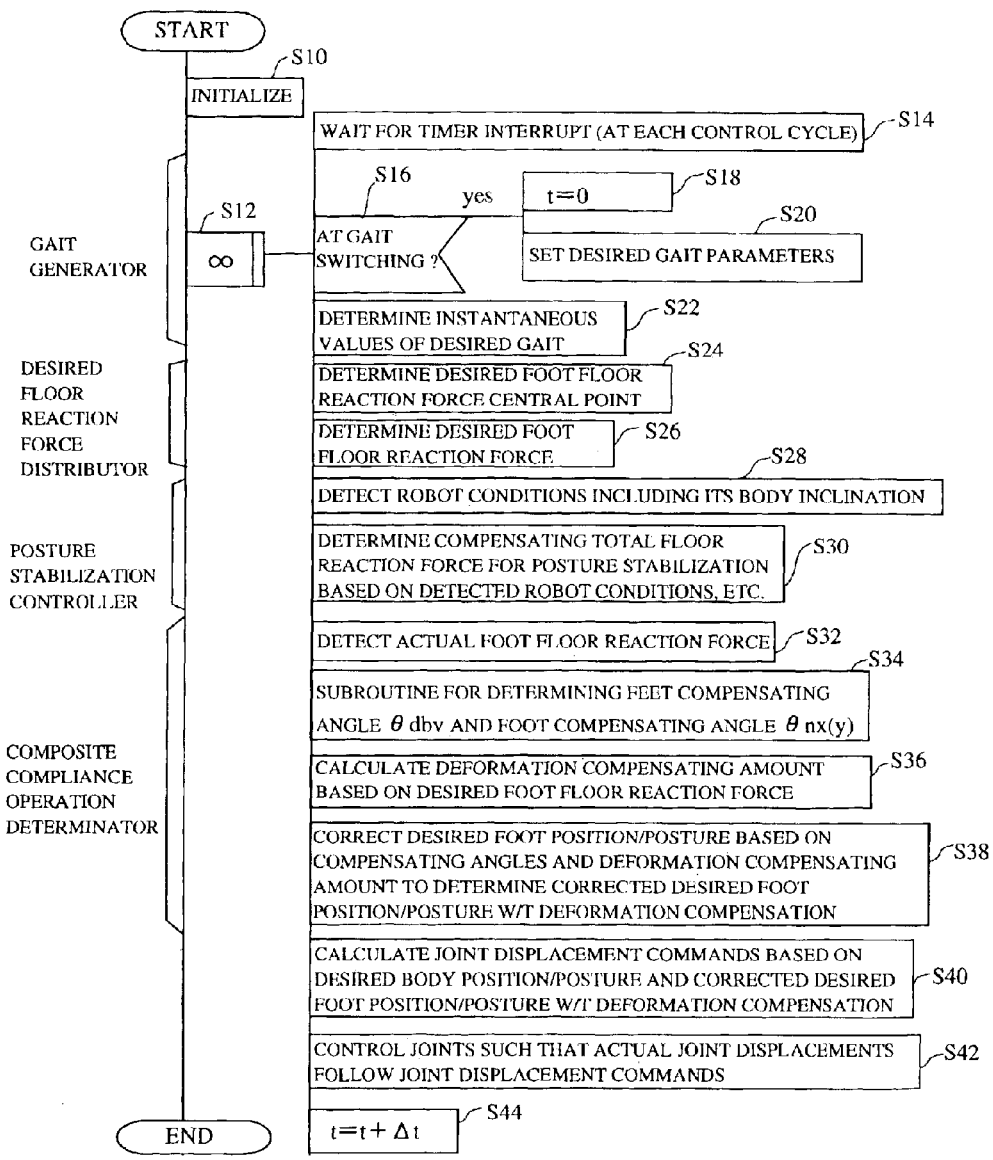
FIG. 10 is a flow chart showing, similarly to FIG. 4, the operation of a control system of a legged mobile robot according to the present invention.

Based on the above, again returning to the explanation of the flow chart of FIG. 10, the aforesaid compensating angles are determined in S34.

Figure 28:
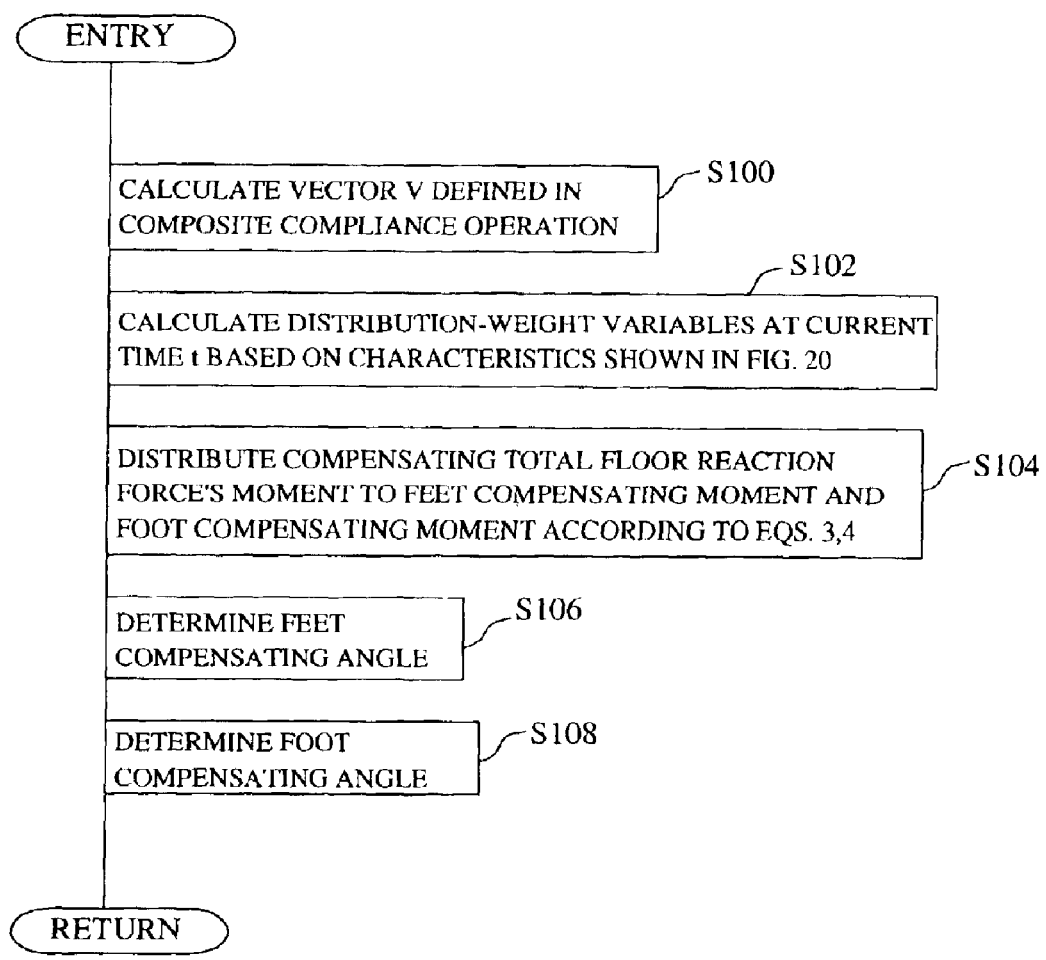
FIG. 28 is a flow chart showing the subroutine for determining the feet compensating angle, etc., referred to in the flow chart of FIG. 10.

FIG. 28 is a flow chart showing the subroutine of this determination.

Explaining this with reference to the figure, the program begins in S100 in which the aforesaid vector V is calculated and proceeds to S102 in which the distribution-weight variables at the current time t are calculated based on the set characteristics shown in FIG. 20. The program then proceeds to S104 in which the compensating total floor reaction force's moment Mdmd is distributed to, or divided into the feet compensating moment Mdmddbv and the foot compensating moment Mdmdnx(y) according to Eqs. 3 and 4, to S106 in which the feet compensating angle θ dbv is determined in the manner mentioned above. And, the program proceeds to S108 in which the foot compensating angle θ nx(y) is determined.

Returning to the flow chart of FIG. 10, the program then proceeds to S36 in which the amount of deformation compensation is calculated based on the desired foot floor reaction force, to S38 in which the desired feet position and/or posture is corrected based on the compensating angle θ dbv, θ nx(y) and the amount of deformation compensation to determine the corrected feet position and/or posture with deformation compensation.

The program then proceeds to S40 in which the joint displacement commands are calculated based on the body position and posture and the corrected desired feet position and/or posture with deformation compensation, to S42 in which the actual joint displacements are servo-controlled based on the calculated joint displacement commands, to S44 in which the time is updated by Δt, and returns to S14 to repeat these procedures.

With the configuration mentioned above, it can be summarized that almost no interference between the actual total floor reaction force control and the actual foot floor reaction force control occurs, thereby enabling to facilitate control of the actual total floor reaction force and the actual foot floor reaction force.

To be specific, the composite compliance control has the following improvements over the technique proposed earlier. That is, in the ankle-compliance control proposed in 5(1993)-305584, the actual floor reaction force's moment acting on a fixed point at the foot such as the ankle or a reference sole point is detected and the foot is rotated about the point in response to the detected moment. In the composite compliance control system, the actual foot floor reaction force's moment acting on the moving desired foot floor reaction force central point is calculated, and the control is modified in such a manner that the foot is rotated about the desired foot floor reaction force central point in response to the calculated moment such that the moment about the point becomes a desirable value.

As a result, it becomes possible to easily control the actual total floor reaction force and the actual foot floor reaction force, with almost no interference therebetween. In order to further minimize the interference, it is alternatively possible to select the point of action at a more appropriate location within the floor-contact sole region at every instant.

Further, it becomes possible to control the floor reaction force acting on the robot, i.e., actual total floor reaction force's moment about the desired total floor reaction force central point (desired ZMP) and actual foot floor reaction force's moment about the desired foot floor reaction force central point, easily and appropriately. In other words, when compared to a case where the two kinds of controls are combined, no control conflict exists, and the actual total floor reaction force and the actual foot floor reaction force do not deviate from desired values or do not diverge.

Accordingly, the system can appropriately control the floor reaction force acting on the robot, even when the robot walks on the floor having not only a slant or undulation extending over a relatively long distance, but also on an unexpected local slant or level difference, without being affected thereby.

Further, the system can effect the posture stabilization control of the legged mobile robot easily and can decrease the impact that the robot receives at foot landing, thereby improving the ability of the robot to contact or touch the floor and preventing it from slipping or spinning. In addition, it can mitigate the load of the actuators of the robot.

In the former control disclosed in 5(1993)-305586, the moment component of the actual total floor reaction force (resultant force of the foot floor reaction forces) about the desired total floor reaction force central point (desired ZMP) is detected and the control is conducted such that the detected value becomes a desired value. On the contrary, in the composite compliance control system, the moment (about the desired total floor reaction force central point (desired ZMP)) generated by the resultant force of the translational forces, except for the moment components, of the foot floor reaction force acting about the desired foot floor reaction force central point) is detected and the control is controlled such that the detected value becomes a desired value. (However, the former control may instead be used.)

Figure 29:
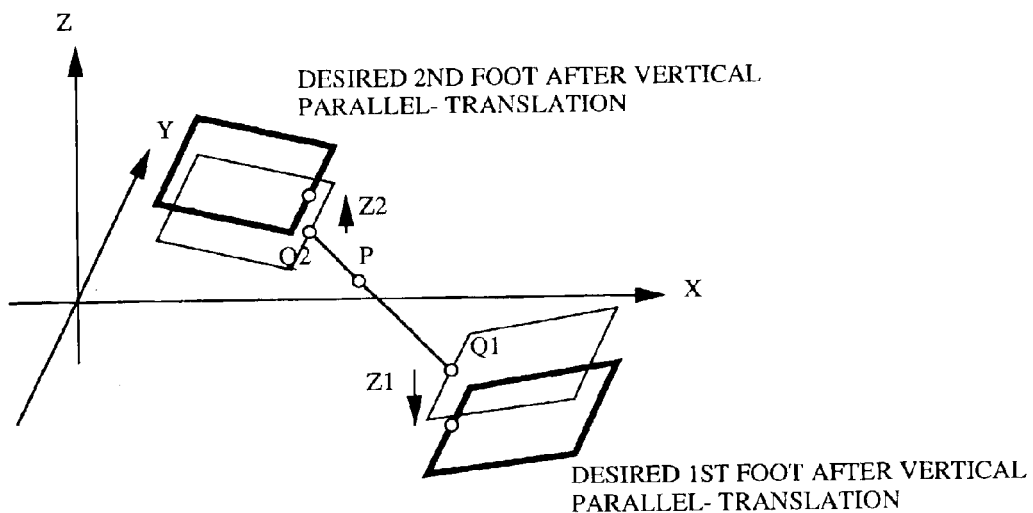
FIG. 29 is an explanatory view, similar to FIG. 16, but showing a modification of a control system proposed earlier and illustrating another example of foot position correction.

FIG. 29 is a view, similar to FIG. 16, but showing a modification of the composite compliance control.

In this modification, the compensating motion is simplified, but has the same effect as that mentioned in the above. Specifically, as the method to correct the foot position to manipulate the force component of the floor reaction force of each foot, instead of the method illustrated in FIG. 16, the foot is moved only in the vertical direction as illustrated in FIG. 29. The vertical-moving amount Z1 of the 1st foot and that Z2 of the 2nd foot are calculated in accordance with the following equation:

$$Z1\text{-line } PQ1\text{'s distance} * \theta\ dbv$$

$$Z2 = \text{line } PQ2\text{'s distance} * \theta\ dbv \qquad \text{Eq. 18}$$

In the equation, the value obtained by Eq. 15 is used as the value $\theta$ dbv.

Based on the foregoing, the floor shape estimation system according to the embodiment of the invention will be explained.

Figure 30:
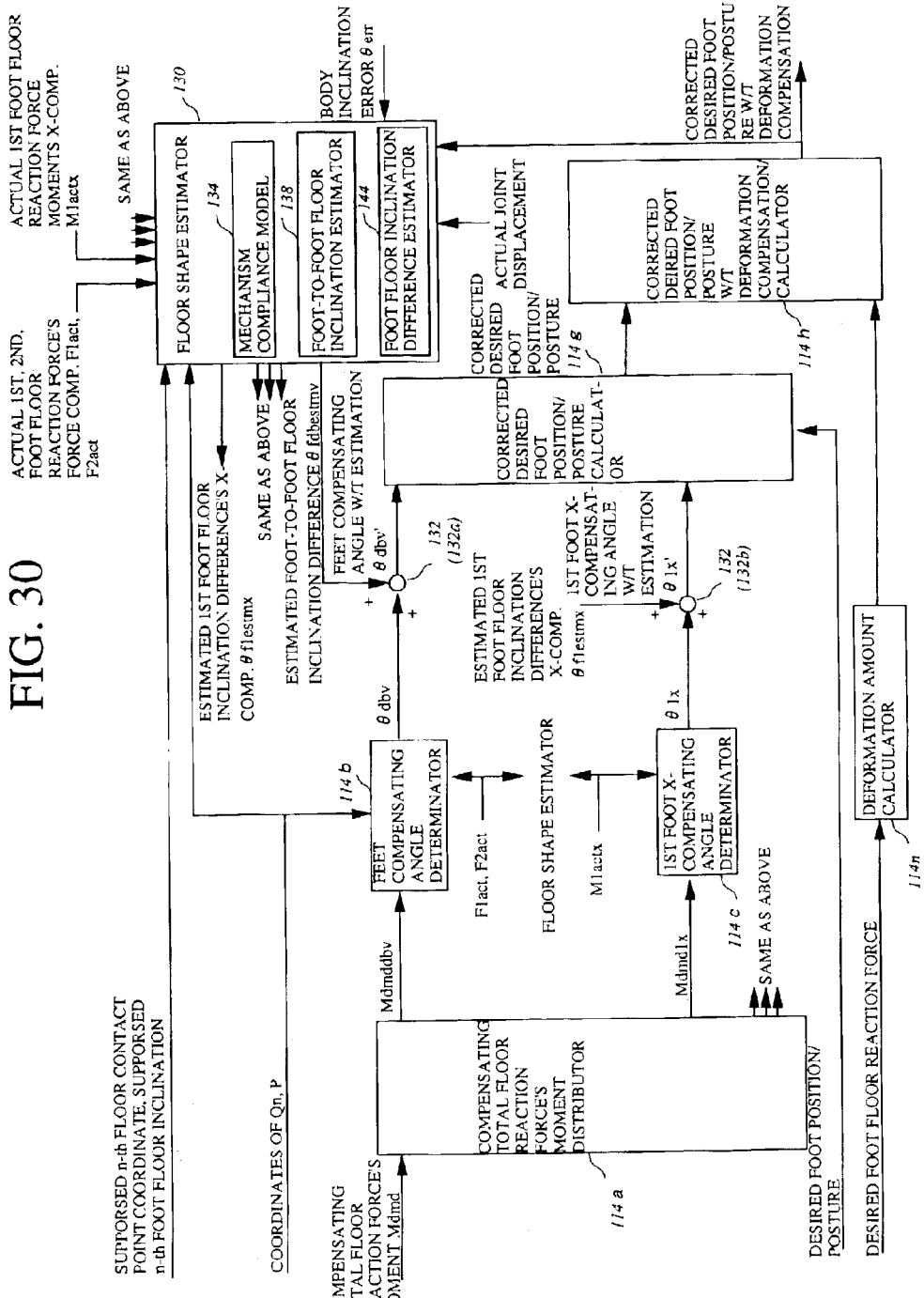
FIG. 30 is a block diagram, similar to FIG. 18, but showing the configuration of the floor shape estimation system of the legged mobile robot according to the embodiment of the present invention.

The configuration of the floor shape estimation system according to the embodiment is almost the same as that of the composite compliance control system illustrated in FIG. 4, more specifically that illustrated in FIG. 18. However, as shown in FIG. 30, the composite compliance operation determinator partly illustrated by its compensating total floor reaction force's moment distributor 114a is different from that disclosed in FIG. 18, and the determinator is additionally provided with a floor shape estimator 130 and adders 132 (i.e., 132a, 132b) that add the floor shape estimated value (outputted from the floor shape estimator 130) to the respective compensating angles.

Before entering the explanation of the figure, the concepts and terms that the floor shape estimator 130 uses in the estimation will be defined as follows.

Figure 31:
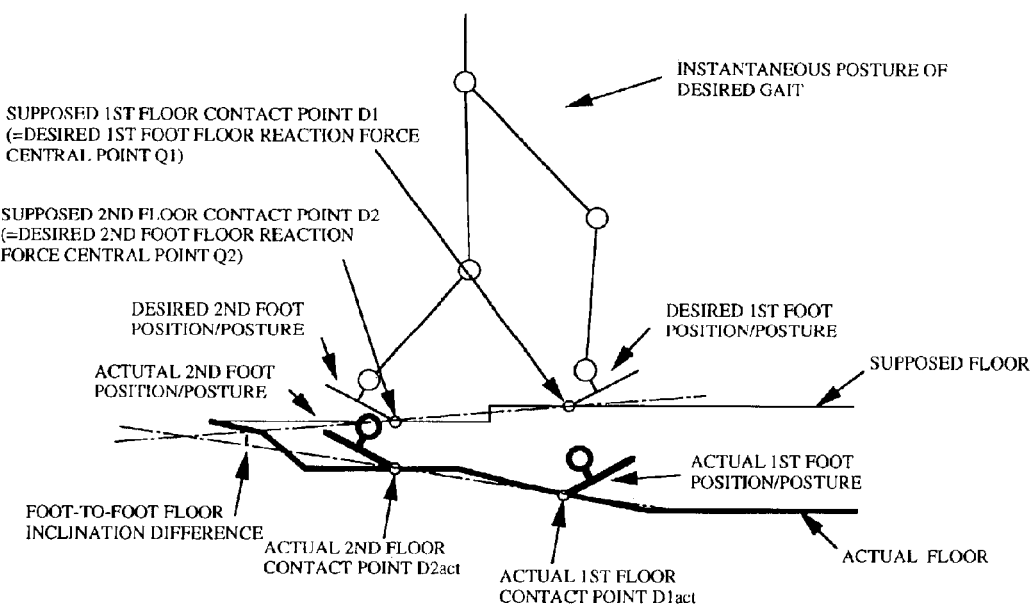
FIG. 31 is an explanatory view showing definition of terms which the system illustrated in FIG. 30 uses in floor shape estimation.

As illustrated in FIG. 31, a floor supposed in the desired gait is called a "supposed floor (or supposed floor surface)". An actual floor on which the robot walks is called an "actual floor". A difference or deviation of the actual floor shape relative to the supposed floor shape is called a "floor shape difference".

The desired n-th foot floor reaction force central point Qn in the composite compliance control is defined as a point set at the sole (contact surface with the floor surface) of the n-th foot. Consequently, the desired n-th foot floor reaction force central point Qn moves with the foot 22R(L). In line therewith, a point (on the supposed floor) which is supposed to be in contact with the desired n-th foot floor reaction force central point Qn is called a "supposed n-th floor contact point Dn".

As will be understood from the definition, in a period of time during which the n-th foot is in contact with the floor, the desired n-th foot floor reaction force central point Qn and the supposed n-th floor contact point Dn are in the same coordinate, when viewed from the supporting leg's coordinate system. On the other hand, in a period during which the robot 1 actually walks, a point at which a point on the actual n-th foot's sole (corresponding to the desired foot floor reaction force central point Qn) is in contact with the actual floor is called as a "actual n-th floor contact point Dnact".

FIG. 31 shows an example of the relationship between these points. The figure is a side view of the robot 1 showing that walks towards the normal direction (same as the direction of vector V in the composite compliance control) of the vertical plane which passes the desired 1st foot floor reaction force central point Q1 and the desired 2nd foot floor reaction force central point Q2.

The desired posture (desired gait's posture at this instant) of the robot 1 and the cross section of the supposed floor in the vertical plane are shown by thin lines, whereas the actual foot position and/or posture of the robot 1 and the cross section of the actual floor in the vertical plane are shown by thick lines. The actual n-th floor contact point at this situation is a point on the actual floor surface and its position is that shown in FIG. 31.

Further, as an index for expressing the floor shape difference quantitatively, foot-to-foot floor height difference error, foot-to-foot floor inclination difference and foot floor inclination difference are defined as follows.

Specifically, a difference between a height of the 2nd floor contact point and that of the 1st floor contact point is called a "foot-to-foot floor height difference". This is calculated as follows.

$$\text{Foot-to-foot floor height difference} = \text{2nd floor contact point's height} - \text{1st floor contact point's height} \qquad \text{Eq. 19}$$

The error between an actual foot-to-foot floor height difference and a supposed foot-to-foot floor height difference is called the "foot-to-foot floor height difference error". The inclination of a line whose initial point is the 1st floor contact point and whose terminal point is the 2nd floor contact point is called a "foot-to-foot floor inclination". This is calculated as follows:

> Foot-to-foot floor inclination=atan ((2nd floor contact point's height–1st floor contact point's height)/(horizontal distance between second floor contact point and 1st floor contact point))  Eq. 20

In the above, "atan" in the equation indicates the inverse function of tangent in the trigonometric function.

The difference between the actual foot-to-foot floor inclination and the supposed foot-to-foot floor inclination is called the "foot-to-foot floor inclination difference". FIG. 31 shows this. In the illustrated situation, the foot-to-foot floor inclination difference is positive. The inclination of floor surface at the n-th floor contact point is called an "n-th foot floor inclination".

Figure 32:
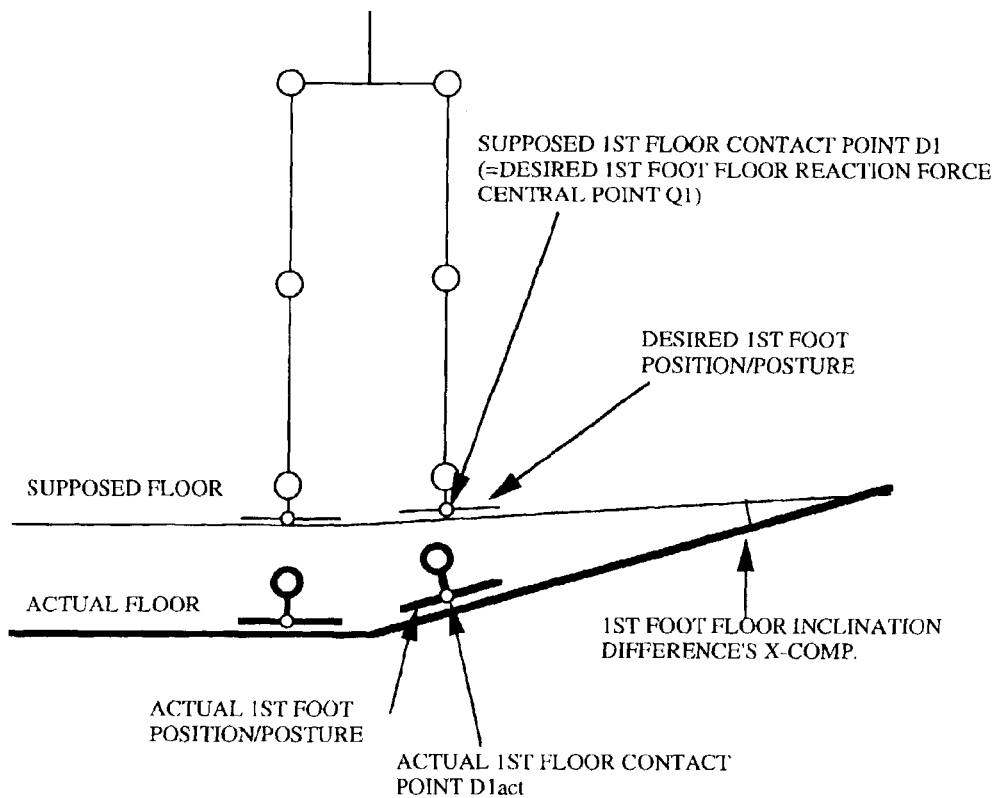
FIG. 32 is an explanatory view also showing definition of terms which the system illustrated in FIG. 30 uses in floor shape estimation.

The difference between the actual n-th foot floor inclination and the supposed n-th foot floor inclination is called the "n-th foot floor inclination difference". FIG. 32 shows this. In FIG. 32, the robot 1 is viewed from the back The desired posture (desired gait's posture at this instant) of the robot 1 and the cross section of the supposed floor in the vertical plane are shown by thin lines, and the actual foot position and/or posture of the robot 1 and the cross section of the actual floor in the vertical plane are shown by thick lines. The 1st foot floor inclination difference is negative in the illustrated example.

The foot-to-foot floor inclination and the foot-to-foot floor inclination difference are expressed by angles rotated about the aforesaid vector's V-direction. The n-th foot floor inclination and the n-th foot floor inclination difference are expressed by angles rotated in the X and Y directions.

The foot-to-foot floor inclination difference, the n-th foot floor inclination difference and the compensating angles in the composite compliance control have the following relationships thereamong. That is, the foot-to-foot floor inclination difference is, in the two-leg supporting period, corresponding to the feet compensating angle necessary for changing a line (connecting the desired 1st foot floor reaction force central point Q1 and the desired 2nd foot floor reaction force central point Q2 of the robot 1 that walks as required by the desired gait) from a situation where it extends in parallel with the desired floor surface, to a situation where it extends in parallel with the actual floor surface Further, the n-th foot floor inclination difference is corresponding to the n-th foot compensating angle necessary for changing the n-th foot (of the robot that walks as required by the desired gait) from a situation where it is in parallel with the desired floor (floor surface) to a situation where it is in parallel with the actual floor surface.

Accordingly, when the foot-to-foot floor inclination difference is estimated during walking and when the estimated value of the foot-to-foot floor inclination difference is added to the feet compensating angle, the actual total floor reaction force will be the same as that when the robot walks on the supposed floor, even if the foot-to-foot inclination difference exists. Moreover, when the n-th foot floor inclination difference is estimated during walking and when the estimated value of the n-th foot floor inclination difference is added to the n-th foot compensating angle, the actual n-th foot floor reaction force will be the same as that when the robot walks on the supposed floor, even if the n-th foot floor inclination difference exists.

It should be noted that, when the modification of the composite compliance control where the feet are moved only in the vertical direction is used, instead of an estimated value of the foot-to-foot floor inclination difference, it suffices if an estimated value of the foot-to-foot floor height difference error is used. Since there is no substantial difference therebetween, the explanation will be made only for the case where the estimated value of the foot-to-foot inclination difference is used.

In the configuration illustrated in FIG. 30, inputs to the floor shape estimator 130 will be classified as follows.

1) various desired floor reaction force central points (i.e., the desired total floor reaction force central point and the desired n-th foot floor reaction force central point);

2) supposed floor surface shapes (coordinates of the supposed n-th floor contact point and the supposed n-th foot floor inclination);

3) desired posture to which the actual robot should finally follow (corrected desired foot position and/or posture with deformation compensation), or the actual joint displacements or their average with a frequency weight;

4) body inclination error;

5) actual floor reaction force (force component and moment component of the actual n-th foot floor reaction force).

When the parameters illustrated in FIG. 30 are really used as the inputs to the floor shape estimator 130, the estimation accuracy is maximized. However, other parameters may instead be used as discussed in a second embodiment of the invention.

Figure 33:
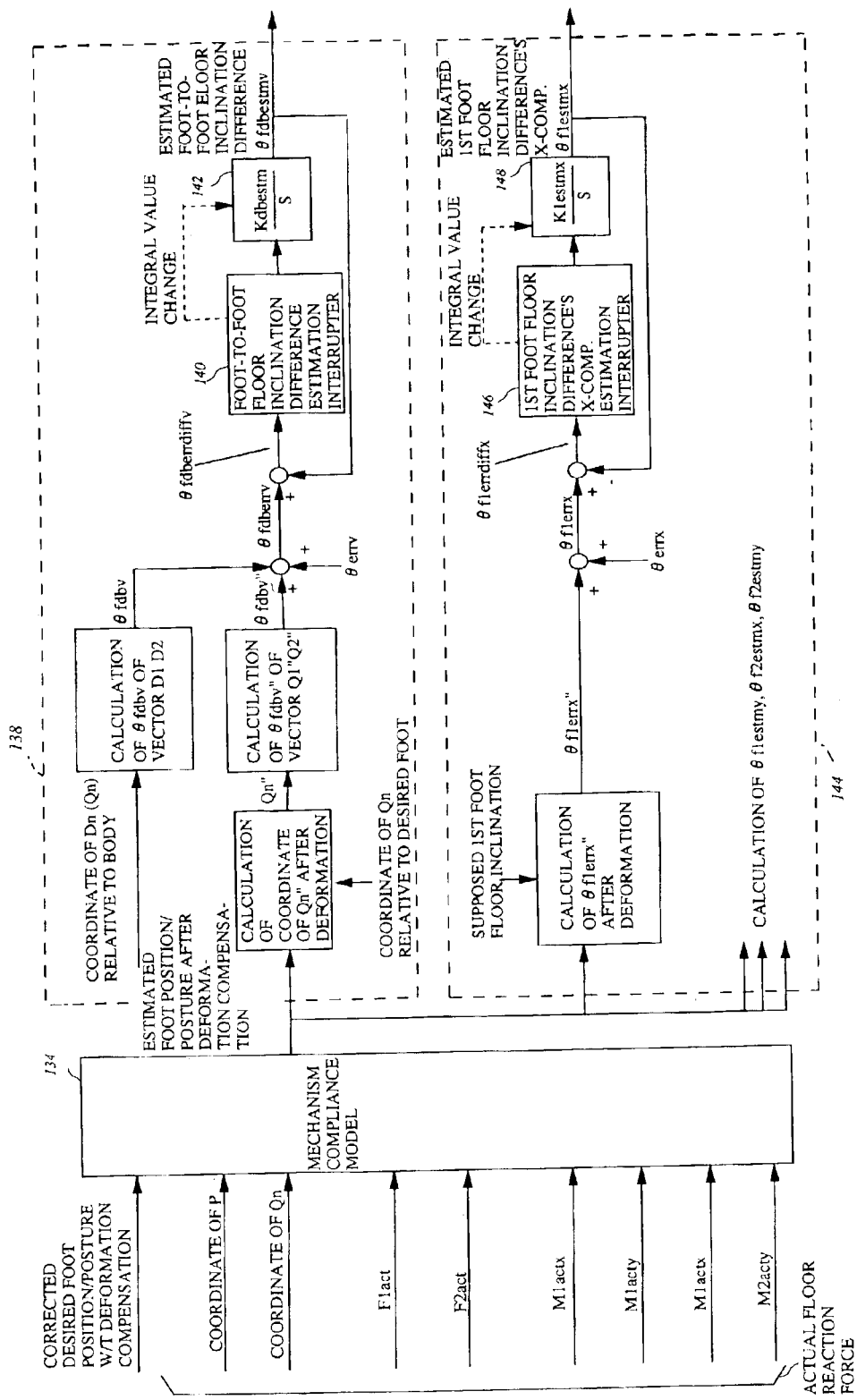
FIG. 33 is a block diagram showing the processing of a floor shape estimator in the system illustrated in FIG. 30 in a functional manner.

FIG. 33 is a block diagram showing the processing of the floor shape estimator 130.

Explaining elements constituting the floor shape estimator 130 illustrated in FIG. 33, it includes a mechanism compliance model 134.

The mechanism compliance model 134 calculates the amount of deformation of the compliance mechanism 42 when the input to the robot geometric model 110 (illustrated in FIG. 4), i.e., the corrected desired foot position and/or posture with deformation compensation is subject to the actual floor reaction force, and determines estimated foot position and/or posture after mechanism deformation by adding the calculated amount of deformation to the corrected desired foot position and/or posture with deformation compensation. The estimated foot position and/or posture after mechanism deformation is expressed by a position and/or posture relative to the body 24.

Figure 34:
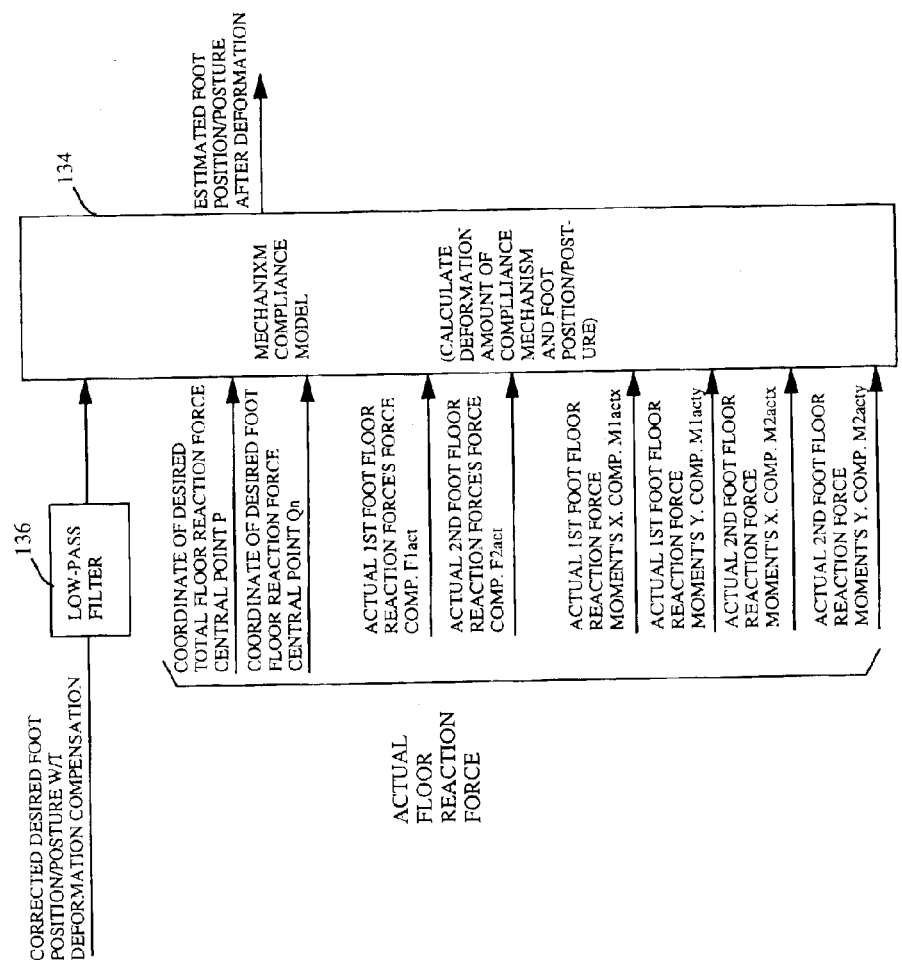
FIG. 34 is a block diagram showing the processing of a mechanism compliance model in the floor shape estimator illustrated in FIG. 33 in a functional manner.

When the delay in the robot joint displacement control can not be neglected, as illustrated in FIG. 34, it suffices if the corrected desired foot position and/or posture with deformation compensation is inputted to the mechanism compliance model 134 via a low-pass filter 136 having a characteristic corresponding to the delay.

Figure 35:
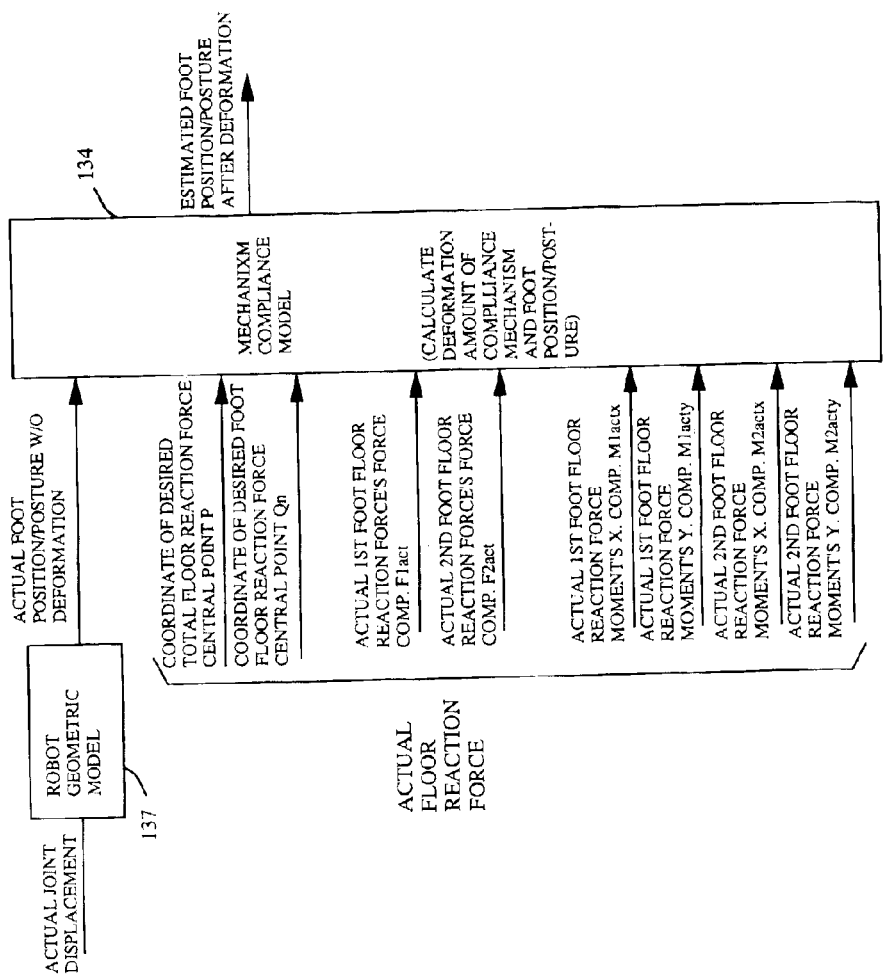
FIG. 35 is a block diagram also showing the processing of the mechanism compliance model in the floor shape estimator illustrated in FIG. 33 in a functional manner.

Alternatively, as illustrated in FIG. 35, it suffices if the actual foot position and/or posture without deformation is calculated by a robot geometric model 137 (model similar to the model 110 illustrated in FIG. 4) from the actual joint displacements and, instead of the corrected desired foot position and/or posture with deformation compensation, the calculated value is inputted to the compliance model 134.

Alternatively, it suffices if a weighted average of the actual foot position and/or posture without deformation and the corrected desired foot position and/or posture with deformation compensation is calculated using the frequency weight and, instead of the corrected desired foot position and/or posture with deformation compensation, the weighted average is inputted to the mechanism compliance model 134.

Strictly speaking, the actual foot position and/or posture without deformation compensation should be used.

However, if the joint displacement control is effectively conducted, any of the method mentioned above can be used.

Further, when the input to the robot geometric model 110 does not include the value with deformation compensation, it suffices if the corrected desired foot position and/or posture without deformation compensation is inputted to the robot geometric model 134.

Returning to the explanation of FIG. 33, the floor shape estimator 130 has a foot-to-foot floor inclination difference estimator 138. Specifically, in the figure, blocks for estimating the foot-to-foot floor inclination difference from the estimated foot position and/or posture after the mechanism has deformed, a coordinate of the desired foot floor reaction force central point relative to the desired foot, the supposed floor contact points and the body inclination error are called the "foot-to-foot floor inclination difference estimator". The processing of this estimator will be explained in the following.

First, the estimator calculates a coordinate of the desired foot floor reaction force central point after mechanism deformation Qn" from the estimated foot position and/or posture after mechanism deformation and the coordinate of the desired foot floor reaction force central point Qn relative to the desired foot. The desired foot floor reaction force central point after mechanism deformation Qn" is expressed as a position relative to the actual body.

More specifically, the desired n-th foot floor reaction force central point after mechanism deformation Qn" is calculated from the following equation, when the position of the desired n-th foot floor reaction force central point Qn relative to the foot is expressed by a vector Rn, the estimated n-th foot position after mechanism deformation is expressed by a vector Un and the estimated n-th foot posture after mechanism deformation is expressed by a matrix An.

$$Qn"=AnRn+Un \qquad \text{Eq. 21}$$

Next, the estimator calculates an inclination θ fdbv" about the vector V of a vector Q1"Q2" (whose initial point is Q1" and terminal point is Q2") relative to the actual body. The vector V is the vector defined in the composite compliance control.

And, the estimator also calculates an inclination θ fdbv about the vector V of a vector D1D2 (whose initial point is D1 and whose terminal point is D2) relative to the desired body, from the coordinate of the supposed n-th floor contact point Dn relative to the desired body.

Here, the supposed n-th floor contact point Dn is the same as the desired n-th foot floor reaction force central point Qn in a period during which the n-th foot is in contact with the floor, as defined above. At a time immediately before the n-th foot lands in the desired gait, the supposed n-th floor contact point Dn is set at the desired n-th foot floor reaction force central point Qn supposed at the foot landing. At a time immediately after the n-th foot is lifted in the desired gait, the supposed n-th floor contact point Dn is set at the desired n-th foot floor reaction force central point Qn supposed at the foot lifting Next, the estimator calculates an inclination about the vector V of the vector Q1"Q2" (whose initial point is Q1" and whose terminal point is Q2") relative to the desired body by adding an V-direction component of the body inclination error θ errv to the aforesaid inclination θ fdbv", and obtains a V-direction instantaneous foot-to-foot floor inclination difference calculation value θ fdberrv by subtracting θ fdbv from the calculated inclination.

Next, the estimator obtains θ fdberrdiffv by subtracting an estimated foot-to-foot floor inclination difference (just obtained) θ fdbestmv from θ fdberrv.

Then, in the estimator, a foot-to-foot floor inclination difference estimation interrupter 140 determines whether the foot-to-foot floor inclination difference estimation should be conducted or interrupted.

The foot-to-foot floor inclination difference estimation interrupter 140 immediately outputs the aforesaid value θ fdberrdiffv inputted thereto when it determines that the foot-to-foot floor inclination difference estimation should be conducted (continued), whereas it outputs 0 when it determines that the estimation should be interrupted. The details of the foot-to-foot floor inclination estimation interrupter 140 will be explained later.

Next, the estimator calculates the estimated foot-to-foot floor inclination difference θ fdbestmv by integrating the output of the foot-to-foot floor inclination difference estimation interrupter 140 at an integrator 142 by an integration constant Kdbestm. The estimated foot-to-foot floor inclination difference θ fdbestmv is an estimated value of the foot-to-foot floor inclination difference illustrated in FIG. 31 and is expressed as an angle about V. The above is processed by the foot-to-foot floor inclination difference estimator 138.

As illustrated in FIG. 30, the estimated foot-to-foot floor inclination difference θ fdbestmv is added to the feet compensating angle θ dbv, and the sum is inputted to the corrected desired foot position and/or posture calculator 114g as a feet compensating angle with floor shape estimation θ dbv'.

By repeating the processing mentioned above, the estimated foot-to-foot floor inclination difference θ fdbestmv converges to the actual foot-to-foot floor inclination difference. The foot position and/or posture is corrected by the estimated foot-to-foot floor inclination difference θ fdbestmv such that the influence of the foot-to-foot floor inclination difference upon the actual floor reaction force is absorbed.

In the above, when the feet are, in fact, on the floor, the aforesaid Qn" must be equal to the actual n-th floor contact point Dnact illustrated in FIG. 31. Accordingly, a difference θ fdberrv between the inclination of the vector Q1"Q2" and that of the vector D1D2 must be equal to the foot-to-foot floor inclination difference illustrated in FIG. 31.

However, due to a vibration in mechanical or control system of the robot 1 and an electric noise, the value θ fdberrv (obtained from the calculation algorithm mentioned above), in fact, deviates or fluctuates markedly around the actual foot-to-foot floor inclination difference. For that reason, if the value θ fdberrv is immediately used as the estimated value of the foot-to-foot floor inclination difference and is added to the feet compensating angle as illustrated in FIG. 30, the foot 22R(L) of the robot 1 may oscillate or vibrate hard.

However, if the foot-to-foot floor inclination difference estimation interrupter 140 (illustrated in FIG. 33) determines all the time that the estimation should be conducted or continued, the transfer function of portions from θ fdberrv to the estimated foot-to-foot floor inclination difference θ fdbestmv will be the same as the characteristic of a low-pass filter with first-order lag. In other words, the estimated foot-to-foot floor inclination difference θ fdbestmv will be the same as the value obtained by passing θ fdberrv through the low-pass filter. As a result, if the estimated foot-to-foot floor inclination difference θ fdbestmv is added to the feet compensating angle as illustrated in FIG. 30, the oscillation or vibration of the foot 22R(L) is unlikely to occur.

Incidentally, in the illustrated example, the time constant of the low-pass filter is 1/Kdbestm. Other example than that illustrated in FIG. 33, the configuration can be modified provided that the transfer function of portions from θ fdberrv to the estimated foot-to-foot floor inclination difference θ fdbestmv becomes equal to the low-pass filter. With this, it becomes possible to prevent the foot 22R(L) from oscillating or vibrating.

The characteristic features of the foot-to-foot floor inclination estimator 138 will then be explained.

In order to generate the compensating moment's V-direction component Mdmddbv necessary for posture stabilization control, if the feet compensating angle θ dbv (illustrated in FIG. 30) is changed to vary the corrected desired foot position and/or posture with deformation compensation (which is the finally desired foot position and/or posture), insofar as the feet are perfectly in contact with the floor, the actual position of the desired foot floor reaction force central point after mechanism deformation Qn" is at to the actual n-th floor contact point Dnact and remains unchanged. Rather, the compliance mechanism 42 deforms or the position and/or posture of the body 24 changes. In other words, the compliance mechanism 42 deforms or the position and/or posture of the body 24 changes such that the change of the corrected desired foot position and/or posture with deformation compensation is canceled.

In the foot-to-foot floor inclination difference estimator 138 in this embodiment, since the amount of mechanism deformation (calculated by the mechanism compliance model 134 based on the actual floor reaction force) and the actual body posture inclination error obtained from the output of the inclination sensor 36 are added at a point before the estimated foot-to-foot floor inclination difference θ fdbestmv is calculated based on the corrected desired foot position and/or posture with deformation compensation, even if the corrected desired foot position and/or posture with deformation compensation fluctuates, the estimated foot-to-foot floor inclination difference θ fdbestmv is free from the fluctuation.

This indicates that the posture control and the foot-to-foot floor inclination difference estimation are configured such that they do not conflict with each other. Accordingly, if the estimated foot-to-foot floor inclination difference θ fdbestmv is added to the feet compensating angle as illustrated in FIG. 30, the margin of control stability (i.e., unlikeness of oscillation) is not degraded. This is an advantages over the aforesaid prior art mentioned on the Journal of the Robotics Society of Japan.

Further, when the estimated foot-to-foot floor inclination difference θ fdbestmv is added to the feet compensating angle as illustrated in FIG. 30, since the influence of the foot-to-foot floor inclination difference, if it exists, can be canceled, the actual total floor reaction force will be the same as a case where the robot walks on the supposed floor in a steady-state manner. In addition, since the estimation of the foot-to-foot floor inclination difference and the correction of the compensating angle are conducted at every control cycle, even if the floor shape is being changed during the estimation, the system can surely estimate the foot-to-foot floor inclination difference after change and cancel the influence by the estimated value.

It should be noted here that, since the foot-to-foot floor inclination estimator 138 includes the low-pass filter as mentioned above, if the floor shape has changed at the time of foot landing or thereafter, the actual total floor reaction force is temporarily affected by the foot-to-foot floor inclination difference. However, the influence will then be attenuated by the time constant 1/Kdbestm.

As illustrated in FIG. 33, the floor shape estimator 130 has a foot floor inclination difference estimator 144. Specifically, in the figure, blocks for estimating the 1st foot floor inclination difference's X-component from the estimated 1st foot position and/or posture after mechanism deformation, the supposed 1st foot floor inclination and the body inclination difference's X-component are called the foot floor inclination difference estimator", more specifically, a "1st foot floor inclination difference's X-component estimator". The processing of the estimator will be explained in the following.

First, the estimator calculates an X-component of inclination of the estimated 1st foot position and/or posture after mechanism deformation (relative to the supposed 1st foot floor inclination) θ f1errx" based on the estimated 1st foot position and/or posture after mechanism deformation and the supposed 1st foot floor inclination. This corresponds to a sum obtained by adding the bending angle (illustrated in FIG. 2) estimated from the actual floor reaction force, to a difference between the desired 1st foot posture inclination and the supposed 1st foot floor inclination. Only a Y-component thereof is illustrated in FIG. 2.

Next, the estimator calculates an instantaneous 1st foot floor inclination difference's X-component θ f1errx by adding the body inclination difference's X-direction component θ errx to the aforesaid value θ f1errx"

Next, the estimator obtains θ f1errdiffx by subtracting, from θ f1errx, an estimated 1st foot floor inclination difference θ f1estmx (just calculated).

Then, in the estimator, a foot floor inclination difference estimation interrupter 146, more precisely a 1st foot floor inclination difference's X-component estimation interrupter determines whether the 1st foot floor inclination difference's X-component estimation should be conducted or interrupted.

The 1st foot floor inclination difference's X-component estimation interrupter immediately outputs the aforesaid value θ f1errdiffx inputted thereto when it determines that the 1st foot floor inclination difference's X-component estimation should be conducted (continued), whilst it outputs 0 when it determines that the estimation should be interrupted. The details of the foot floor inclination estimation interrupter 146, more precisely the 1st foot floor inclination difference's X-component estimation interrupter will be explained later.

Next, the estimator calculates the estimated 1st foot floor inclination difference's X-component θ f1estmx by integrating the output of the 1st foot floor inclination difference's X-component estimation interrupter at an integrator 148 by an integration constant K1estmx. The above is processed by the 1st foot floor inclination difference's X-component estimator.

As illustrated in FIG. 30, the estimated 1st foot floor inclination difference's X-component θ f1estmx is added to the 1st foot X-compensating angle θ 1x, and the sum is inputted to the corrected desired foot position and/or posture calculator 114g as a 1st foot X-compensating angle with floor shape estimation θ 1x'.

By repeating the processing mentioned above, the estimated 1st foot floor inclination difference's X-component θ f1estmx converges to the actual foot-to-foot floor inclination difference's X-component. The foot position and/or posture is corrected by the estimated foot-to-foot floor inclination difference θ f1estmx such that the influence of the 1st foot floor inclination difference's X-component upon the actual floor reaction force is absorbed.

It should be noted in the above that, although only the 1st foot floor inclination difference's X-component estimator 144 is illustrated in FIG. 33, the system includes a 1st foot floor inclination difference's Y-component estimator, a 2nd foot floor inclination difference's X-component estimator and a 2nd foot floor inclination difference's Y-component estimator and similar processing is conducted for estimating a 1st foot floor inclination difference's Y-component, a 2nd foot floor inclination difference's X-component and a 2nd foot floor inclination difference's Y-component.

The discussion made on the foot-to-foot floor inclination difference estimation will also be applied to this foot floor inclination difference estimation.

That is, when the 1st foot is, in fact, in contact with the floor completely, more precisely when the 1st foot is actually in area-contact with the floor or when the 1st foot is actually in line-contact with the floor at the Y-direction by the edge of the toe or heel of the sole, the calculated instantaneous 1st foot floor inclination difference's X-component θ f1errx must be equal to the actual 1st foot floor inclination difference's X-component.

However, due to a vibration in mechanical or control system of the robot 1 and an electric noise, the value θ f1errx (obtained from the calculation algorithm mentioned above), in fact, deviates or fluctuates markedly around the actual 1st foot floor inclination difference's X-component. For that reason, if the value θ f1errx is immediately used as the estimated value of the 1st foot floor inclination difference's X-component and is added to the 1st foot X-compensating angle as illustrated in FIG. 30, the foot 22R(L) of the robot 1 may oscillate or vibrate hard.

However, when the 1st foot floor inclination difference's X-component estimation interrupter (illustrated in FIG. 33) determines all the time that the estimation should be conducted or continued, the transfer function of portions from θ f1errx to the estimated 1st foot floor inclination difference's X-component θ f1estmx will be the same as the characteristic of a low-pass filter with first-order delay. In other words, the estimated 1st foot floor inclination difference's X-component θ f1estmx will be the same as the value obtained by passing θ f1errx through the low-pass filter.

As a result, if the estimated 1st foot floor inclination difference's X-component θ f1estmx is added to the 1st foot compensating angle as illustrated in FIG. 30, the oscillation or vibration of the foot 22R(L) is unlikely to occur. Incidentally, in the illustrated example, the time constant of the low-pass filter is 1/K1estmx.

Other than that illustrated in FIG. 33, the configuration can be modified provided that the transfer function of portions from θ f1errx to the estimated 1st foot floor inclination difference's X-component θ f1estmx becomes equal to the low-pass filter, similar to the case of the foot-to-foot floor inclination difference estimation. With this, it becomes possible to prevent the foot 22R(L) from oscillating or vibrating.

The characteristic features of the foot floor inclination difference estimator 144 will then be explained.

Similar to the foot-to-foot inclination difference estimation, the following can be stated as the features.

In order to generate the 1st foot compensating moment's V-component Mdmd1x necessary for posture stabilization control, if the 1st foot compensating angle θ 1x (illustrated in FIG. 30) is varied to change the corrected desired foot position and/or posture with deformation compensation (which is the finally desired foot position and/or posture), insofar as the 1st foot is perfectly in contact with the floor, the actual foot posture remains unchanged. Rather, the compliance mechanism 42 deforms or the position and/or posture of the body 24 changes. In other words, like the case of the foot-to-foot floor inclination difference estimation, the compliance mechanism 42 deforms or the position and/or posture of the body 24 changes such that the change of the corrected desired foot position and/or posture with deformation compensation is canceled.

In the 1st foot floor inclination difference's X-component estimator in this embodiment, the amount of mechanism deformation (calculated by the mechanism compliance model 134 based on the actual floor reaction force) and the actual body posture inclination error obtained from the output of the inclination sensor 36 are added at a point before the estimated 1st foot floor inclination difference's X-component θ f1estmx is calculated based on the corrected desired foot position and/or posture with deformation compensation. With this, even if the corrected desired foot position and/or posture with deformation compensation fluctuates, the estimated 1st foot floor inclination difference's X-component θ f1estmx is free from the fluctuation.

This indicates that the posture control and the 1st foot floor inclination difference estimation are configured such that they do not conflict with each other. Accordingly, if the estimated 1st foot floor inclination difference's X-component θ f1estmx is added to the 1st foot compensating angle as illustrated in FIG. 30, the margin of control stability is not degraded, like the case of the foot-to-foot floor inclination difference estimation.

Further, when the estimated 1st foot floor inclination difference's X-component θ f1estmx is added to the 1st foot compensating angle as illustrated in FIG. 30, since the influence of the 1st foot floor inclination difference, if it exists, can be canceled, the actual 1st foot floor reaction force will be the same as a case where the robot walks on the supposed floor in a steady-state manner.

In addition, since the estimation of the 1st floor inclination difference and the correction of the compensating angle are conducted at every control cycle, even if the floor shape is being changed during the estimation, the system can surely estimate the 1st foot floor inclination difference and cancel the influence by the estimated value.

It should be noted here that, since the 1st foot floor inclination difference estimator includes the low-pass filter as mentioned above, if the floor shape has changed at the time of the 1st foot landing or thereafter, the actual 1st foot floor reaction force is temporarily affected by the 1st foot floor inclination difference, but the influence will then be attenuated by the time constant 1/K1estmx.

The characteristic features of the floor shape estimation in this embodiment will next be summarized.

The composite compliance control on which the floor shape estimation of this embodiment is based, is characterized in that the controls of the actual total floor reaction force and foot reaction force through the manipulation of the corresponding one of the compensating angles are configured not to be in conflict with each other.

Therefore, when the operations to determine the estimated foot-to-foot floor inclination difference θ fdbestmv, to add it to the feet compensating angle θ dbv, to determine estimated foot inclination differences θ f1estmx, θ f1estmy, θ f2estmx and θ f2estmy, and to add each to the respective foot compensating angles θ 1x, θ 1y, θ 2x and θ 2y are conducted at the same time, the operations do not conflict with each other and no oscillation happens.

This characteristic feature as well as the characteristic features of the foot-to-foot floor inclination difference estimator 138 and the foot floor inclination difference estimator 144 can yield the following advantages.

1) It becomes possible to conduct the following controls or operations at the same time, i.e., to conduct the posture stabilization control to manipulate the feet compensating angle θ dbv and the respective foot compensating angles θ

$1x$, θ $1y$, θ $2x$ and θ $2y$ to control the actual floor reaction force, to estimate the foot-to-foot floor inclination difference, to add it to the feet compensating angle θ dbv, to estimate the foot floor inclination differences and add them to the respective foot compensating angles.

Briefly speaking, it becomes possible to estimate a plurality of parameters indicative of the floor shape differences at the same time, while conducting the respective compensation operations at the same time to cancel the influence of the estimated floor shape differences on the floor reaction force. In addition, it becomes possible to conduct the feet compensation operation for the posture stabilization.

2) The controls are unlikely to oscillate. (This is because no approximation to limit to a fine angle is not conducted in the composite compliance control.)

3) The estimation accuracy of the floor shape difference is high.

4) Since oscillation due to the conflict with the posture stabilization control is unlikely to occur, in the estimators 138, 144, it becomes possible to increase the gains (Kdbestm, K1estmx, K1estmy, K2estmx, K2estmy) and hence, it becomes possible to decrease or shorten the estimation time constant. With this, since it becomes possible to enhance the response in the feet compensation for canceling the influence of the floor shape difference upon the floor reaction force, the influence can be eliminated in a short period of time.

5) Since the estimation of the floor shape difference and the foot compensation for canceling the influence of the floor shape difference on the floor reaction force are conducted all the time, even if the floor shape changes during the operation, the influence remains temporarily and attenuates with respect to time by the estimation time constant.

Then, the aforesaid estimation interrupters 140, 146 will be explained.

First, the operation of the 1st foot floor inclination difference's Y-component estimation interrupter.

The 1st foot floor inclination difference's Y-component estimation interrupter determines whether the estimation of the 1st foot floor inclination difference's Y-component can be conducted normally and when it determines it impossible to conduct the estimation normally, it interrupts or discontinues the estimation.

More specifically, basically, the interrupter outputs 0 (i.e., to input 0 in the integration input to hold the integral value) to interrupt the estimation in a situation where the accuracy of the estimation of the 1st foot floor inclination difference's Y-component is liable to degrade or in a situation where the estimation of the 1st foot floor inclination difference's Y-component is liable to oscillate. In a situation other than the above, the interrupter outputs the inputted estimated 1st foot floor inclination difference's Y-component immediately to conduct or continue the estimation.

If the 1st foot floor inclination difference's Y-component estimator does not operate as desired and continues to pass the input immediately, the estimated 1st floor inclination difference's Y-component may oscillate under a certain situation.

This situation where the estimated 1st foot floor inclination difference's Y-component oscillate in this embodiment will then be explained.

Figure 36:
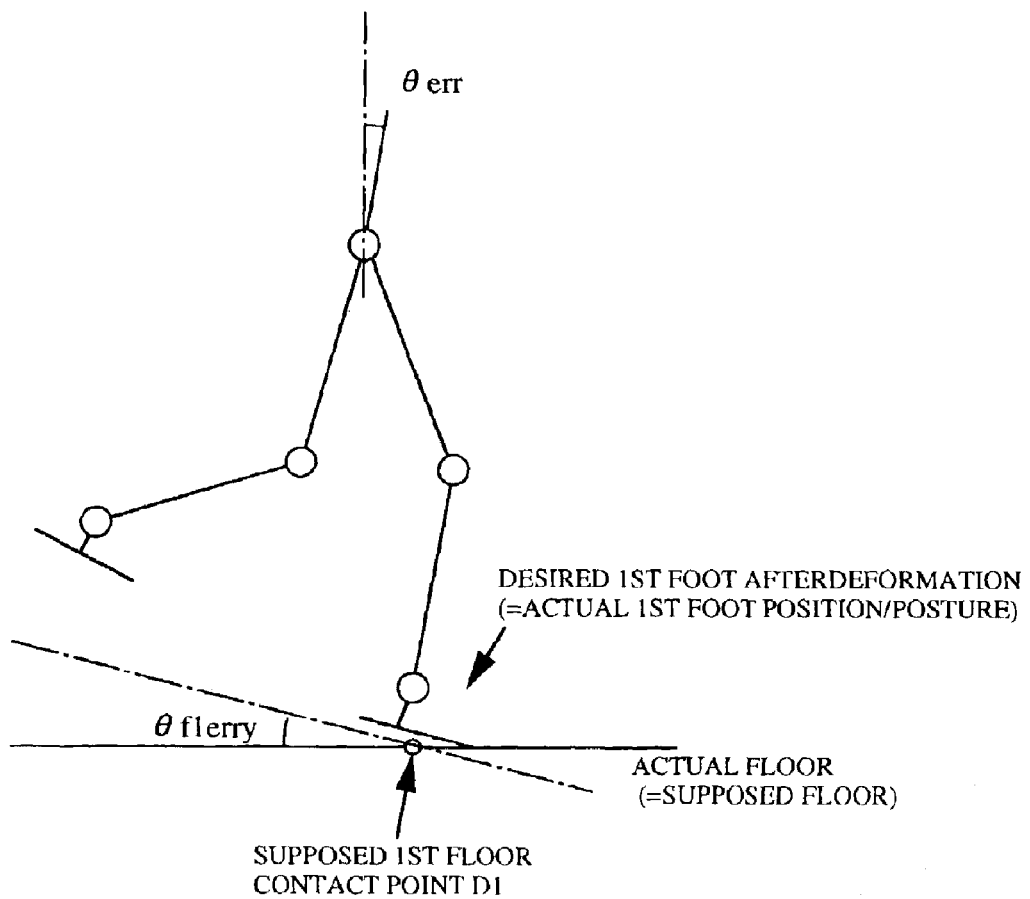
FIG. 36 is an explanatory view showing oscillation of foot floor inclination difference estimated value obtained in the embodiment of the present invention.

It is supposed a situation, illustrated in FIG. 36, where, since the robot 1 tilted forward in the leg-supporting period, the 1st foot's Y-compensating angle was manipulated in the posture stabilization control so as to generate a posture stabilization force markedly. However, this resulted in lifting of the 1st foot heel (which had to be in contact with the floor). It is supposed that the actual floor shape was equal to the supposed floor shape.

In this situation, the angle θ f1erry (obtained by adding the body inclination difference's Y-component θ erry to the estimated 1st foot posture inclination Y-component after mechanism deformation θ f1erry" relative to the supposed 1st foot floor inclination's Y-component) becomes a positive value, as illustrated in FIG. 36 When the 1st foot floor inclination difference's Y-component estimation interrupter outputs or pass the inputted θ f1errdiffy immediately, as mentioned above, the transfer function from θ f1erry to the estimated foot-to-foot floor inclination difference θ f1estmy is a first-order delay value. In other words, θ f1estmy follows θ f1erry with a small lag. θ f1estmy is added to the 1st foot compensating angle θ $1y$ to produce θ $1y'$. Only the configuration of θ f1$x'$ is illustrated in FIG. 30, that of θ $1y$ is similar.

Then, this 1st foot Y-compensating angle θ $1y'$ is added to the desired 1st foot position and/or posture and the amount of deformation calculated from the desired floor reaction force (floor reaction force in the desired gait) is subtracted therefrom (i.e., an amount of compensating deformation which cancels the amount of deformation is added), and the corrected desired 1st foot position and/or posture with deformation compensation is calculated.

In addition, an amount of mechanism deformation is calculated by the mechanism compliance model 134 based on the actual floor reaction force, and is added to the corrected desired 1st foot position and/or posture with deformation compensation to produce the estimated 1st foot position and/or posture after mechanism deformation. By subtracting the supposed 1st foot inclination's Y-component from the inclination's Y-component and by adding the body inclination difference's Y-component θ erry thereto, the aforesaid value θ f1erry is updated.

From these relationships mentioned above, the relationship between θ f1erry and θ f1estmy can be expressed as follows. In the following, the 1st foot mechanism deformation compensating angle due to desired floor reaction force indicates the amount of compensation for canceling the amount of deformation of the compliance mechanism 42 mentioned above.

θ f1erry=θ f1estmy+θ $1y$+1st foot mechanism deformation compensating angle's Y-component due to desired floor reaction force+θ erry+1st foot mechanism deformation angle's Y-component calculated from actual floor reaction force+desired 1st foot position and/or posture inclination's Y-component−supposed 1st foot inclination's Y-component       Eq. 22

During the one-leg supporting period in the desired gait, (desired 1st foot position and/or posture inclination's Y-component−supposed 1st foot inclination's Y-component) is 0. Accordingly, Equation 22 is rewritten as follows.

θ f1erry=θ f1estmy+θ $1y$+1st foot mechanism deformation compensating angle's Y-component due to desired floor reaction force+θ erry+1st foot mechanism deformation angle's Y-component calculated from actual floor reaction force   Eq. 23

When the 1st foot is in contact with the floor completely, whatever (θ f1estmy+θ $1y$+1st foot mechanism deformation compensating angle's Y-component due to desired floor reaction force+θ erry) is, the right term of Equation 23 becomes 0, since the mechanism deformation angle's Y-component calculated from the actual floor reaction force cancels it. As a result, θ flerry becomes always 0. Since θ fl*estmy* follows θ flerry with first-order lag, it gradually converges to 0. This indicates that the estimator can accurately estimate the situation that the actual floor shape is equal to the supposed floor shape.

However, in the example illustrated in FIG. 36, although the value (θ flestmy+θ 1y+1st foot mechanism deformation compensating angle's Y-component due to desired floor reaction force+θ erry) is a large positive value, the actual floor reaction force does not grow sufficiently since the foot heel is out of contact with the floor. As a result, the mechanism deformation amount's Y-component can not be a negative value enough for canceling the aforesaid value. In other words, the right term of the equation does not become 0. In this case, θ flerry does not become 0 and hence, θ flestmy does not converge to 0. This indicates that the estimated value was erroneous.

In such a case, in particular in a case where a situation which satisfies Eq. 24 mentioned below continues, even if θ flestmy is increased so as to be close to θ flerry, since θ flerry keeps the relationship of θ flerry>θ festmy, led from Equations 23 and 24, θ flerry becomes away form θ 1estmy. Repeating this, θ flestmy oscillates in the positive direction more and more. This indicates that the estimated value is being oscillated.

θ 1y+1st foot mechanism deformation compensating angle's
  Y-component due to desired floor reaction force+θ *erry*+1st
  foot mechanism deformation angle's Y-component calculated
  from actual floor reaction force>0     Eq. 24

The processing of the 1st foot floor inclination difference's Y-component estimation interrupter in this embodiment will then be explained with reference to FIG. 37. The processing is repeated at every control cycle.

In S300, the estimation mode of 1st foot floor inclination difference's Y-component is determined in response to the timing of the desired gait.

Figure 38:
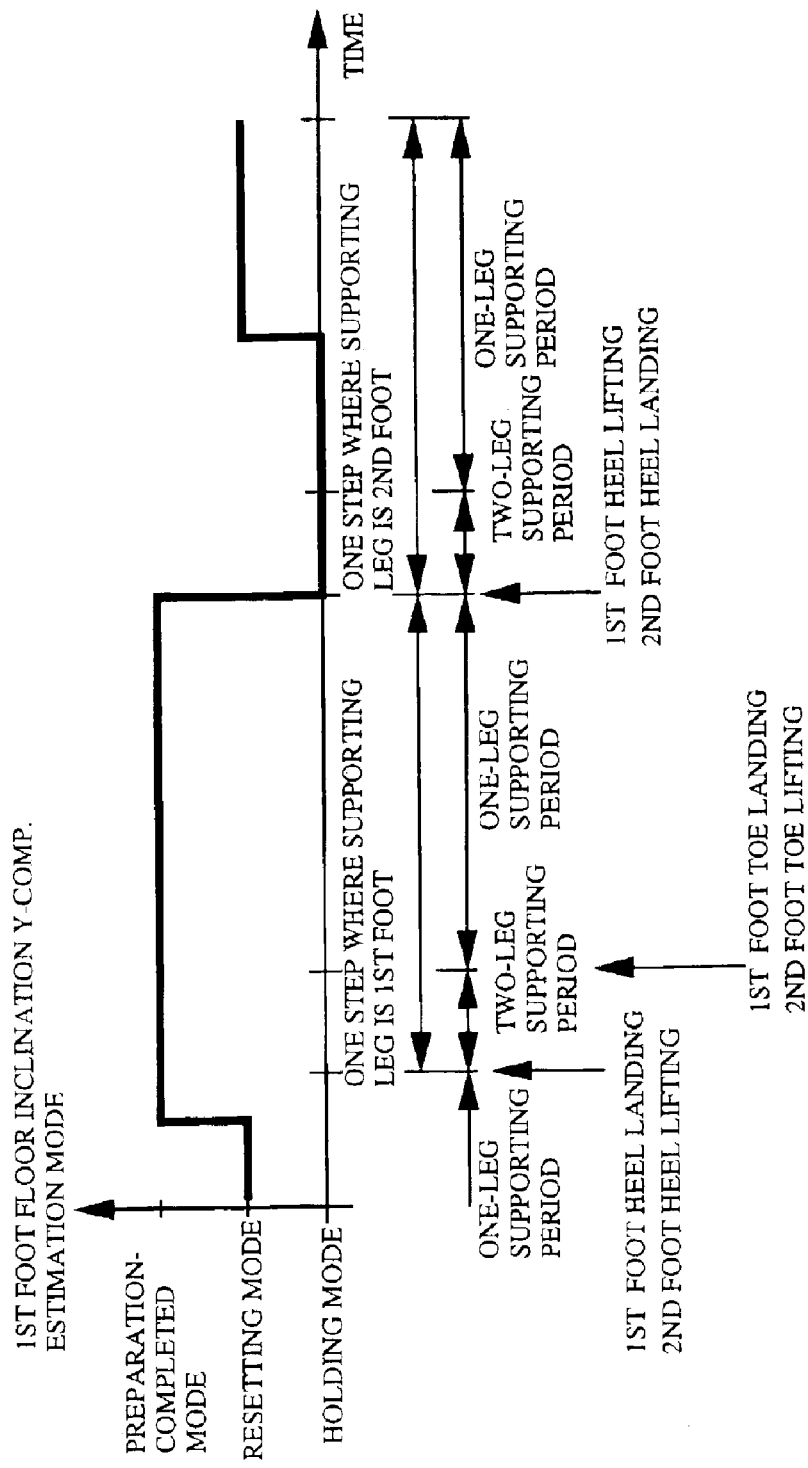
FIG. 38 is a time chart showing the processing of FIG. 37.

Specifically, the estimation mode of the 1st foot floor inclination difference's Y-component can be one of a resetting mode, a holding mode and a preparation-completed mode. As illustrated in FIG. 38, one among from the three is selected with respect to time in the desired gait. The illustrated transit pattern of mode is the gait illustrated in FIG. 5. When the desired gait is changed, the transit pattern of mode should be changed in response thereto.

Then, in S302, the following processing is conducted in response to the estimation mode of the 1st foot floor inclination Y-component mode.

Specifically, when the estimation mode of the 1st foot floor inclination's Y-component is the resetting mode, the program proceeds to S304 in which the estimated 1st foot floor inclination difference's Y-component θ flestmy is forced to return or converge to 0 gradually, and to S306 in which the output of the 1st foot floor inclination difference's Y-component estimator interrupter is determined to be 0.

As illustrated in FIG. 38, the resetting mode is determined to be a period of time during which the 1st foot is completely out of the floor such that movement of the 1st foot does not influence the floor reaction force. When there is no relationship between the foot floor inclination difference of the 2nd foot floor contact point landed one step earlier and that of the 1st foot floor contact point to be landed next, it is preferably to return the estimated 1st foot floor inclination difference's Y-component to 0 forcibly and gradually as mentioned above.

However, for example, if it has been known that undulation of the actual floor (which is not taken into account in the supposed floor) is calm, the existence of the relationship can be presumed to a fair extent, this may be modified such that the estimated 1st foot floor inclination difference's Y-component θ flestmy converges gradually to a value obtained by multiplying a positive constant (which is smaller than 1) by the estimated 2nd foot floor inclination difference of the 2nd foot floor contact point landed one step earlier. This can further be modified such that a value to which the estimated value converges is determined, not from the estimated foot floor inclination difference's Y-component one step earlier, but from that several steps earlier, or is determined from both the estimated values one step earlier and several steps earlier.

When the estimation mode of the 1st foot floor inclination's Y-component is the holding mode, the program proceeds to S308 in which the output of the 1st foot floor inclination difference's Y-component interrupter is determined to be 0. Accordingly, the estimated 1st foot floor inclination difference's Y-component θ flestmy is held to a value at a time just before the mode is changed to the holding mode.

The holding mode is determined to be a period of time during which the estimated 1st foot floor inclination difference's Y-component is liable to oscillate or the accuracy of estimation accuracy is liable to degrade. For example, as illustrated in FIG. 38, it should be set within a period of time which starts when the heel or toe of the 1st foot begins to leave the floor and continues for a fair amount of time after the 1st foot has left the floor completely.

In a period of time other than the above, in other words in a period of time in which the estimation of the 1st foot floor inclination difference's Y-component can be conducted normally, the estimation mode of the 1st foot floor inclination's Y-component is determined to be the preparation-completed mode.

In this preparation-completed mode, the following processing will be conducted.

Specification, the program proceeds to S310 in the flow chart in which the actual 1st foot floor reaction force central point (point's position) Q1act is determined based on the actual 1st foot floor reaction force's moment M1act and the actual 1st foot floor reaction force's force component F1act. The actual 1st foot floor reaction force central point (point' position) Q1act indicates a point of action on the foot sole about which moment components other than vertical component of the actual 1st foot floor reaction force's moment becomes 0. The X-coordinate of the actual 1st foot floor reaction force central point Q1act is named a "Q1actx".

The program then proceeds to S312 in which the actual 1st foot floor reaction force's Z-component (vertical component) F1actz and the aforesaid coordinate point Q1actx relative to preset 1st foot estimation permissible minimum floor reaction force F1min, 1st foot estimation permissible maximum area Q1maxx and 1st foot estimation permissible minimum area Q1minx satisfy at least one of the following conditions:

| | |
|---|---|
| $F1actz < F1min$ | Condition 1) |
| $Q1actx > Q1maxx$ and $\theta$ *flerrdiffy* $> 0$ | Condition 2) |
| $Q1actx < Q1minx$ and $\theta$ *flerrdiffy* $< 0$ | Condition 3) |

As regards Condition 1, the 1st foot estimation permissible minimum floor reaction force F1min is a threshold value indicating that the estimation of the 1st foot floor inclination is impossible if the floor reaction force acting on the 1st floor is less than it, and should be preset to a value smaller than the weight of the robot 1. In other words, Condition 1 indicates a situation where accurate estimation of the 1st foot floor inclination's Y-component is impossible since the pressure between the 1st foot and the floor is too small.

Figure 39:
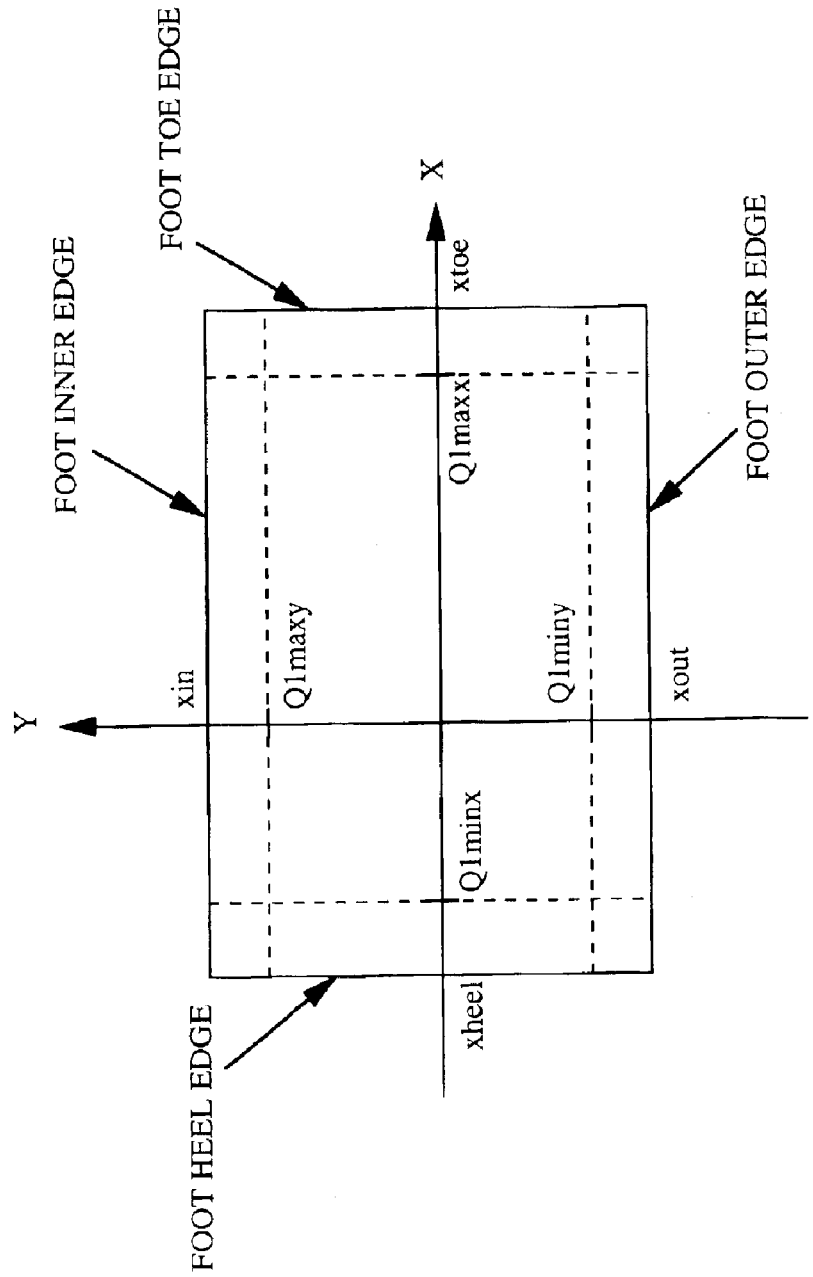
FIG. 39 is an explanatory view explaining the processing of FIG. 37.

As regards Conditions 2) and 3), when defining the X-coordinate of the toe as "xtoe" and the heel "xheel" as in the foot coordinate system, the 1st foot estimation permissible maximum area Q1max$x$ should be preset to a value slightly smaller than xtoe, whilst the 1st foot estimation permissible minimum area Q1min$x$ should be preset to a value slightly larger than xheel. FIG. 39 illustrates the relationship therebetween.

When the estimation is conducted in an ideal manner, the 1st foot estimated permissible maximum area Q1max$x$ and the 1st foot estimation permissible minimum area Q1min$x$ can be preset to values corresponding to the foot edge. However, in fact, there occurs a detection error which makes the estimation value to oscillate. In order to prevent this from occurring, as illustrated in FIG. 39, the 1st foot estimation permissible maximum area Q1max$x$ and the 1st foot estimation permissible minimum area Q1min$x$ should be preset to points that reside inner than the edges by a fair amount.

Condition 2) indicates a situation in which the integrator input θ f1errdiffy is a positive value although the feet is about to lift, in other words, the estimated 1st foot floor inclination is being changed to a direction in which the foot heel lifts. When the estimation is continued in such a situation, the 1st foot Y-compensating angle with floor shape estimation will change to that direction more and more.

Condition 3) indicates a situation in which the integrator input θ f1errdiffy is a negative value although the foot toe is about to lift, in other words, the estimated 1st foot floor inclination is being changed to a direction in which the foot toe lifts. When the estimation is continued in such a situation, the 1st foot Y-compensating angle with floor shape estimation will change to that direction more and more.

Figure 37:
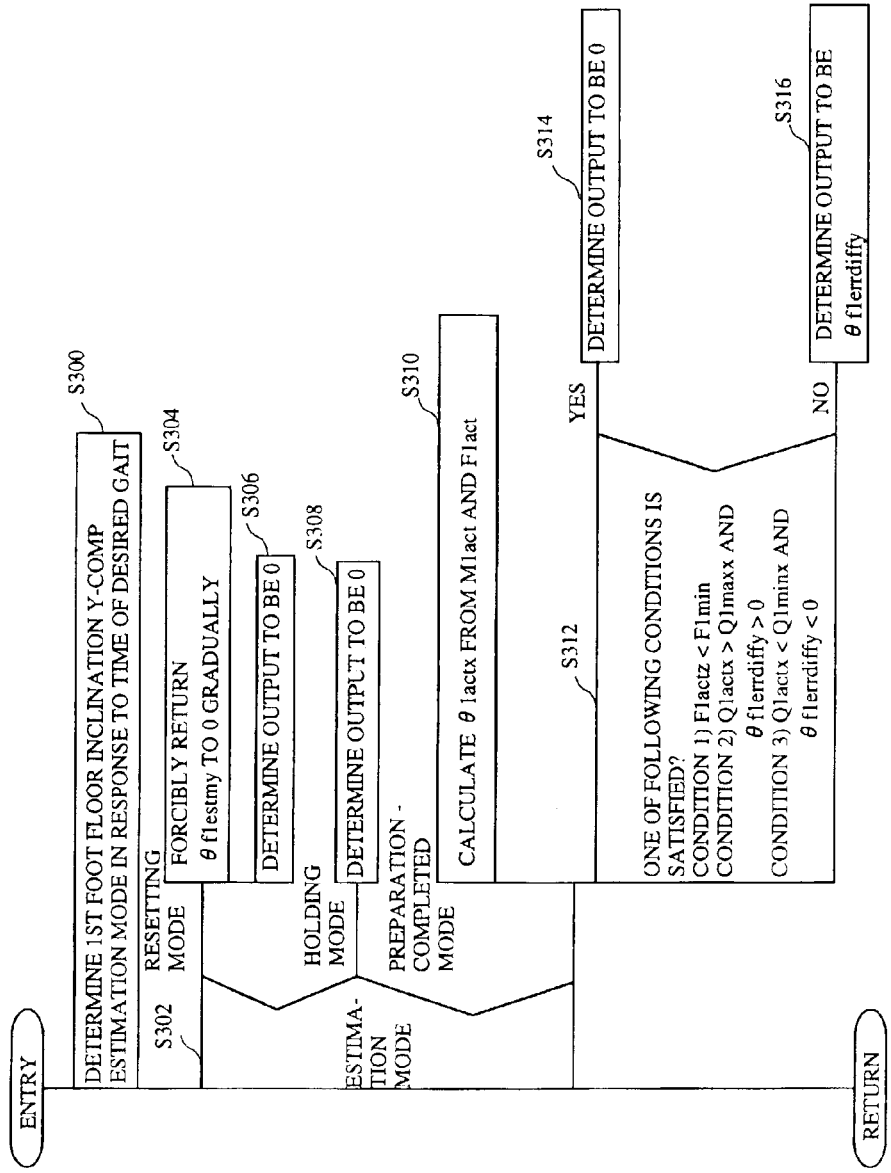
FIG. 37 is a flow chart showing the processing of a foot floor inclination difference estimation interrupter according to the embodiment of the present invention.

Returning to the explanation of the flow chart of FIG. 37, when the result in S312 is affirmative and it is determined that at least one of Conditions 1), 2) and 3) is satisfied, since the estimation should be interrupted or discontinued, the program proceeds to S314 in which the output of the 1st foot floor inclination difference's Y-component estimation interrupter is determined to be 0. On the other hand, when the result is negative in the step, since this indicates the there is no problem in conducting the estimation, the program proceeds to S316 in which the output is determined to be θ f1errdiffy.

It is sufficient if the equations of Conditions 1), 2) and 3) can indicate the situations mentioned above. Accordingly, in Condition 1), instead of the actual 1st foot floor reaction force's Z-component (vertical component) F1actz, the component normal to the foot (named a "F1actz") of the actual 1st foot floor reaction force's force component F1act can be used.

In Conditions 2) and 3), instead of the actual 1st foot floor reaction force central point's position Q1act, a point of action on the foot sole about which moment components other than that normal to the foot of the actual 1st foot floor reaction force's moment becomes 0 can be used. This point is named a "Q1act'".

Then, explaining the processing of the 1st foot floor inclination difference's X-component estimation interrupter, it conducts the processing similar to that of the 1st foot floor inclination difference's Y-component estimation interrupter.

The differences therebetween are that, in Conditions 2) and 3), instead of those indicating lifting of foot toe or heel, those indicating lifting of foot's inner or outer edge are used. To be more specific, Conditions 2' and 3') mentioned below are newly used. In these conditions, as illustrated in FIG. 39, Q1max$y$ and Q1min$y$ are preset to areas which are slightly towards the foot sole center from the edges.

Q1act$y$>Q1max$y$ and θ f1errdiff$x$<0　　　Condition 2')

Q1act$y$<Q1min$y$ and θ ferrdiff$x$>0　　　Condition 3')

Due to the direction of coordinate system, the sign of inequality are partially changed in the equations. In addition, as regards the transit timing of the estimation mode of the 1st foot floor inclination difference's X-component, the termination of the preparation-completed mode may be delayed slightly than that of the Y-component. This is because the 1st foot floor inclination difference's X-component can be estimated insofar as the foot toe edge in contact with the floor.

It should also be noted that the processing or operation of the 2nd foot floor inclination difference estimation interrupter is the same as that of the 1st foot floor inclination difference estimation interrupter.

The processing of the foot-to-foot floor inclination difference's estimation interrupter 140 will then be explained with reference to FIG. 40. The processing is repeated at every control cycle. The processing is basically the same as that of the 1st foot floor inclination difference's Y-component estimator, but is different from that in detailed portions.

In S400, the estimation mode of the foot-to-foot floor inclination is determined in response to the timing of the desired gait.

Figure 41:
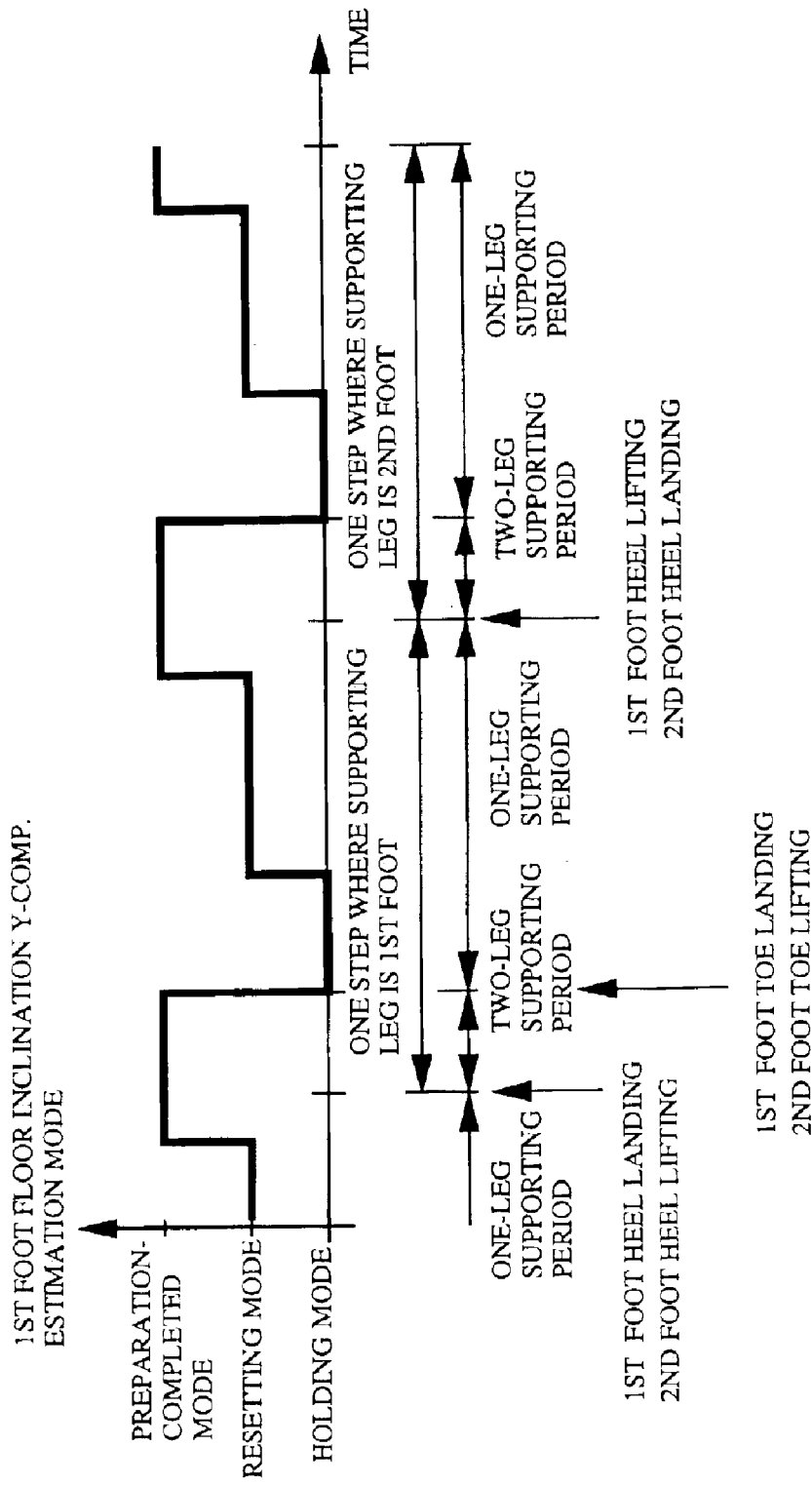
FIG. 41 is a time chart showing the processing of FIG. 40.

Specifically, the estimation mode of the foot-to-foot floor inclination should similarly be determined in response to time in the desired gait, as illustrated in FIG. 41. The illustrated transit pattern of mode is also the gait illustrated in FIG. 5. When the desired gait is changed, the transit pattern of mode should be changed in response thereto.

Then, in S402, the following processing is conducted in response to the estimation mode of the foot-to-foot floor inclination.

Specifically, when the estimation mode of the foot-to-foot floor inclination is a resetting mode, the program proceeds to S404 in which the estimated foot-to-foot floor inclination difference θ fdbestmv is forced to return or converge to 0 gradually, and to S406 in which the output of the foot-to-foot floor inclination difference estimation interrupter is determined to be 0. As illustrated in FIG. 41, the resetting mode is determined to be the one-leg supporting period such that movement of the feet compensating angle with floor shape estimation does not influence the floor reaction force.

When there is no relationship between the foot-to-foot floor inclination difference at a time landed one step earlier and that at a time to be landed next, it is preferably to return the estimated foot-to-foot floor inclination difference θ fdbestmv to 0 forcibly and gradually as mentioned above. However, for example, if it has been known that undulation of the actual floor (which is not taken into account in the supposed floor) is calm, the existence of the relationship can be presumed to a fair extent, this may be modified such that the estimated foot-to-foot floor inclination θ fdbestmv converges gradually to a value obtained by multiplying a positive constant (which is smaller than 1) by the estimated foot-to-foot floor inclination difference at the time landed one step earlier.

This can further be modified such that a value to which the estimated value converges is determined, not from the estimated foot-to-foot floor inclination at the time one step earlier, but from that several steps earlier, or is determined from both the estimated values one step earlier and several steps earlier.

When the estimation mode of the foot-to foot floor inclination is a holding mode, the program proceeds to S408 in which the output of the foot-to-foot floor inclination difference estimation interrupter is determined to be 0. Accordingly, the estimated foot-to-foot floor inclination difference θ fdbestmv is held to a value at a time just before the mode is changed to the holding mode.

The holding mode is determined to be a period of time during which the estimated foot-to-foot floor inclination difference is liable to oscillate or the accuracy of estimation is liable to degrade. For example, as illustrated in FIG. 41, it should be set within a period of time which starts at the termination of the two-leg supporting period and continues for a fair amount of time thereafter.

In a period of time other than the above, in other words in a period of time in which the estimation of the foot-to-foot floor inclination difference can be conducted normally, the estimation mode of the foot-to-foot floor inclination difference is determined to be a preparation-completed mode.

In this preparation-completed mode, the following processing will be conducted.

Specification, the program proceeds to S410 in which the actual foot floor reaction force relative to preset foot-to-foot estimation permissible minimum floor reaction force Fmin and foot-to-foot floor inclination estimation permissible ratio rmin satisfy at least one of the following conditions:

---
Condition 4) F1actz < Fmin and F2actz < Fmin
Condition 5) F2actz/ (F1actz + F2actz) < rmin; and
dberrdiffv > 0
Condition 6) F2actz/ (F1actz + F2actz) < rmin; and
dberrdiffv < 0
---

As regards Condition 4, the foot-to-foot floor inclination estimation permissible minimum floor reaction force Fmin is a threshold value indicating that the estimation of the foot-to-foot floor inclination is impossible if the floor reaction force acting on the 1st foot and 2nd foot is less than it, and should be preset to a value smaller than the weight of the robot 1. In other words, Condition 4 indicates a situation where accurate estimation of the foot-to-foot floor inclination is impossible since the pressure between the 1st and 2nd feet and the floor is too small.

As regards Conditions 4) and 5), when the estimation is conducted in an ideal manner, the foot-to-foot floor inclination estimation permissible ratio rmin may be 0. However, in fact, there occurs a detection error which makes the estimation value to oscillate. In order to prevent this from occurring, the foot-to-foot floor inclination estimation permissible ratio rmin should be preset to a positive value which is smaller than 1 by a fair amount.

Condition 5) indicates a situation in which the integrator input θ fdberrdiffv is a positive value although the 2nd foot is about to lift, in other words, the estimated foot-to-foot floor inclination is being changed to a direction in which the 2nd foot lifts. When the estimation is continued in such a situation, the feet compensating angle with floor shape estimation will change to that direction more and more.

Condition 6) indicates a situation in which the integrator input θ fdberrdiffv is a negative value although the 1st foot is about to lift, in other words, the estimated foot-to-foot floor inclination is being changed to a direction in which the 1st foot lifts. When the estimation is continued in such a situation, the feet compensating angle with floor shape estimation will change to that direction more and more.

Figure 40:
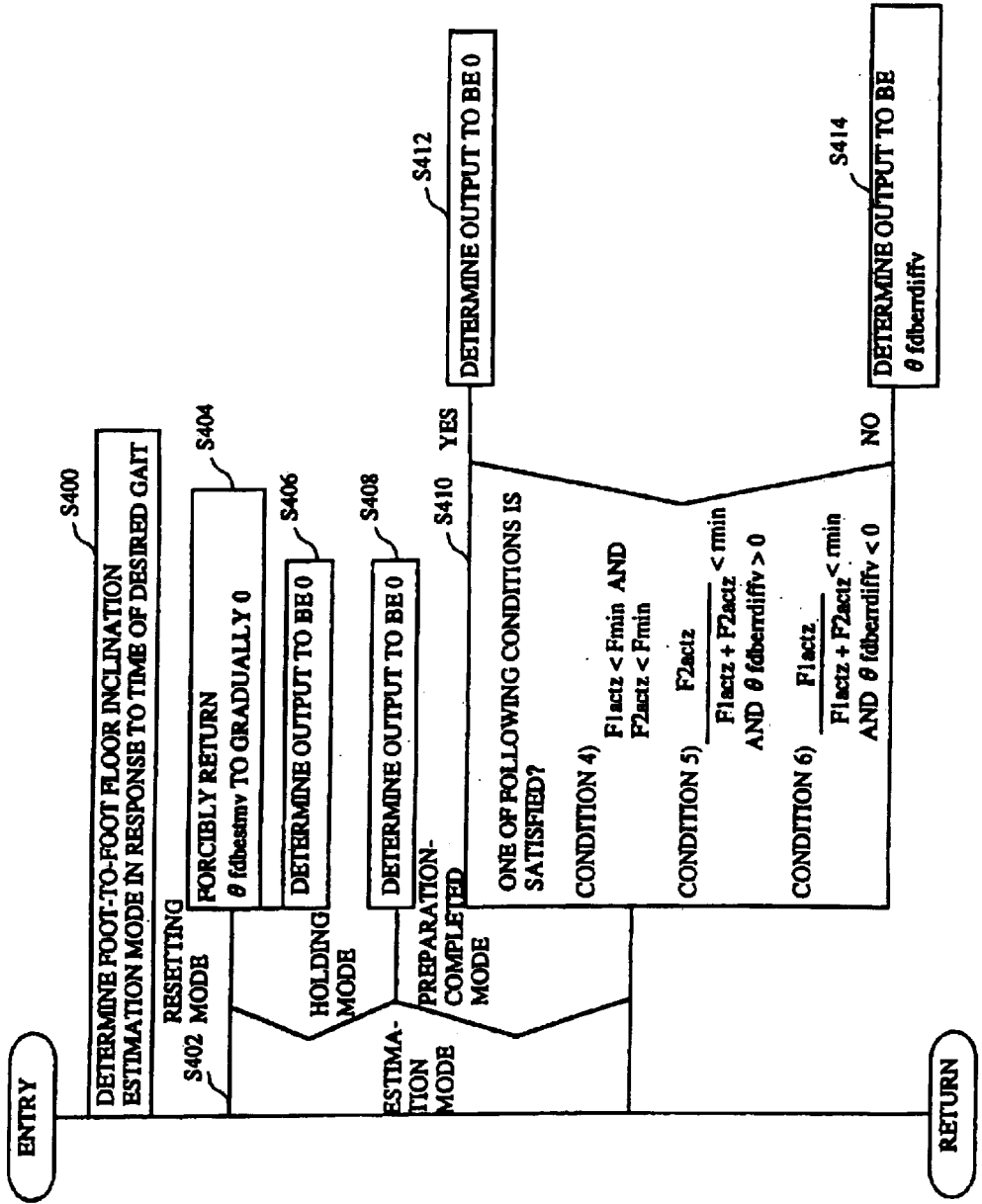
FIG. 40 is a flow chart showing the processing of a foot-to-foot floor inclination difference estimation interrupter according to the embodiment of the present invention.

Returning to the explanation of the flow chart of FIG. 40, when it is determined that at least one of Conditions 4), 5) and 6) is satisfied, since the estimation should be interrupted or discontinued, the program proceeds to S412 in which the output of the foot-to-foot floor inclination difference estimation interrupter is determined to be 0. On the other hand, when the result is negative in the step, since this indicates the there is no problem in conducting the estimation, the program proceeds to S414 in which the output is determined to be θ fdberrdiffv.

It is sufficient if the equations of Conditions 4), 5) and 6) can indicates the situations mentioned above. Accordingly, instead of the actual n-th foot floor reaction force's Z-component (vertical component) Fnactz, the component normal to the foot (named a "Fnactz'") of the actual n-th foot floor reaction force's force component Fnact can be used.

Having been configured in the foregoing manner, the system can estimate the floor shape (that has been difficult in the prior art), i.e, the system can accurately estimate the inclination of the surface with which the foot is in contact and the height difference between the surfaces with which the feet are in contact, at the same time, i.e., in a composite manner.

Further, even if the floor shape is different from that supposed, the system can generate the floor reaction force as desired by correcting the foot trajectory to absorb the influence.

Further, the system can eliminate the steady-state error between the actual floor reaction force and a desired value in the control as least as possible, which the prior art composite control could not achieve. In other words, the system can solve the steady-state error due to a deviation in the floor reaction force.

Further, since the system is configured to interrupt or discontinue the floor shape estimation in a situation where the estimation accuracy is liable to degrade or the estimated value is likely to oscillate, in addition to the advantages mentioned above, the estimated value obtained will not be inappropriate.

It should be noted in the above, it is sufficient for the floor shape estimation system for a legged mobile robot according to this embodiment, if it estimates the floor shape in the manner mentioned above. In other words, it is not essential for the system to control the desired position posture such as the foot trajectory by manipulated the floor reaction force based on the estimated value.

Next, a floor shape estimation system of a legged mobile robot according to a second embodiment of the present invention will be explained.

Figure 42:
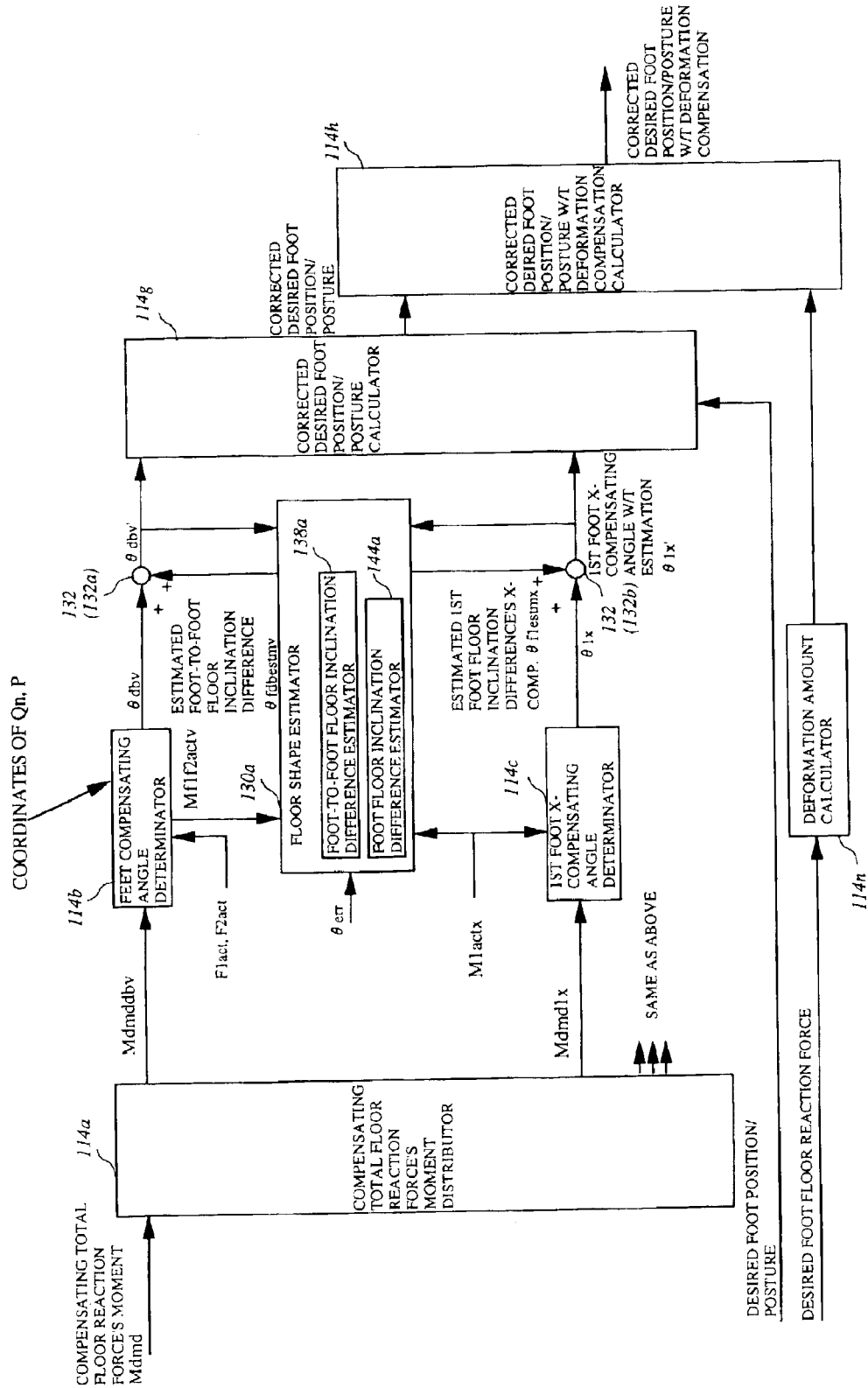
FIG. 42 is a block diagram, similar to FIG. 30, but showing the configuration of a floor shape estimation system of a legged mobile robot according to a second embodiment of the present invention.

The second embodiment is a simplification of the first embodiment. FIG. 42 illustrates the entire configuration of the floor shape estimation system according to the second embodiment. The configuration of the second embodiment is different in the inputs to floor shape estimator and the processing in the floor shape estimator. The rest of the configuration is the same as that of the first embodiment.

Briefing the second embodiment, the compliance model 134 of the first embodiment is approximated by the configuration mentioned above and the block diagram illustrating the configuration is rewritten to be equivalent to that of the first embodiment.

Before entering the explanation of the floor shape estimator according to the second embodiment, terms and the compliance model used in the second embodiment will be explained.

Figure 43:
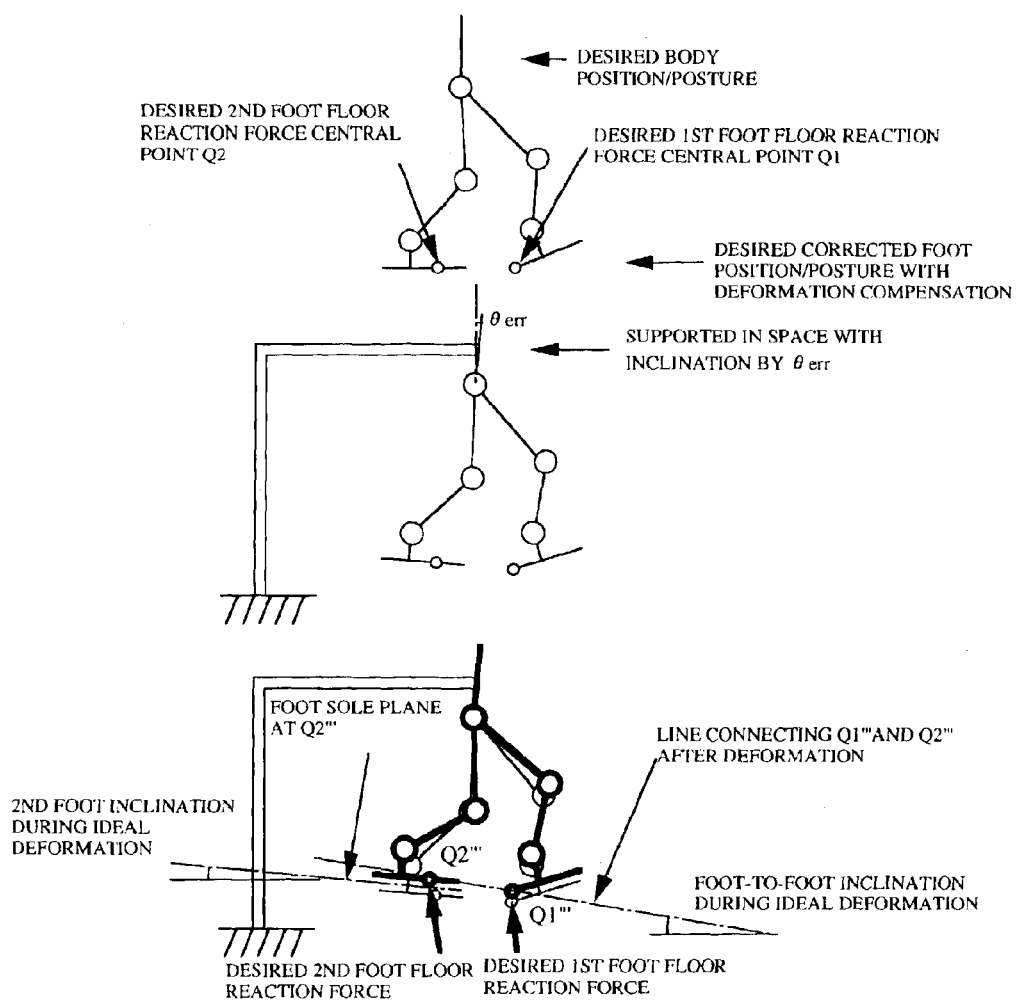
FIG. 43 is an explanatory view showing definition of terms which are used in the system according to the second embodiment illustrated in FIG. 42.

It is assumed here that, as illustrated at the top of FIG. 43, the joint displacement control of the robot 1 is conducted in such a way that the relative relationship between the corrected desired foot position and/or posture with deformation compensation and the desired body position and/or posture are satisfied, then, as illustrated at the medium of the figure, the body 24 of the robot 1 is inclined or tilted by the body inclination error θ err from the desired body posture and is supported in space, and then, as illustrated at the bottom of the figure, external force corresponding the desired foot floor reaction force is imparted to each foot. Here, the inclination of a vector (about the aforesaid V-direction) whose initial point is a desired 1st foot floor reaction force central point Q1'41 and whose terminal point is a desired 2nd foot floor reaction force central point Q2''' in the foot of this assumed situation, is called a "foot-to-foot inclination during ideal deformation".

In addition, the posture inclination of the n-th foot of this assumed situation is called an "n-th foot inclination during ideal deformation". If the body inclination error, the feet compensating angle, the foot compensating angle, the estimated foot-to-foot floor inclination difference, the estimated 1st foot floor inclination difference and the estimated 2nd foot floor inclination difference are all 0, the foot-to-foot inclination during ideal deformation becomes equal to the supposed foot-to-foot floor inclination, whilst the n-th foot inclination during ideal deformation becomes equal to the supposed n-th foot floor inclination.

The sum of the supposed foot-to-foot floor inclination and the estimated foot-to-foot floor inclination difference is called an "estimated foot-to-foot floor inclination". This is expressed by an angle about the V-direction. The sum of the supposed n-th foot floor inclination and the estimated n-th foot floor inclination difference is called an "estimated n-th floor inclination". The difference between the foot-to-foot inclination difference during ideal deformation and the estimated foot-to-foot floor inclination difference is called an "estimated feet interference angle θ dbintv" This is also expressed by an angle about the V-direction.

The difference between the 1st foot inclination during ideal deformation and the estimated 1st foot floor inclination is called an "estimated 1st foot interference angle θ 1int". Similarly, the difference between the 2nd foot inclination during ideal deformation and the estimated 2nd foot floor inclination is called an "estimated 2nd foot interference angle θ 2int".

If it is assumed that the estimated foot-to-foot floor inclination and the actual foot-to-foot floor inclination are equal to each other and that the desired foot floor reaction force central point of the actual robot foot is in contact with the floor, the compliance mechanism 42 of the actual robot must deform so as to cancel the estimated feet interference angle θ dbintv.

This mechanism deformation must yield the V-direction component of the sum of the moments of the foot floor reaction force's force components of the two feet about the desired total floor reaction force central point. This V-direction moment component is called a "Mdestmv".

Figure 44:
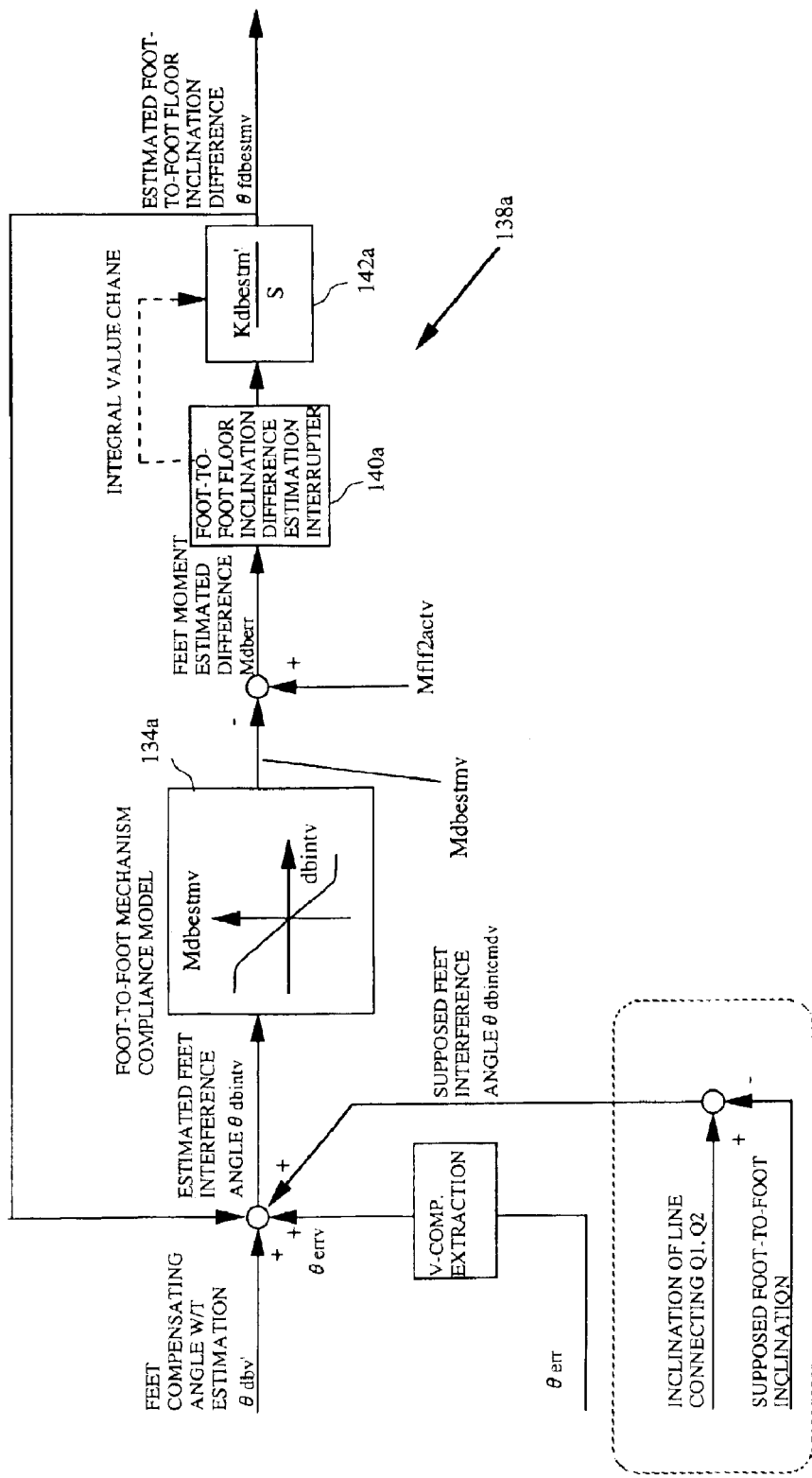
FIG. 44 is a block diagram showing the processing of a foot-to-foot floor inclination difference estimator of the system according to the second embodiment.

Then, the relationship between the estimated feet interference angle θ dbintv and the V-direction moment component Mdbestmv should be determined beforehand and stored in memory. Among of characteristics of the compliance mechanism 42 of the robot 1, this relationship indicates only a characteristic of the feet interference angle and hence is called a "foot-to-foot mechanism compliance model". This is illustrated in FIG. 44 with reference numeral 134a.

If it is assumed that the estimated n-th foot floor inclination is equal to the actual n-th foot floor inclination and that the n-th foot of the robot 1 is in contact with the floor completely, the compliance mechanism 42 of the robot 1 must deform so as to cancel the estimated n-th foot interference angle θ nint. This mechanism deformation must yield the moment of the 1st foot floor reaction force about the desired 1st foot floor reaction force central point. This moment is called a "M1estm". Similarly, this mechanism deformation must also yield the moment of the 2nd foot floor reaction force about the desired 2nd foot floor reaction force central point. This moment is called a "M2estm".

Then, relationship between the estimated n-th foot interference angle's X-component θ nintx and the moment component's X-component Mnestmx should be determined beforehand and stored in memory. Among of characteristics of the compliance mechanism 42 of the robot 1, this relationship indicates only a characteristic of the foot interference angle and hence is called a "foot mechanism compliance model". This is illustrated in FIG. 45 with reference numeral 134b.

The configuration of the floor shape estimator 130a according to the second embodiment will then be explained.

The floor shape estimator 130a according to the second embodiment comprises a foot-to-foot floor inclination difference estimator 138a and a foot floor inclination difference estimator 144a. FIG. 44 is a block diagram showing the configuration and processing of the foot-to-foot floor inclination difference estimator 138a. FIG. 45 is a block diagram showing the configuration and processing of the foot floor inclination difference estimator 144a.

Figure 45:
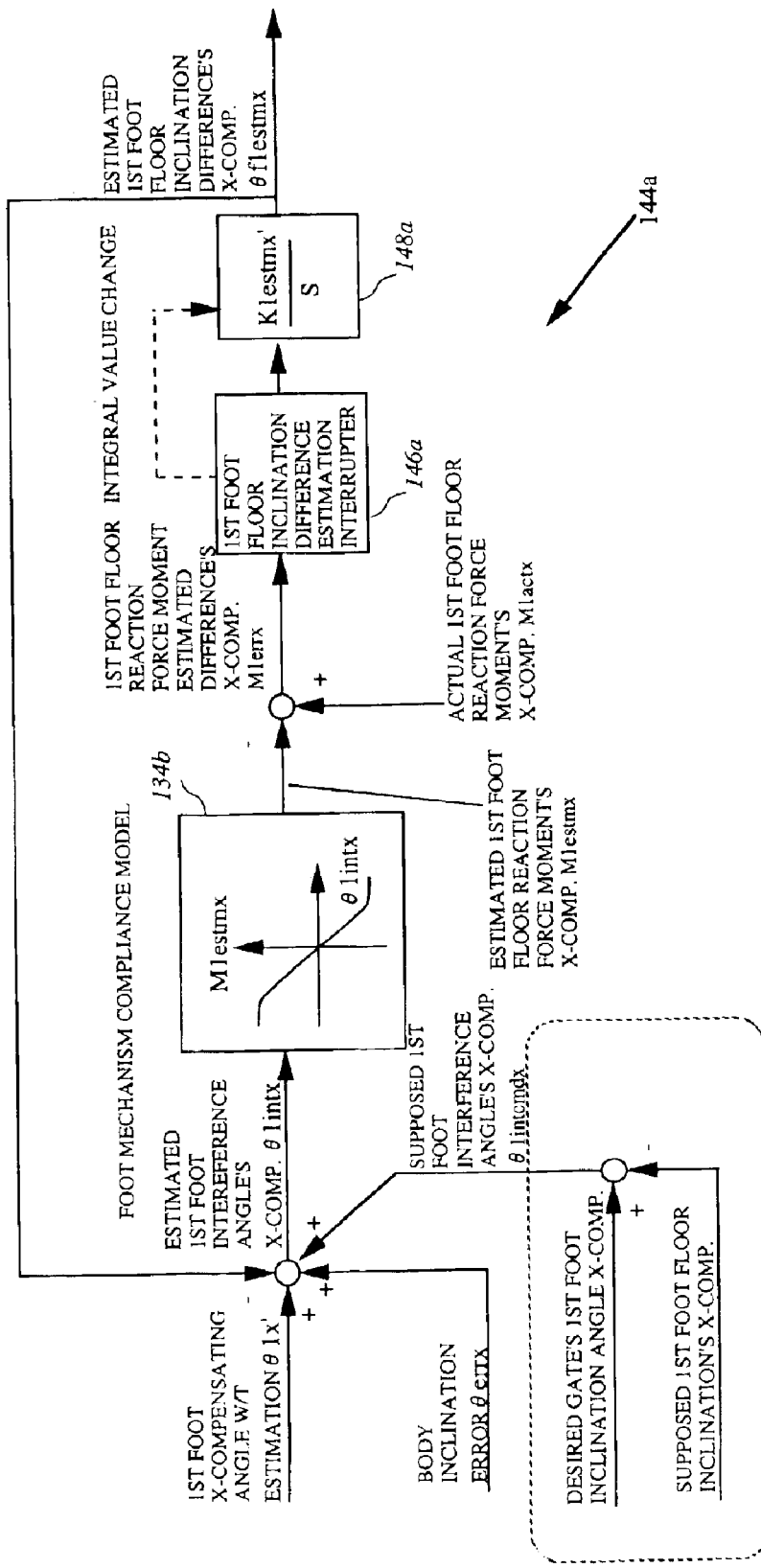
FIG. 45 is a block diagram showing the processing of a foot floor inclination difference estimator of the system according to the second embodiment.

FIG. 45 illustrates only the configuration and processing for estimating the 1st foot floor inclination difference's X-component, but those for estimating the 1st foot floor inclination difference's Y-component, the 2nd foot floor inclination difference's X-component and the 2nd foot floor inclination difference's Y-component will be similar.

The processing of the foot-to-foot floor inclination difference estimator 138a will be explained with reference to FIG. 44.

First, the V-direction component θ errv of the body inclination error θ errv is calculated by dissolving the error in the V-direction component and the component perpendicular thereto.

Next, the inclination of the vector whose initial point is the desired 1st foot floor reaction force central point Q1 and whose terminal point is the desired 2nd foot floor reaction force central point Q2 of the desired gait, and a difference obtained by subtracting the supposed foot-to-foot floor inclination from the calculated inclination is determined as a "supposed feet interference angle θ dbintcmdv".

Then, the aforesaid estimated feet interference angle θ dbintv is calculated in accordance with the following equation:

$$\theta\ dbintv = \theta\ dbv' + \theta\ errv - \theta\ fdbestmv + \theta\ dbintcmdv \qquad \text{Eq. 25}$$

Here, as mentioned in the first embodiment, θ fdbestmv is the estimated foot-to-foot floor inclination difference. And, θ dbv' is the feet compensating angle with floor shape estimation and as illustrated in FIG. 42, is the sum of the feet compensating angle θ dbv and the estimated foot-to-foot floor inclination difference θ fdbestmv. Since current values of the feet compensating angle with floor shape estimation θ dbv' and the estimated foot-to-foot floor inclination difference θ fdbestmv should be calculated from themselves, they should be stored and their most recent values should be used in the calculation.

It should be noted here that, when it is required to estimate the foot-to-foot floor inclination difference before a supposed timing at which the feet are to be landed, in order to improve the estimation accuracy, it is preferable to add the supposed feet interference angle θ dbintcmdv. However, the configuration to add the supposed feet compensating angle θ dbintcmdv as well as the calculation of this supposed feet interference angle θ dbintcmdv (in other words, a portion enclosed by a dash line in FIG. 44) is not always indispensable for this system.

Then, the aforesaid value Mdbestmv (which is expected to be produced in response to the estimated feet interference angle θ dbintv) is calculated using the foot-to-foot mechanism compliance model 134a, whilst the V-direction component Mf1f2actv of the sum of the moments produced about the desired total floor reaction force central point by the actual foot floor reaction force's force component of the respective feet is calculated. The V-direction component is the component obtained by Eqs. 12 and 13 of the composite control.

Next, the feet moment estimated difference Mdberr is obtained by calculating a difference between the values Mf1f2actv and Mdbestmv. If the estimated foot-to-foot floor inclination difference θ dbestmv is equal to the actual foot-to-foot floor inclination difference, the feet moment estimated difference Mdberr is 0. Namely, if the feet moment estimated difference Mdberr is 0, the estimated foot-to-foot floor inclination difference θ fdbestmv becomes equal to the actual foot-to-foot floor inclination difference.

Then, in the estimator, the foot-to-foot floor inclination difference estimation interrupter 140a determines whether the foot-to-foot floor inclination difference estimation should be conducted or interrupted (discontinued).

The foot-to-foot floor inclination difference estimation interrupter 140a immediately outputs the aforesaid value Mdberr inputted thereto when it determines that the foot-to-foot floor inclination difference estimation should be conducted (continued), whereas it outputs 0 when it determines that the estimation should be interrupted. The details of the foot-to-foot floor inclination estimation interrupter 140a will be explained later.

Next, the estimator integrates the output from the foot-to-foot floor inclination difference estimation interrupter 140a at an integrator 142a by an integration constant Kdbestm to determine the estimated foot-to-foot floor inclination difference θ fdbestmv.

The above is processed by the foot-to-foot floor inclination difference estimator 138a according to the second embodiment.

As illustrated in FIG. 42, the estimated foot-to-foot floor inclination difference θ fdbestmv is added to the feet compensating angle θ dbv, and the sum is inputted to the corrected desired foot position and/or posture calculator 114g as the feet compensating angle with floor shape estimation θ dbv'.

By repeating the processing mentioned above, the estimated foot-to-foot floor inclination difference θ fdbestmv changes such that the foot-to-foot moment estimated difference Mdberr converges to 0.

As mentioned above, when the feet moment estimated difference Mdberr becomes 0, the estimated foot-to-foot floor inclination difference θ fdbestmv becomes equal to the actual foot-to-foot floor inclination difference. In this way, the estimated foot-to-foot floor inclination difference θ fdbestmv will converge the actual foot-to-foot floor inclination difference after a while. Thus, the foot-to-foot floor inclination difference can be estimated in the processing mentioned above.

It should be noted that when the foot-to-foot mechanism compliance model 134 is linear, the closed-loop transfer function from the actual foot-to-foot floor inclination difference estimation to the estimated foot-to-foot floor inclination difference estimation in its processing system has a first-order lag. Its time constant T can be obtained by the following equation, when defining a ratio (in absolute value) of the input (estimated feet interference angle) to the foot-to-foot mechanism compliance model 134a to its output (aforesaid moment Mdbestmv):

$$T = 1/(C * Kdbestm') \qquad \text{Eq. 26}$$

Different form the integration gain Kdbestm in the first embodiment, in the second embodiment, by determining it as Kdbestm' and by calculating by the equation mentioned below, it becomes possible to obtain the foot-to-foot floor inclination difference estimator 138a having almost the same characteristics as that of the first embodiment.

$$Kdbestm' = Kdbestm/C \qquad \text{Eq. 27}$$

Next, the processing of the foot floor inclination difference estimator 144a will be explained with reference to FIG. 45.

Although FIG. 45 illustrates only the configuration and processing for estimating the 1st foot floor inclination difference's X-component, they will be also be applied to those for estimating the 1st foot floor inclination difference's Y-component, the 2nd foot floor inclination difference's X-component and the 2nd foot floor inclination difference's Y-component.

First, the estimator calculates the 1st foot inclination angle of the desired gait, subtracts the supposed 1st foot floor inclination difference therefrom, and determines the X-component of the difference as a supposed 1st foot interference angle's X-component θ 1intcmdx.

Then, the estimator calculates an X-component θ 1intx of the aforesaid estimated 1st foot interference angle using the following equation:

$$\theta\,1intx = \theta\,1x' + \theta\,errx - \theta\,f1estmx + \theta\,1intcmdx \qquad \text{Eq. 28}$$

Here, θ f1estmx indicates the estimated 1st foot floor inclination difference's X-component, as mentioned in the first embodiment. And, θ 1x' indicates the 1st foot X-compensating angle with floor shape estimation and as shown in FIG. 42, is the sum of the 1st foot X-compensating angle θ 1x and the estimated 1st foot floor inclination difference's X-component θ f1estmx.

Since the 1st foot X-compensating angle θ 1x' and the estimated 1st foot floor inclination difference's X-component θ f1estmx are values whose current values should be determined using themselves, their most recent values stored in memory should be used in this calculation.

It should be noted here that, when it is required to estimate the 1st foot floor inclination difference before a supposed timing at which the feet are to be in contact with the floor completely, in order to improve the estimation accuracy, it is preferable to add the supposed 1st foot interference angle's X-component θ 1intcmdx. However, the configuration to add the supposed 1st foot compensating angle's X-component θ 1intcmdx as well as the calculation of this supposed 1st foot interference angle's X-component θ 1intcmdx (i.e., a portion enclosed by a dash line in FIG. 45) is not always indispensable for this system.

Then, the aforesaid value's X-component M1estmx (which is expected to be produced in response to the estimated 1st foot interference angle's X-component θ 1intx) is calculated using the foot mechanism compliance model 134b.

Next, the 1st foot floor reaction force moment's estimated difference's X-component M1errx is obtained by calculating a difference between the detected actual 1st foot floor reaction force's moment M1actx and the aforesaid value M1estmx. If the estimated 1st foot floor inclination difference θ f1estmx is equal to the actual 1st foot floor inclination difference, the 1st foot floor reaction force moment's estimated difference's X-component M1errx is 0. Saying this reverse, if the 1st foot floor reaction force moment's estimated difference's X-component M1errx is 0, the estimated 1st foot floor inclination difference's X-component θ f1estmx becomes equal to the actual 1st foot floor inclination difference.

Then, in the estimator, the 1st foot floor inclination difference estimation interrupter determines whether the 1st foot floor inclination difference estimation should be conducted or interrupted (discontinued).

The 1st foot floor inclination difference estimation interrupter immediately outputs the 1st foot floor reaction force moment's estimated difference's X-component M1errx inputted thereto when it determines that the foot-to-foot floor inclination difference estimation should be conducted (continued), whereas it outputs 0 when it determines that the estimation should be interrupted. The details of the 1st foot floor inclination estimation interrupter 146a will be explained later.

Next, the estimator integrates the output from the 1st foot floor inclination difference estimation interrupter at an integrator by an integration constant K1estmx' to determine the estimated 1st foot floor inclination difference's X-component θ f1estmx.

The above is processed by the 1st foot floor inclination difference estimator according to the second embodiment.

As illustrated in FIG. 42, the estimated 1st foot floor inclination difference's X-component θ f1estmx is added to the 1st foot compensating angle θ 1x, and the sum is inputted to the corrected desired foot position and/or posture calculator 114g as the 1st foot's X-compensating angle with floor shape estimation θ 1x'.

By repeating the processing mentioned above, the estimated 1st foot floor inclination difference's X-component θ f1estmx changes such that the 1st foot floor reaction force moment's estimated difference's X-component M1errx converges to 0.

As mentioned above, when the 1st foot floor reaction force moment's estimated difference's X-component M1errx becomes 0, the estimated 1st foot floor inclination difference's X-component θ f1estmx becomes equal to the actual 1st foot floor inclination difference's X-component. In this way, the estimated 1st foot floor inclination difference's X-component θ f1estmx will converge the actual 1st foot floor inclination difference's X-component after a while. Thus, the 1st foot floor inclination difference's X-component can be estimated in the processing mentioned above.

It should be noted that when the foot mechanism compliance model 134b is linear, the closed-loop transfer function from the actual 1st foot floor inclination difference's X-component estimation to the estimated 1st foot floor inclination difference's X-component estimation in its processing system has a first-order lag. Its time constant T can be obtained by the following equation, when defining a ratio (in absolute value) of the input (estimated 1st foot interference angle's X-component θ 1intx) to the foot mechanism compliance model 134b to its output (aforesaid moment M1estmx).

$$T = 1/(C1 \cdot K1estmx') \quad \text{Eq. 29}$$

Different form the integration gain K1estmx in the first embodiment, in the second embodiment, by determining it as K1estmx' and by calculating by the equation mentioned below, it becomes possible to obtain the 1st foot floor inclination difference estimator having almost the same characteristics as that of the first embodiment.

$$K1estmx' = K1estmx/C1 \quad \text{Eq. 30}$$

When the orientation (posture) of the desired foot is different from that of the desired body, it suffices if the body inclination is expressed by the each foot's coordinate system.

Then, the first embodiment is compared with the second embodiment.

In the first embodiment, the finally-corrected desired foot position and/or posture is used as the input to the floor shape estimator 130, whilst in the second embodiment, it can be stated that a variable or parameter which is intermediately generated for determining the finally-corrected desired foot position and/or posture.

Summarizing the second embodiment, the compliance model of the first embodiment is approximated by the foot-to-foot mechanism compliance model 134a for the feet compensating angle and the foot mechanism compliance model 134b for the foot compensating angle, and the block diagram illustrating the configuration is rewritten to be equivalent to that of the first embodiment.

Since the mechanism compliance model is thus simplified in the second embodiment, the estimation accuracy is somewhat lower than that of the first embodiment. Since, however, the calculation of the mechanism compliance model is simplified, the system according to the second embodiment can decrease the load of the control unit 26. Except for this, the rest of the second embodiment is not different from the first embodiment. The effects and advantages of the second embodiment are the same as those of the first embodiment. Like the first embodiment, the second embodiment is sufficient if it can estimate the floor shape estimation.

It should be noted in the above, when it is not required to begin estimation of the foot-to-foot floor shape difference before a supposed time indicating the start of the two-leg supporting period (i.e., a supposed time at which the free leg lands), the following equation can be used in which the term on the supposed feet interference angle θ dbintcmdv is removed from Eq. 25. This is because the supposed feet interference angle θ dbintcmdv is 0 during the two-leg supporting period.

$$\theta\ dbintv = \theta\ dbv' + \theta\ errv - \theta\ fdbestmv \quad \text{Eq. 31}$$

When it is not required to begin estimation of the 1st foot floor shape difference's X-component before the 1st foot's edge along the Y-axis (i.e., the heel edge or toe edge) in the desired gait is to be in contact with the floor, the following equation can be used in which the term on the supposed 1st foot interference angle's X-component θ 1intcmdx is removed from Eq. 28. The reason is that, a period of time during which the 1st foot's edge along the Y-axis is in contact with the floor, the supposed 1st foot interference angle 's X-component θ 1intcmdx is 0.

$$\theta\ 1intx = \theta\ 1x' + \theta\ errx - \theta\ f1estmx \quad \text{Eq. 32}$$

When it is not required to begin estimation of the 1st foot floor shape difference's Y-component before the 1st foot's edge along the X-axis (i.e., the inner or outer edge) in the desired gait is to be in contact with the floor, the following equation can be used in which the term on the supposed 1st foot interference angle's X-component θ 1intcmdy is removed from an equation (in which x in Eq. 28 is to be replaced by y). The reason is that, a period of time during which the 1st foot's edge along the X-axis (i.e. the inner or outer edge) is in contact with the floor, the supposed 1st foot interference angle's Y-component θ 1intcmdy is 0.

$$\theta\ 1inty = \theta\ 1y' + \theta\ erry - \theta\ flestmy \qquad \text{Eq. 33}$$

Further, if the moment Mf1f2actv obtained from Eq. 12a is used, in stead of the moment Mf1f2actv obtained from Eq. 12, the total floor reaction force's moment about the desired total floor reaction force central point (which is expect to be produced in response to the mechanism deformation for canceling the estimated feet interference angle) should be used, in lieu of the moment Mdeestmv.

It should be noted that the estimated floor shape difference is stored as information onto floor shape such that it can be used as a reference when the robot next walks on the same floor.

Then, the processing or operation of the 1st foot floor inclination difference's Y-component estimation interrupter will be explained.

The configuration and processing of the 1st foot floor inclination difference's Y-component estimation interrupter according to the second embodiment is almost the same as that of the first embodiment. Specifically, it is sufficient in the configuration illustrated in FIG. 37, if θ f1errdiffy is replaced by the 1st foot floor reaction force moment's estimated difference's Y-component M1erry.

Also, the processing of the foot-to-foot floor inclination difference estimation interrupter 140a is almost the same as that of the first embodiment. Specifically, it is sufficient in the configuration illustrated in FIG. 40, if θ fdberrdiffv is replaced by the feet moment's estimated difference Mdberr.

Explaining the operation of the foot-to-foot floor inclination difference estimation interrupter 140a, like the 1st foot floor inclination difference estimation interrupter, it determines whether the estimation of the foot-to-foot floor inclination difference can be conducted normally and if not, it interrupts or discontinues the estimation. More specifically, the interrupter outputs 0 in a situation where the estimation accuracy of the foot-to-foot floor inclination difference is liable to be degraded or where the estimated foot-to-foot floor inclination difference is likely to oscillate, whereas it outputs or passes the input immediately to continue the estimation in a situation other than the above.

The estimated foot-to-floor inclination difference does not oscillate when the contact pressure between the foot and the floor is sufficient, but does oscillate in a situation where one foot is about to be out of the contact with the floor, but feet compensating angle is being changed to a direction in which the foot is lifted. Since this is almost the same as that in the oscillation of the estimated 1st foot floor inclination difference's Y-component, no further explanation will be made.

Having been configured in the foregoing manner, the system according to the second embodiment can accurately estimate the floor shape, more specifically, it can estimate the inclination of the surface with which each foot is in contact and a height difference between surfaces with which the feet are in contact, at the same time or simultaneously.

Further, the system can produce the floor reaction force as desired even when the floor shape is different from that has been supposed, and can solve the steady-state error of the floor reaction force due to a deviation of the floor shape.

Further, since the floor shape estimation is interrupted or discontinued in a situation where the accuracy of floor shape estimation is liable to degrade or the estimation value is liable to oscillate, in addition to the advantages and effects mentioned above, it can prevent the estimated value from being inappropriate.

It should be noted that, in the first and second embodiment, a situation where the foot 22R(L) is liable to lift is determined by calculating the actual foot floor reaction force central point Qnact or Qnact' from the actual foot floor reaction force obtained from the force sensor 34, and by discriminating based on the calculation result which direction the foot is liable to lift (i.e., discriminating which of the heel, the toe, the inner edge and the outer edge is likely to be lifted).

Figure 46:
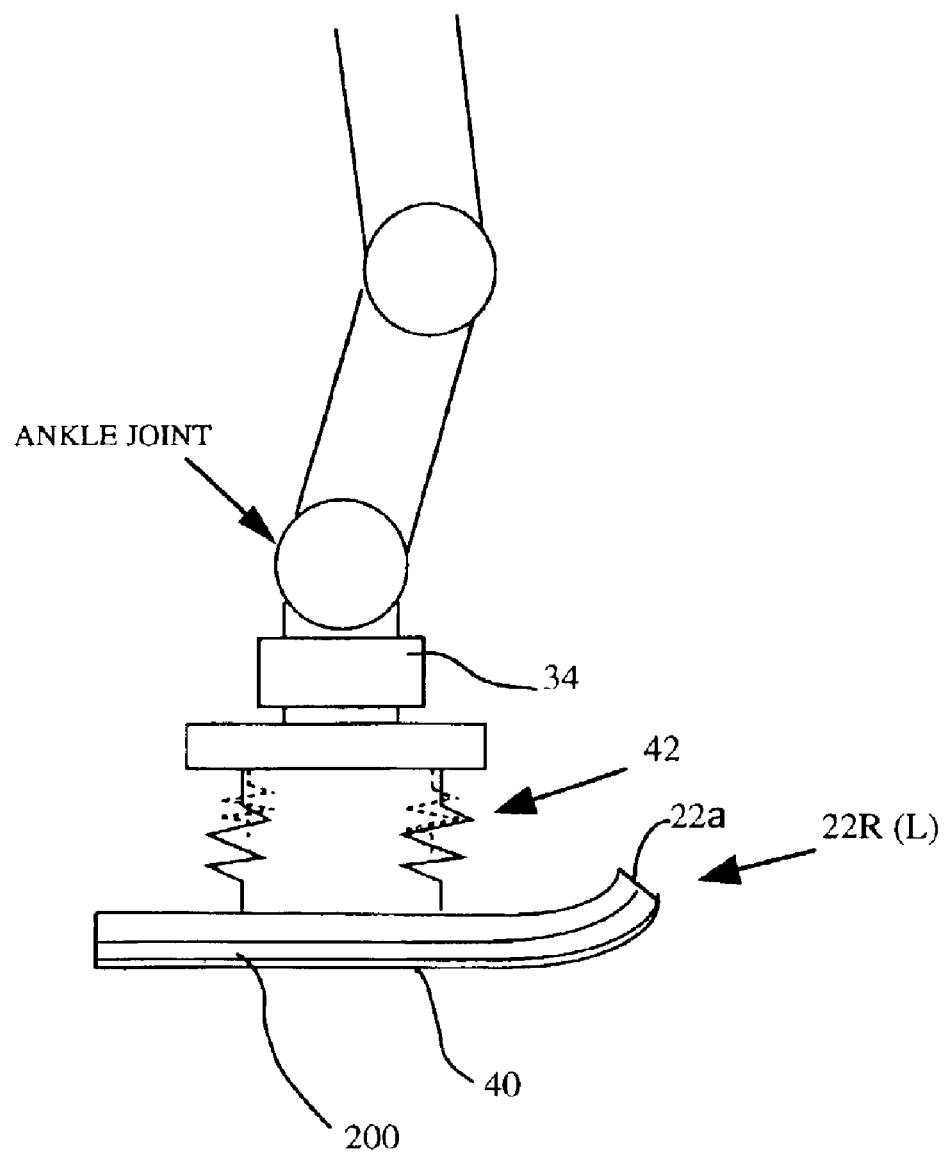
FIG. 46 is an explanatory view showing another example of a sensor to be used in the floor shape estimation system according to the first and second embodiments.

However, the determination should not be limited to that. As illustrated in FIG. 46, it is alternatively possible to install a pressure-distribution sensor 200 between the foot sole elastic member 40 and the foot main body 22a, and to determine from an output signal of the sensor which direction the foot is liable to lift. Since the pressure-distribution sensor 200 can detect the deformation of the foot more precisely than the force sensor 34, the provision of such a sensor will improve the floor shape estimation.

Figure 47:
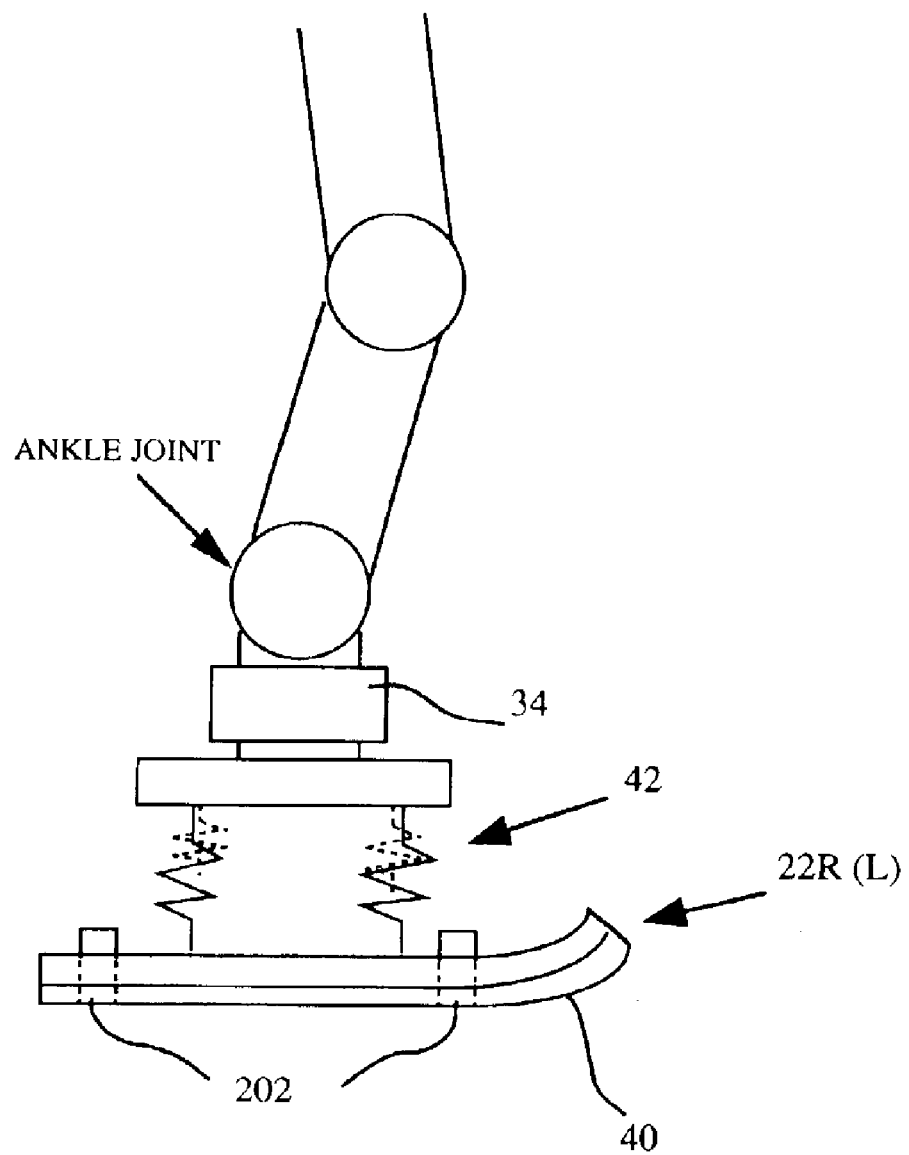
FIG. 47 is an explanatory view showing still another example of a sensor to be used in the floor shape estimation system according to the first and second embodiments.

Further, as illustrated in FIG. 47, it is still alteratively possible to install a plurality of contact sensors 202 at the foot 22R(L), for example each at the corners, and to determine from output signals of the sensors which direction the foot is liable to lift. In this case, the estimation will be interrupted or discontinued depending on the number of sensor output signals (indicative of non-contact of the foot with the floor).

As mentioned above, the first and second embodiments are configured such that it has a system for controlling a legged mobile robot having at least a body 24 and a plurality of legs (leg links) 2 each connected to the body through a first joint (hip joints 10, 12, 14R(L)) and having a foot 22R(L) connected to its distal end through a second joint (ankle joints 18, 20R(L)), the system having a compliance mechanism 42 which deforms in response to a floor reaction force acting from a floor with which the foot is in contact and joint displacement means (electric motors) which displacing the first and second joints (10, 12R(L), . . . ) such that the foot follows a desired position and/or posture, comprising: inclination detection means (inclination sensor 36) for detecting an inclination of the body relative to a vertical direction; walking environment foot position and/or posture calculating means (ECU 26, composite compliance operation determinator 114, corrected desired feet position and/or posture with deformation compensation calculator 114h, adder of the body inclination error's V-direction component θ errv in the foot-to-foot floor inclination difference estimator 138, adder of the body inclination error's X-direction component θ errx in the 1st foot floor inclination difference estimator 144) for calculating a position and/or posture of the foot in a walking environment (corrected desired foot position and/or posture with deformation compensation) including the floor with which the foot is in contact, based on an actual and/or desired position and/or posture of the foot and the detected inclination; deformed foot position/posture calculating means (ECU 26, composite compliance model 134, floor shape estimator 130 (in particular portions up to that for calculating θ fdbv' in the foot-to-foot floor inclination difference estimator 138, and portions up to that for calculating θ f1errx' in the 1st foot floor inclination difference estimator 144)) for calculating the position and/or posture of the foot with deformation of the mechanism (estimated foot position and/or posture after deformation) in response to the floor reaction force acting from the floor in the walking environment using a mechanism compliance model 134 which models the compliance mechanism 42; and floor shape estimation value calculating means (ECU 26, composite compliance operation determinator 114, floor shape estimator 130, foot-to-foot floor inclination difference estimator 138 (in particular portions after that for calculating θ fdberrv), and the foot floor inclination difference estimator 144 (in particular portions after that for calculating θ f1errx)) for calculating a floor shape estimation value indicative of shape of surface of the floor with which each foot is in contact (estimated n-th foot floor inclination (difference) θ fnestm) and indicative of a relationships therebetween (estimated foot-to-foot floor inclination (difference) or estimated foot-to-foot floor height difference (error) θ fdbestmv).

In the system, the compliance model comprises a first model (foot mechanism compliance model 134b) which expresses the floor reaction force acting on each foot 22R(L) and a change of position and/or posture of each foot resulting from the floor reaction force acting on each foot, and a second model (foot-to-foot mechanism compliance model 134a) which expresses the floor reaction force acting at a desired total floor reaction force central point and a change of one of the foot relative to the other resulting from the floor reaction force acting at the desired total floor reaction force central point.

In the system, the floor shape estimation value calculating means has a filter which removes a high-frequency component (portions for calculating θ fdbestmv from θ fdberrv in the foot-to-foot floor inclination difference estimator 138 and portions for calculating θ f1estm from θ f1err in the 1st foot floor inclination difference estimator 144).

The system further includes: correcting means (ECU 26, adder 132 (132a, 132b), corrected desired foot position and/or posture calculator 114g) for correcting the desired position and/or posture of the foot based on the calculated floor shape estimation value.

The system further includes: gait generating means (ECU 26, gait generator 100, S10–S22) for generating a gait of the robot 1 including at least a motion pattern of the robot including at least the desired position and/or posture of the foot (desired body position and/or posture, desired foot position and/or posture) and a desired pattern of a total floor reaction force acting on the robot (desired total floor reaction force, desired total floor reaction force central point (desired ZMP)); desired foot floor reaction force central point determining means (ECU 26, desired floor reaction force distributor 102, S24, S26) for determining a desired foot floor reaction force which is a central point of action on the foot (desired foot floor reaction force central point) when the total floor reaction force of the generated gait is distributed to each of the foot; actual floor reaction force detecting means (ECU 26, force sensor 34, actual foot floor reaction force sensor 108, S32) for detecting an actual floor reaction force acting on the foot (actual foot floor reaction force); and foot rotation amount determining means (ECU 26, composite compliance operation determinator 114, feet compensating angle determinator 114b, n-th foot compensating angle determinator 114c, . . . , S32, S34, S100–S108) for calculating a moment of the detected actual floor reaction force acting about the calculated foot floor reaction force central point (actual n-th foot floor reaction force's moment Mactx, y, z), and for determining a foot rotation amount for rotating the foot (feet compensating angle θ dbv, n-th foot compensating angle θ nx, y) based on the calculated moment; wherein the correcting means includes: foot rotation amount correcting means (ECU 26, adder 132 (132a, 132b)) for correcting the foot rotation amount based on the calculated floor shape estimation value (feet compensating angle with floor shape estimation θ dbv', n-th foot compensating angle with floor shape estimation θ nx', y'); and foot position/posture correcting means (ECU 26, corrected desired foot position/posture calculator 114g, S38, S40) for correcting the desired position and/or posture of the foot based on the corrected foot rotation amount such that the position/posture of the foot rotates.

The system further includes: gait generating means (ECU 26, gait generator 100, S10–S22) for generating gait of the robot 1 including at least a motion pattern of the robot including at least the desired position and/or posture of the foot 22R(L) (desired body position and/or posture, desired foot position and/or posture) and a desired pattern of a total floor reaction force acting on the robot (desired total floor reaction force, desired total floor reaction force's central point (desired ZMP)); desired foot floor reaction force central point determining means (ECU 26, desired foot reaction force distributor 102, S24, S26) for determining a desired foot floor reaction force which is a central point of action on the foot 22R(L) when the total floor reaction force of the generated gait is distributed to each of the foot (desired foot floor reaction force central point); actual floor reaction force detecting means (ECU 26, force sensor 34, actual foot floor reaction force sensor 108, S32) for detecting an actual floor reaction force acting on the foot (actual foot floor reaction force); and foot rotation amount determining means (ECU 26, composite compliance operation determinator 114, feet compensating angle determinator 114b, n-th foot compensating angle determinator 114c, . . . , S32, S34, S100–S108) for determining a foot rotation amount for rotating the foot (feet compensating angle θ dbv, n-th foot compensating angle θ nx,y) based on the detected actual floor reaction force; wherein the correcting means includes: foot rotation amount correcting means (ECU 26, adder 132 (132a, 132b)) for correcting the foot rotation amount based on the calculated floor shape estimation value (feet compensating angle with floor shape estimation θ dbv', n-th foot compensating angle with floor shape estimation θ nx',y'); and foot position/posture correcting means (ECU 26, corrected desired foot position/posture calculator 114g, S38, S40) for correcting the desired position and/or posture of the foot based on the corrected foot rotation amounts such that the position and/or posture of the foot rotates about the determined foot floor reaction force central point (desired foot floor reaction force central point) or thereabout.

In the system, the foot position/posture correcting means corrects the desired position and/or posture of the foot based on the corrected foot rotation amounts such that the position and/or posture of the foot rotates about the determined foot floor reaction force central point or thereabout.

The system further includes: foot movement amount determining means (ECU 26, compensating total floor reaction force's moment distributor 114a, feet compensating angle determinator 114, S100–S106) for calculating at least one of the total floor reaction force's moment actually acting on the robot (more precisely a moment component PQ1*F1act+PQ2*F2act+M1act+M2act), and a moment (Mf1f2act=PQ1*F1act+PQ2*F2act) obtained by subtracting the moment of the detected actual floor reaction force acting about the calculated foot floor reaction force central point (M1act+M2act), from the total floor reaction force's moment actually acting on the robot (PQ1*F1act+PQ2*F2act+M1act+M2act), and for determining a foot movement amount for moving the foot (θ dbv) based on the calculated moment.

In the system, the foot position/posture correcting means further corrects the desired position and/or posture of the foot based on an posture error of the robot.

In the system, a compensating total floor reaction force's moment for posture stabilization (compensating total floor reaction force Mdmd) that is to be added to the desired pattern of the total floor reaction force is determined, and the foot rotation amount determining means and/or the foot movement amount determining means determines the foot rotation amount and/or the foot movement amount based on at least the detected actual floor reaction force (actual foot floor reaction force) and the determined compensating total floor reaction force's moment for posture stabilization (S34, S100–S108).

In the system, the compensating total floor reaction force's moment for posture stabilization is determined based on an inclination error of the robot (θ errx, y).

In the system, the foot rotation amount determining means and/or the foot movement amount determining means determines the foot rotation amount and/or the foot movement amount such that the determined compensating total floor reaction force's moment for posture stabilization is distributed to each of the legs (S34, S100-S108).

The system further includes: gait generating means (ECU 26, gait generator 100, S10–S22) for generating gait of the robot 1 including at least a motion pattern of the robot including at least the desired position and/or posture of the foot 22R(L) (desired body position and/or posture, desired foot position and/or posture) and a desired trajectory pattern of a total floor reaction force acting on the robot (desired total floor reaction force, desired total floor reaction force central point (desired ZMP)); compensating total floor reaction force calculating means (ECU 26, posture stabilization controller 104, S28, S30) for calculating a compensating total floor reaction force for posture stabilization (compensating total floor reaction force Mdmd); actual floor reaction force detecting means (force sensor 34, ECU 26, actual reaction force sensor 108, S32) for detecting an actual floor reaction force acting on the foot (actual foot floor reaction force); and floor reaction force distributing means (ECU 26, desired floor reaction force distributor 102, S34, S100-S104) for distributing the total floor reaction force of the generated gait and the compensating total floor reaction for; wherein the correcting means corrects the desired foot position and/or posture based on the distributed total floor reaction force of the generated gait and the compensating total floor reaction force, the detected actual floor reaction force and the calculated floor shape estimation value (ECU 26, compensating angle determinators 114b, 114c, adder 132 (132a, 132b), corrected desired foot position/posture calculator 114g, corrected desired foot position/posture with deformation compensation calculator 114h, deformation amount calculator 114n).

In the system, the compensating total floor reaction force for posture stabilization is calculated based on an inclination error of the robot (θ errx,y).

In the first embodiment and the second embodiment, equivalent altering the order calculation may be made on the block diagrams illustrated.

In the first embodiment and the second embodiment, although the present invention has been described with reference to a biped robot, the. present invention should not be limited to that and can be applied to other legged mobile robots.

INDUSTRIAL FIELD IN WHICH THE INVENTION IS APPLICABLE

According to the present invention, it becomes possible to provide a floor shape estimation system of a legged mobile robot which can accurately estimate the inclination of a surface with which the robot foot is in contact and a height difference between surfaces with which the robot feet are in contact, at the same time, i.e., in a composite manner. Such a simultaneous estimation has been difficult in the prior art. In addition, the system is simple in configuration.

Further, in addition to the effects, it becomes possible to provide a floor shape estimation system for a legged mobile robot which can bring the steady-state error of the actual floor reaction force from a desired value in the control (which the prior art composite control could not eliminate), close to zero as much as possible. In other words, it can solve the steady-state error due to a deviation of the floor reaction force.

What is claimed is:

1. A system for controlling a legged mobile robot having at least a body and a plurality of legs each connected to the body through a first joint and having a foot connected to a distal end of said leg through a second joint, the system having a compliance mechanism which deforms in response to a floor reaction force acting from a floor with which the foot is in contact and joint displacement means for displacing the first and second joints such that an actual position and/or posture of the foot follows a desired position and/or posture relative to the body, comprising:

inclination detecting means for detecting an inclination of the body relative to a vertical direction;

deformed foot position/posture calculating means for calculating a deformed position and/or posture of the foot in a walking environment including the floor with which the foot is in contact, based on the detected inclination and at least one of an actual joint displacement, a desired joint displacement and the desired position and/or posture of the foot of the robot, that corresponds to the position and/or posture of the foot with deformation of the mechanism in response to the floor reaction force acting from the floor in the walking environment, using a mechanism compliance model which models the compliance mechanism; and floor shape estimation value determining means for determining a floor shape estimation value indicative of shape of surface of the floor with which each foot is in contact and indicative of a relationship between surfaces of the floor based on the calculated deformed position and/or posture of the foot.

2. A system according to claim 1, further including:
   desired gait generating means for generating a desired gait including at least a motion pattern of the robot; and
   correcting means for correcting a position and/or posture of the foot of the motion pattern based on at least the determined floor shape estimation value to determine the desired position and/or posture of the robot.

3. A system according to claim 2, further including:
   actual floor reaction force detecting means for detecting an actual floor reaction force acting on the foot;
   and the deformed foot position/posture calculating means determines the deformed position and/or posture of the foot based on the detected actual floor reaction force.

4. A system according to claim 1, further including:
   desired gait generating means for generating a desired gait including at least the position and/or posture of the foot of the robot;
   and the desired position and/or posture of the foot is determined by correcting the position and/or posture of the foot of the desired gait based on at least the determined floor shape estimation value.

5. A system according to claim 1, wherein the shape of surface of the floor is a local inclination on the floor, and the relationship between surfaces of the floor is at least one of a difference between points on the surfaces of the floor and an inclination of a line connecting the points.

6. A system according to claim 1, wherein the floor shape estimation value determining means has a filter which removes a high-frequency component.

7. A system for controlling a legged mobile robot having at least a body and a plurality of legs each connected to the body through a first joint and having a foot connected to a distal end of said leg through a second joint, the system having a compliance mechanism which deforms in response to a floor reaction force acting from a floor with which the foot is in contact and joint displacement means for displacing the first and second joints such that an actual position and/or posture of the foot follows a desired position and/or posture relative to the body, comprising:

inclination detecting means for detecting an inclination of the body relative to a vertical direction;

walking environment foot position and/or posture calculating means for calculating the position and/or posture of the foot in a walking environment including the floor with which the foot is in contact, based on the detected inclination and at least one of an actual joint displacement, a desired joint displacement and the desired foot position and/or posture of the robot;

floor shape estimation value determining means for determining a floor shape estimation value indicative of shape of surface of the floor with which each foot is in contact and indicative of a relationship between surfaces of the floor;

estimated floor reaction force determining means for determining an estimated floor reaction force that corresponds to a corrected value of the floor reaction force acting on the foot, based on the determined floor shape estimation value and the calculated position and/or posture of the foot in the walking environment, using a mechanism compliance model which models the compliance mechanism; and actual floor reaction force detecting means for detecting an actual floor reaction force acting on the foot;

wherein the floor shape estimation value determining means calculates a difference between the detected actual floor reaction force and the determined estimated floor reaction force and corrects the floor shape estimation value by correcting at least one of the shape of surface of the floor and the relationship between surfaces of the floor such that the difference converges to zero.

8. A system according to claim 7, further including:

desired gait generating means for generating a desired gait including at least a motion pattern of the robot; and correcting means for correcting a position and/or posture of the foot of the motion pattern based on at least the determined floor shape estimation value to determine the desired position and/or posture of the robot.

9. A system according to claim 7, wherein the compliance model comprises a first model which expresses the floor reaction force acting on each foot and a change of position and/or posture of each foot resulting from the floor reaction force acting on each foot, and a second model which expresses at least one of a moment, about a predetermined point, of total floor reaction force acting on the robot, and a moment obtained by subtracting a moment, about a prescribed point, of the floor reaction force acting on the foot, from the moment, about the predetermined point, of the total floor reaction force acting on the robot, and a positional change of one of the foot relative to the other resulting from the moment.

10. A system according to claim 7, further including:

desired gait generating means for generating a desired gait including at least the position and/or posture of the foot of the robot;

and the desired position and/or posture of the foot is determined by correcting the position and/or posture of the foot of the desired gait based on at least the determined floor shape estimation value.

11. A system according to claim 10, wherein the desired gait generating means generates the desired gait of the robot including at least a motion pattern of the robot, a desired trajectory of a total floor reaction force acting on the robot, and a desired foot floor reaction force central point that corresponds to a point of action set on the foot when the total floor reaction force is distributed to each foot;

and further including:

foot rotation amount determining means for calculating a moment that the detected actual floor reaction force causes to act about the desired foot floor reaction force central point, and for determining a foot rotation amount for rotating the foot based on the calculated moment;

foot rotation amount correcting means for correcting the determined foot rotation amount based on the determined floor shape estimation value; and foot position/posture determining means for determining the desired position and/or posture of the foot, by rotating the position and/or posture of the foot of the motion pattern based on the corrected foot rotation amount.

12. A system according to any of claim 11, further including:

foot movement amount determining means for calculating at least one of a moment of the total floor reaction force actually acting on the robot, and a moment obtained by subtracting the moment of the floor reaction force acting on the robot, from the moment of the total floor reaction force actually acting on the robot, and for determining a foot movement amount for moving the foot based on the calculated moment;

and the foot position/posture determining means determines the desired position and/or posture of the foot based on the corrected foot rotation amount, the determined foot movement amount, and the floor shape estimation value indicative of the relationship between surfaces of the floor.

13. A system according to claim 10, wherein the desired gait generating means generates the desired gait of the robot including at least a motion of the robot, a desired trajectory of a total floor reaction force acting on the robot, and a desired foot floor reaction force central point that corresponds to a point of action set on the foot when the total floor reaction force is distributed to each foot;

and further including:

foot rotation amount determining means for determining a foot rotation amount for rotating the foot based on at least the detected actual floor reaction force;

foot rotation amount correcting means for correcting the foot rotation amount based on the determined floor shape estimation value; and foot position/posture determining means for determining the desired position and/or posture of the foot, by rotating the position and/or posture of the foot of the motion pattern about the determined desired foot force reaction force central point or thereabout based on the corrected foot rotation amount.

14. A system according to claim 13, wherein the foot position/posture determining means determines the desired position and/or posture of the foot, by rotating the position and/or posture of the foot of the motion pattern about the determined desired foot floor reaction force central point or thereabout based on the corrected foot rotation amount.

* * * * *

UNITED STATES PATENT AND TRADEMARK OFFICE
CERTIFICATE OF CORRECTION

PATENT NO. : 6,920,374 B2
DATED : July 19, 2005
INVENTOR(S) : Toru Takenaka, Tadaaki Hasegawa and Takashi Matsumoto It is certified that error appears in the above-identified patent and that said Letters Patent is hereby corrected as shown below:

Column 58,
Line 54, "...a motion of the robot..." should read -- ...a motion pattern of the robot... --.

Column 59,
Line 2, "...desired foot force reaction force..." should read -- ...desired foot floor reaction force... --.

Signed and Sealed this

Twenty-ninth Day of November, 2005

JON W. DUDAS
*Director of the United States Patent and Trademark Office*